United States Patent
Yang et al.

(10) Patent No.: US 12,022,078 B2
(45) Date of Patent: Jun. 25, 2024

(54) PICTURE PROCESSING METHOD AND APPARATUS

(71) Applicant: HUAWEI TECHNOLOGIES CO., LTD., GuangDong (CN)

(72) Inventors: Haitao Yang, Shenzhen (CN); Lian Zhang, Shenzhen (CN); Xiang Ma, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 17/954,861

(22) Filed: Sep. 28, 2022

(65) Prior Publication Data

US 2023/0039840 A1 Feb. 9, 2023

Related U.S. Application Data

(63) Continuation of application No. PCT/CN2021/082657, filed on Mar. 24, 2021.

(30) Foreign Application Priority Data

Mar. 31, 2020 (CN) .......................... 202010246679.8

(51) Int. Cl.
*H04N 19/13* (2014.01)
*H04N 19/176* (2014.01)
(Continued)

(52) U.S. Cl.
CPC ........... *H04N 19/13* (2014.11); *H04N 19/176* (2014.11); *H04N 19/18* (2014.11); *H04N 19/91* (2014.11)

(58) Field of Classification Search
CPC ...... H04N 19/13; H04N 19/176; H04N 19/18; H04N 19/91; H04N 19/129; H04N 19/645;
(Continued)

(56) References Cited

U.S. PATENT DOCUMENTS

| 5,500,678 | A | * | 3/1996 | Puri | ..................... | H04N 19/176 |
| | | | | | | 375/240.03 |
| 2015/0358645 | A1 | * | 12/2015 | Thirumalai | .......... | H04N 19/186 |
| | | | | | | 375/240.02 |
| 2017/0118473 | A1 | * | 4/2017 | Thirumalai | ............ | H04N 19/50 |

FOREIGN PATENT DOCUMENTS

| CN | 1685731 A | 10/2005 |
| CN | 101039421 A | 9/2007 |

(Continued)

OTHER PUBLICATIONS

Chengjie Tu et al., (hereinafter Tu) "Context-Based Entropy Coding of Block Transform Coefficients for Image Compression", 1057-7149/D2 © 2002 IEEE (Year: 2002).*

(Continued)

*Primary Examiner* — Dramos Kalapodas
(74) *Attorney, Agent, or Firm* — Rimon PC

(57) ABSTRACT

The present application disclose a picture processing method and apparatus, which are applicable to a video picture processing scenario. The method includes: obtaining at least two transform coefficient blocks, where each of the at least two transform coefficient blocks includes at least two transform coefficients that correspond to different frequency points; determining, according to a preset frequency point scanning order, the transform coefficients that are in the at least two transform coefficient blocks and that correspond to a selected frequency point; and encoding, according to a preset coefficient scanning order, each transform coefficient corresponding to the selected frequency point, to obtain picture encoded information.

18 Claims, 12 Drawing Sheets

(51) Int. Cl.
*H04N 19/18* (2014.01)
*H04N 19/91* (2014.01)

(58) Field of Classification Search
CPC ........ H04N 19/60; H04N 1/41; H04N 19/172; H04N 19/42
See application file for complete search history.

(56) References Cited

FOREIGN PATENT DOCUMENTS

| | | |
|---|---|---|
| CN | 101083767 A | 12/2007 |
| CN | 101606391 A | 12/2009 |

OTHER PUBLICATIONS

Chengjie Tu et al., Context-Based Entropy Coding of Block Transform Coefficients for Image Compression, IEEE Transactions on Image Processing, vol. 11, No. 11, Nov. 2002, XP055275042, 13 pages.

ITU-T H.265, Telecommunication Standardization Sector of ITU, (Apr. 2013), Series H: Audiovisual and Multimedia Systems, Infrastructure of audiovisual services—Coding of moving video, High efficiency video coding; 317 total pages.

ITU-T H.264, Telecommunication Standardization Sector of ITU, (Jan. 2012), Series H: Audiovisual and Multimedia Systems, Infrastructure of audiovisual services—Coding of moving video, Advanced video coding for generic audiovisual services; 680 total pages.

* cited by examiner

PICTURE PROCESSING METHOD AND APPARATUS

CROSS-REFERENCE TO RELATED APPLICATIONS

This application is a continuation of International Application No. PCT/CN2021/082657, filed on Mar. 24, 2021, which claims priority to Chinese Patent Application No. 202010246679.8, filed on Mar. 31, 2020. The disclosures of the aforementioned applications are hereby incorporated by reference in their entireties.

TECHNICAL FIELD

This application relates generally to the picture processing field, and in particular, to a picture processing method and apparatus.

BACKGROUND

Currently, picture storage and transmission in an electronic device has become an indispensable processing method, and picture compression becomes more important in saving transmission bandwidth and storage space.

There are a plurality of international standards applied to picture compression, for example, Joint Photographic Experts Group (JPEG), JPEG 2000, H.264 intra coding, and H.265 intra coding. For example, the JPEG standard is widely applied to hardware devices such as a video surveillance camera, and a compressed picture file can be played after being decoded by an electronic device.

For example, in a JPEG-based picture compression solution, an encoder side first transforms a picture block, where the transformation method includes discrete cosine transform (DCT). After DCT is performed on the picture block, low-frequency components of the picture block are concentrated at the top-left corner of the picture, high-frequency components are distributed at the bottom-right corner of the picture, the coefficient in the first row and the first column of the picture block is a direct coefficient (DC), that is, the average value of the picture block, and the other 63 coefficients in the picture block are alternating coefficients (AC). Then, the DC coefficient and the AC coefficients are quantized to obtain a quantized DC coefficient and quantized AC coefficients. Then, the quantized DC coefficient and the quantized AC coefficients are compressed. After the picture compression data output by the encoder side is transmitted to a decoder side, the decoder side performs decoding, dequantization, and inverse transformation on the picture compression data to obtain a reconstructed picture block.

The foregoing picture compression method has low picture compression efficiency. In addition, a compressed file generated in the foregoing picture compression method consumes a large quantity of storage resources at the decoder side. Consequently, storage resource overheads at the decoder side are increased.

SUMMARY

Embodiments of this application provide a picture processing method and apparatus, to improve picture compression efficiency and reduce the storage costs of picture encoded information.

To resolve the foregoing technical problem, embodiments of this application provide the following technical solutions:

According to a first aspect, an embodiment of this application provides a picture processing method. The method includes: obtaining at least two transform coefficient blocks, where each of the at least two transform coefficient blocks includes at least two transform coefficients, and the transform coefficients in each transform coefficient block correspond to different frequency points; determining, according to a preset frequency point scanning order, the transform coefficients that are in the at least two transform coefficient blocks and that correspond to a frequency point; and encoding, according to a preset coefficient scanning order, each transform coefficient corresponding to the frequency point, to obtain picture encoded information. In some embodiments of this application, the frequency point scanning order may be preset or preconfigured, and the frequency point is determined based on the frequency point scanning order. The frequency point may be any frequency point. Each frequency point corresponds to one transform coefficient in each of the at least two transform coefficient blocks, that is, one frequency point corresponds to a plurality of transform coefficients, and the plurality of transform coefficients come from different transform coefficient blocks. The coefficient scanning order may be preset or preconfigured, and the transform coefficients corresponding to the frequency point are encoded according to the coefficient scanning order, to finally obtain picture encoded information. In some embodiments of this application, the picture encoded information can be obtained only by encoding, according to the coefficient scanning order, the transform coefficients that correspond to the same frequency point and that are in the at least two transform coefficient blocks. Therefore, a plurality of transform coefficients corresponding to the same frequency point can be encoded together, thereby improving picture compression efficiency. In addition, in some embodiments of this application, the picture encoded information is obtained by encoding, according to the coefficient scanning order, the transform coefficients that correspond to the same frequency point and that are in the at least two transform coefficient blocks. In this way, the file size of the picture encoded information obtained through encoding is reduced, storage costs of the picture encoded information are reduced, and storage resources are saved.

In a possible implementation, the determining, according to a preset frequency point scanning order, the transform coefficients that are in the at least two transform coefficient blocks and that correspond to a frequency point includes: obtaining at least two two-dimensional subband coefficient arrays from the at least two transform coefficient blocks, where each two-dimensional subband coefficient array includes the transform coefficients that correspond to the same frequency point and that are in the at least two transform coefficient blocks, and the transform coefficients included in different two-dimensional subband coefficient arrays correspond to different frequency points; and determining a first two-dimensional subband coefficient array from the at least two two-dimensional subband coefficient arrays according to the preset frequency point scanning order. The encoding, according to a preset coefficient scanning order, each transform coefficient corresponding to the frequency point includes: determining a first transform coefficient from the first two-dimensional subband coefficient array according to the preset coefficient scanning order; and entropy encoding the first transform coefficient based on a context area corresponding to the first transform coefficient. In this solution, an encoder side may determine the first transform coefficient from the first two-dimensional subband coefficient array according to the preset coefficient scanning order, where the first transform coefficient may be any transform coefficient in the first two-dimensional subband coefficient array. The encoder side may lossless encode each transform coefficient in the first two-dimensional subband coefficient array, for example, may entropy encode the first transform coefficient based on the context area corresponding to the first transform coefficient. In some embodiments of this application, a transform coefficient in a two-dimensional subband coefficient array is encoded to obtain picture encoded information. This can implement picture compression processing.

In a possible implementation, the determining, according to a preset frequency point scanning order, the transform coefficients that are in the at least two transform coefficient blocks and that correspond to a frequency point includes: obtaining at least two two-dimensional subband coefficient arrays from the at least two transform coefficient blocks, where each two-dimensional subband coefficient array includes the transform coefficients that correspond to the same frequency point and that are in the at least two transform coefficient blocks, and the transform coefficients included in different two-dimensional subband coefficient arrays correspond to different frequency points; combining the at least two two-dimensional subband coefficient arrays according to the preset frequency point scanning order to obtain a three-dimensional subband coefficient array; and determining a first two-dimensional subband coefficient array from the three-dimensional subband coefficient array according to a preset three-dimensional subband coefficient scanning order. The encoding, according to a preset coefficient scanning order, each transform coefficient corresponding to the frequency point includes: determining a first transform coefficient from the first two-dimensional subband coefficient array according to the preset coefficient scanning order; and entropy encoding the first transform coefficient based on a context area corresponding to the first transform coefficient. In this scheme, the three-dimensional subband coefficient scanning order is an order of performing scanning for the three-dimensional subband coefficient array. After the encoder side determines the first two-dimensional subband coefficient array, the encoder side may entropy encode each transform coefficient in the first two-dimensional subband coefficient array according to the preset coefficient scanning order. In some embodiments of this application, a transform coefficient in a two-dimensional subband coefficient array is encoded to obtain picture encoded information. This can implement picture compression processing.

In a possible implementation, the determining, according to a preset frequency point scanning order, the transform coefficients that are in the at least two transform coefficient blocks and that correspond to a frequency point includes: sorting the at least two transform coefficient blocks according to the preset frequency point scanning order to obtain the sorted at least two transform coefficient blocks; obtaining, from the sorted at least two transform coefficient blocks, a plurality of two-dimensional subband coefficient arrays corresponding to different frequency points; combining the plurality of two-dimensional subband coefficient arrays corresponding to the different frequency points to obtain a three-dimensional subband coefficient array; and determining a first two-dimensional subband coefficient array from the three-dimensional subband coefficient array according to a preset three-dimensional subband coefficient scanning order. The encoding, according to a preset coefficient scanning order, each transform coefficient corresponding to the frequency point includes: determining a first transform coefficient from the first two-dimensional subband coefficient array according to the preset coefficient scanning order; and entropy encoding the first transform coefficient based on a context area corresponding to the first transform coefficient. In this solution, after the encoder side determines the first two-dimensional subband coefficient array, the encoder side may entropy encode each transform coefficient in the first two-dimensional subband coefficient array according to the preset coefficient scanning order. In some embodiments of this application, a transform coefficient in a two-dimensional subband coefficient array is encoded to obtain picture encoded information. This can implement picture compression processing.

In a possible implementation, the three-dimensional subband coefficient scanning order includes a preset change order of horizontal position indexes, a preset change order of vertical position indexes, or a preset change order of frequency indexes. In this solution, each transform coefficient in the three-dimensional subband coefficient array has one horizontal position index, one vertical position index, and one frequency index. For example, each transform coefficient may be expressed as C(bx,by,fs), where bx represents a horizontal position index, by represents a vertical position index, and fs represents a frequency index corresponding to a frequency point. The three-dimensional subband coefficient scanning order is an order of performing scanning for the three-dimensional subband coefficient array. For example, in the three-dimensional subband coefficient scanning order, a plurality of two-dimensional subband coefficient arrays in the three-dimensional subband coefficient array are determined in descending (or ascending) change order of horizontal position indexes. A transform coefficient in a two-dimensional subband coefficient array is determined according to the foregoing coefficient scanning order each time after the two-dimensional subband coefficient array is determined, that is, the three-dimensional subband coefficient scanning order may be used to indicate to sequentially encode two-dimensional subband coefficient arrays corresponding to different horizontal position indexes in the three-dimensional subband coefficient array.

In a possible implementation, the determining, according to a preset frequency point scanning order, the transform coefficients that are in the at least two transform coefficient blocks and that correspond to a frequency point includes: determining, according to the preset frequency point scanning order, a first two-dimensional subband coefficient array including the transform coefficients that correspond to the same frequency point and that are in the at least two transform coefficient blocks. The encoding, according to a preset coefficient scanning order, each transform coefficient corresponding to the frequency point includes: determining a first transform coefficient from the first two-dimensional subband coefficient array according to the preset coefficient scanning order; and entropy encoding the first transform coefficient based on a context area corresponding to the first transform coefficient. In this solution, the encoder side does not need to obtain a three-dimensional subband coefficient array through combination. After the encoder side determines the first two-dimensional subband coefficient array, the encoder side may encode each transform coefficient in the first two-dimensional subband coefficient array according to the preset coefficient scanning order. For example, the encoder side determines the first transform coefficient from the first two-dimensional subband coefficient array according to the preset coefficient scanning order, and entropy encodes the first transform coefficient based on the context area corresponding to the first transform coefficient. In some embodiments of this application, a transform coefficient in a two-dimensional subband coefficient array is encoded to obtain picture encoded information. This can implement picture compression processing.

In a possible implementation, the determining, according to a preset frequency point scanning order, the transform coefficients that are in the at least two transform coefficient blocks and that correspond to a frequency point includes: determining, according to the preset frequency point scanning order, the transform coefficients that are in the at least two transform coefficient blocks and that are included in a frequency subband, where the transform coefficients that are in the at least two transform coefficient blocks and that are included in the frequency subband correspond to the same frequency point. The encoding, according to a preset coefficient scanning order, each transform coefficient corresponding to the frequency point includes: determining, according to the preset coefficient scanning order, a first transform coefficient included in the frequency subband; and entropy encoding the first transform coefficient based on a context area corresponding to the first transform coefficient. In this solution, the first transform coefficient may be any one of a plurality of transform coefficients included in the frequency subband, and the first transform coefficient is entropy encoded based on the context area corresponding to the first transform coefficient. In some embodiments of this application, a transform coefficient in a frequency subband is encoded to obtain picture encoded information. This can implement picture compression processing.

In a possible implementation, the entropy encoding the first transform coefficient based on a context area corresponding to the first transform coefficient includes: obtaining context information of the first transform coefficient from the context area corresponding to the first transform coefficient, where the context information of the first transform coefficient includes an encoded transform coefficient in the context area corresponding to the first transform coefficient; estimating the first transform coefficient based on the context information of the first transform coefficient, to obtain probability distribution information of the first transform coefficient; and arithmetic encoding the first transform coefficient based on the probability distribution information of the first transform coefficient. In this solution, the encoder side performs probability estimation on the first transform coefficient based on the context information of the first transform coefficient, to obtain a probability distribution of the first transform coefficient. Then, the encoder side arithmetic encodes the first transform coefficient based on the probability distribution of the first transform coefficient, to obtain the picture encoded information corresponding to the first transform coefficient.

In a possible implementation, the context area corresponding to the first transform coefficient includes at least one of the following: a spatially neighboring area of the first transform coefficient, a subband neighboring area of the first transform coefficient, and a three-dimensional neighboring area of the first transform coefficient.

In a possible implementation, the entropy encoding the first transform coefficient based on a context area corresponding to the first transform coefficient includes: when the first transform coefficient is a plurality of transform coefficients, obtaining context information of the plurality of transform coefficients from a context area corresponding to the plurality of transform coefficients, where the context information of the plurality of transform coefficients includes an encoded transform coefficient in the context area corresponding to the plurality of transform coefficients; estimating the plurality of transform coefficients concurrently based on the context information of the plurality of transform coefficients, to obtain probability distribution information of the plurality of transform coefficients; and arithmetic encoding the plurality of transform coefficients concurrently based on the probability distribution information of the plurality of transform coefficients. In this solution, the encoder side may obtain the plurality of transform coefficients, and the encoder side entropy encodes the plurality of transform coefficients concurrently based on the context information of the plurality of transform coefficients. Through concurrent entropy encoding, picture encoding efficiency can be improved. For example, when obtaining a probability distribution of a coefficient, the encoder side may also perform probability estimation concurrently on probability distributions of a plurality of transform coefficients, that is, obtain the probability distributions of the plurality of transform coefficients at a time; and then arithmetic encode the plurality of transform coefficients concurrently, to improve coding efficiency.

In a possible implementation, the context area corresponding to the plurality of transform coefficients includes at least one of the following: a spatially neighboring area of the plurality of transform coefficients, a subband neighboring area of the plurality of transform coefficients, and a three-dimensional neighboring area of the plurality of transform coefficients.

In a possible implementation, the determining, according to a preset frequency point scanning order, the transform coefficients that are in the at least two transform coefficient blocks and that correspond to a frequency point includes: obtaining at least two two-dimensional subband coefficient arrays from the at least two transform coefficient blocks, where each two-dimensional subband coefficient array includes the transform coefficients that correspond to the same frequency point and that are in the at least two transform coefficient blocks, and the transform coefficients included in different two-dimensional subband coefficient arrays correspond to different frequency points; and determining, according to the preset frequency point scanning order, at least two subband pictures corresponding to the at least two two-dimensional subband coefficient arrays. The encoding, according to a preset coefficient scanning order, each transform coefficient corresponding to the frequency point includes: encoding transform coefficients in the at least two subband pictures according to the preset coefficient scanning order. In this solution, after the encoder side obtains the at least two two-dimensional subband coefficient arrays, in a manner of lossless encoding the subband pictures, the encoder side performs, according to the preset frequency point scanning order by using the at least two two-dimensional subband coefficient arrays as the at least two subband pictures, picture lossless encoding on the transform coefficients in the at least two subband pictures. During picture lossless encoding, the encoder side may encode a two-dimensional subband coefficient array as a subband picture. This simplifies an implementation process of lossless encoding.

In a possible implementation, the obtaining at least two transform coefficient blocks includes: obtaining transform coefficient encoded information of the at least two picture blocks; and entropy decoding the transform coefficient encoded information to obtain the at least two transform coefficient blocks. In this solution, the transform coefficient encoded information may be transform coefficient encoded information corresponding to at least two picture blocks. For example, the at least two picture blocks may be picture blocks in a JPEG file, the picture processing apparatus may entropy decode transform coefficient encoded information of all picture blocks in the JPEG file by using a Huffman decoding method, to obtain the at least two transform coefficient blocks corresponding to the at least two picture blocks. In some embodiments of this application, the transform coefficient encoded information is entropy decoded to obtain the at least two transform coefficient blocks, and the transform coefficient blocks may be encoded to obtain picture encoded information. In this way, picture compression processing can be implemented.

In a possible implementation, the obtaining at least two transform coefficient blocks includes: splitting an original picture area into at least two picture blocks, where the original picture area includes a pixel picture area or a residual picture area; and transforming and quantizing the at least two picture blocks to obtain the at least two transform coefficient blocks. In this solution, a transform coefficient block may be generated by transforming and quantizing a picture block, so that the transform coefficient block may be encoded to obtain picture encoded information. In this way, picture compression processing can be implemented.

According to a second aspect, an embodiment of this application further provides a picture processing method. The method includes: obtaining picture encoded information; determining, according to a preset frequency point scanning order, the to-be-decoded transform coefficients that correspond to a frequency point and that are in the picture encoded information; and decoding, according to a preset coefficient scanning order, the to-be-decoded transform coefficients corresponding to the frequency point, to obtain at least two transform coefficient blocks, where each of the at least two transform coefficient blocks includes at least two transform coefficients, and transform coefficients in a transform coefficient block correspond to different frequency points. In some embodiments of this application, the frequency point scanning order may be preset or preconfigured, and the to-be-decoded transform coefficients that correspond to the frequency point and that are in the picture encoded information are determined according to the frequency point scanning order. The frequency point may be any frequency point. The coefficient scanning order may be preset, and at least the to-be-decoded transform coefficients corresponding to the frequency point may be decoded according to the coefficient scanning order to obtain the at least two transform coefficient blocks, where each of the at least two transform coefficient blocks includes at least two transform coefficients, and transform coefficients in a transform coefficient block correspond to different frequency points. In some embodiments of this application, the to-be-decoded transform coefficients that correspond to the same frequency point and that are in picture encoded information are lossless decoded, and at least two transform coefficient blocks can be obtained only by performing decoding according to the coefficient scanning order. Therefore, a plurality of transform coefficients corresponding to the same frequency point can be decoded. In addition, in in some embodiments of this application, the picture encoded information is obtained by encoding, according to the coefficient scanning order, the transform coefficients that correspond to the same frequency point and that are in the at least two transform coefficient blocks. In this way, the file size of the picture encoded information obtained through encoding is reduced, storage costs of the picture encoded information are reduced, and storage resources are saved.

In a possible implementation, the determining, according to a preset frequency point scanning order, the to-be-decoded transform coefficients that correspond to a frequency point and that are in the picture encoded information includes: determining, according to the preset frequency point scanning order, a first to-be-decoded two-dimensional subband coefficient array from the picture encoded information, where the first to-be-decoded two-dimensional subband coefficient array includes the to-be-decoded transform coefficients that correspond to the frequency point and that are in the picture encoded information. The decoding, according to a preset coefficient scanning order, the to-be-decoded transform coefficients corresponding to the frequency point includes: determining a first to-be-decoded transform coefficient from the first to-be-decoded two-dimensional subband coefficient array according to the preset coefficient scanning order; and entropy decoding the first to-be-decoded transform coefficient based on a context area corresponding to the first to-be-decoded transform coefficient. In this solution, a decoder side uses a picture decoding manner corresponding to that of the encoder side. If the encoder side performs the encoding method shown in steps C1 to C4, the picture encoded information received by the decoder side may include at least two to-be-decoded two-dimensional subband coefficient arrays. The frequency point scanning order is an order of scanning the to-be-decoded two-dimensional subband coefficient arrays, and the first to-be-decoded two-dimensional subband coefficient array is obtained from the at least two to-be-decoded two-dimensional subband coefficient arrays according to the preset frequency point scanning order, where the first to-be-decoded two-dimensional subband coefficient array includes a plurality of to-be-decoded transform coefficients.

In a possible implementation, the determining, according to a preset frequency point scanning order, the to-be-decoded transform coefficients that correspond to a frequency point and that are in the picture encoded information includes: determining, according to the preset frequency point scanning order, a to-be-decoded three-dimensional subband coefficient array from the picture encoded information, where the to-be-decoded three-dimensional subband coefficient array includes the to-be-decoded transform coefficients that correspond to all frequency points and that are in the picture encoded information; and determining a first to-be-decoded two-dimensional subband coefficient array from the to-be-decoded three-dimensional subband coefficient array according to a preset three-dimensional subband coefficient scanning order, where the first to-be-decoded two-dimensional subband coefficient array includes the to-be-decoded transform coefficients that correspond to the frequency point and that are in the picture encoded information. The decoding, according to a preset coefficient scanning order, the to-be-decoded transform coefficients corresponding to the frequency point includes: determining a first to-be-decoded transform coefficient from the first to-be-decoded two-dimensional subband coefficient array according to the preset coefficient scanning order; and entropy decoding the first to-be-decoded transform coefficient based on a context area corresponding to the first to-be-decoded transform coefficient. In this solution, the decoder side uses a picture decoding manner corresponding to that of the encoder side. When the encoder side generates the three-dimensional subband coefficient array, the decoder side lossless decodes a second two-dimensional subband coefficient array according to the preset coefficient scanning order, to obtain the at least two transform coefficient blocks.

In a possible implementation, the three-dimensional subband coefficient scanning order includes a preset change order of horizontal position indexes, a preset change order of vertical position indexes, or a preset change order of frequency indexes.

In a possible implementation, the determining, according to a preset frequency point scanning order, the to-be-decoded transform coefficients that correspond to a frequency point and that are in the picture encoded information includes: determining, according to the preset frequency point scanning order, the to-be-decoded transform coefficients that are included in a frequency subband and that are in the picture encoded information, where the to-be-decoded transform coefficients included in the frequency subband correspond to the same frequency point. The decoding, according to a preset coefficient scanning order, the to-be-decoded transform coefficients corresponding to the frequency point includes: determining a first to-be-decoded transform coefficient from the frequency subband based on the preset coefficient scanning order; and entropy decoding the first to-be-decoded transform coefficient based on a context area corresponding to the first to-be-decoded transform coefficient. In this solution, the decoder side obtains picture encoded information corresponding to a plurality of frequency subbands. By using at least two two-dimensional subband coefficient arrays as at least two frequency subbands, the decoder side lossless decodes, in a manner of lossless decoding the frequency subbands, picture encoded information corresponding to the at least two frequency subbands according to a preset coefficient scanning order. During lossless decoding, the decoder side may decode a two-dimensional subband coefficient array as a frequency subband. This simplifies an implementation process of lossless decoding.

In a possible implementation, the entropy decoding the first to-be-decoded transform coefficient based on a context area corresponding to the first to-be-decoded transform coefficient includes: obtaining context information of the first to-be-decoded transform coefficient from the context area corresponding to the first to-be-decoded transform coefficient, where the context area corresponding to the first to-be-decoded transform coefficient includes a decoded transform coefficient in the context area corresponding to the first to-be-decoded transform coefficient; estimating the first to-be-decoded transform coefficient based on the context information of the first to-be-decoded transform coefficient, to obtain probability distribution information of the first to-be-decoded transform coefficient; and arithmetic decoding the first to-be-decoded transform coefficient based on the probability distribution information of the first to-be-decoded transform coefficient, to obtain a decoded first transform coefficient, where the decoded first transform coefficient belongs to the at least two transform coefficient blocks. In this solution, after the decoder side obtains the context information of the first transform coefficient, the decoder side entropy decodes the first transform coefficient based on the context information of the first transform coefficient, to obtain the decoded first transform coefficient. Entropy decoding performed by the decoder side may include probability estimation and arithmetic decoding. Specifically, the decoder side performs probability estimation on the first transform coefficient based on the context information of the first transform coefficient, to obtain a probability distribution of the first transform coefficient. Then, the decoder side arithmetic decodes the first transform coefficient based on the probability distribution of the first transform coefficient, to obtain picture decoded information corresponding to the first transform coefficient.

In a possible implementation, the context area corresponding to the first to-be-decoded transform coefficient includes at least one of the following: a spatially neighboring area of the first to-be-decoded transform coefficient, a subband neighboring area of the first to-be-decoded transform coefficient, and a three-dimensional neighboring area of the first to-be-decoded transform coefficient.

In a possible implementation, the entropy decoding the first to-be-decoded transform coefficient based on a context area corresponding to the first to-be-decoded transform coefficient includes: when the first to-be-decoded transform coefficient is a plurality of to-be-decoded transform coefficients, obtaining context information of the plurality of to-be-decoded transform coefficients from a context area corresponding to the plurality of to-be-decoded transform coefficients, where the context information of the plurality of to-be-decoded transform coefficients includes a decoded transform coefficient in the context area corresponding to the plurality of to-be-decoded transform coefficients; estimating the plurality of to-be-decoded transform coefficients concurrently based on the context information of the plurality of to-be-decoded transform coefficients, to obtain probability distribution information of the first to-be-decoded transform coefficient; and arithmetic decoding the plurality of to-be-decoded transform coefficients concurrently based on the probability distribution information of the plurality of to-be-decoded transform coefficients, to obtain a decoded first transform coefficient, where the decoded first transform coefficient belongs to the at least two transform coefficient blocks. In this solution, the decoder side uses a picture decoding manner corresponding to that of the encoder side. The encoder side may perform encoding concurrently during encoding. In this case, the decoder side may perform decoding concurrently, to improve picture decoding efficiency.

In a possible implementation, the context area corresponding to the plurality of to-be-decoded transform coefficients includes at least one of the following: a spatially neighboring area of the plurality of to-be-decoded transform coefficients, a subband neighboring area of the plurality of to-be-decoded transform coefficients, and a three-dimensional neighboring area of the plurality of to-be-decoded transform coefficients.

In a possible implementation, the determining, according to a preset frequency point scanning order, the to-be-decoded transform coefficients that correspond to a frequency point and that are in the picture encoded information includes: determining a first subband picture from the picture encoded information according to the preset frequency point scanning order, where the first subband picture includes the to-be-decoded transform coefficients that correspond to the frequency point and that are in the picture encoded information. The decoding, according to a preset coefficient scanning order, the to-be-decoded transform coefficients corresponding to the frequency point includes: decoding to-be-decoded coefficients of the first subband picture according to the preset coefficient scanning order, to obtain the at least two transform coefficient blocks. In this solution, after the decoder side lossless decodes a subband picture to obtain a plurality of transform coefficients, in a manner of lossless decoding a subband picture, the decoder side lossless decodes, according to the preset coefficient scanning order by using at least two two-dimensional subband coefficient arrays as at least two subband pictures, picture encoded information corresponding to the at least two subband pictures. During lossless decoding, the decoder side may decode the two-dimensional subband coefficient array as a subband picture. This simplifies an implementation process of lossless decoding.

In a possible implementation, after the obtaining at least two transform coefficient blocks, the method further includes: entropy encoding the at least two transform coefficient blocks to obtain transform coefficient encoded information; generating at least two picture blocks based on the transform coefficient encoded information; and restoring an original picture area based on the at least two picture blocks, where the original picture area includes a pixel picture area or a residual picture area. In this solution, the decoder side uses a picture decoding manner corresponding to that of the encoder side. If the encoder side entropy encodes the transform coefficient encoded information to obtain the transform coefficient blocks, and encodes the transform coefficient blocks, the decoder side may entropy decode the at least two transform coefficient blocks, to obtain the transform coefficient encoded information. In some embodiments of this application, the at least two picture blocks are generated based on the transform coefficient encoded information, and then the original picture area is restored based on the at least two picture blocks, so that picture decompression processing can be completed.

In a possible implementation, after the obtaining at least two transform coefficient blocks, the method further includes: performing dequantization and inverse transformation on the at least two transform coefficient blocks to obtain at least two picture blocks; and restoring an original picture area based on the at least two picture blocks, where the original picture area includes a pixel picture area or a residual picture area. In this solution, after generating the at least two transform coefficient blocks, the decoder side generates the at least two picture blocks based on the at least two transform coefficient blocks. The decoder side may process the at least two transform coefficient blocks through inverse transformation and dequantization, so that the at least two picture blocks can be generated.

According to a third aspect, an embodiment of this application provides a picture processing apparatus, including a transceiver module and a processing module. The transceiver module is configured to obtain at least two transform coefficient blocks, where each of the at least two transform coefficient blocks includes at least two transform coefficients, and transform coefficients in a transform coefficient block correspond to different frequency points. The processing module is configured to: determine, according to a preset frequency point scanning order, the transform coefficients that are in the at least two transform coefficient blocks and that correspond to a frequency point; and encode, according to a preset coefficient scanning order, each transform coefficient corresponding to the frequency point, to obtain picture encoded information. In some embodiments of this application, the frequency point scanning order may be preset or preconfigured, and the frequency point is determined based on the frequency point scanning order. The frequency point may be any frequency point. Each frequency point corresponds to one transform coefficient in each of the at least two transform coefficient blocks, that is, one frequency point corresponds to a plurality of transform coefficients, and the plurality of transform coefficients come from different transform coefficient blocks. The coefficient scanning order may be preset or preconfigured, and transform coefficients corresponding to the frequency point are encoded according to the coefficient scanning order, to finally obtain picture encoded information. In some embodiments of this application, the picture encoded information can be obtained only by encoding, according to the coefficient scanning order, the transform coefficients that correspond to the same frequency point and that are in the at least two transform coefficient blocks. Therefore, a plurality of transform coefficients corresponding to the same frequency point can be encoded, thereby improving picture compression efficiency. In addition, in some embodiments of this application, the picture encoded information is obtained by encoding, according to the coefficient scanning order, the transform coefficients that correspond to the same frequency point and that are in the at least two transform coefficient blocks. In this way, the file size of the picture encoded information obtained through encoding is reduced, storage costs of the picture encoded information are reduced, and storage resources are saved.

In a possible implementation, the processing module is configured to: obtain at least two two-dimensional subband coefficient arrays from the at least two transform coefficient blocks, where a two-dimensional subband coefficient array includes the transform coefficients that correspond to the same frequency point and that are in the at least two transform coefficient blocks, and the transform coefficients included in different two-dimensional subband coefficient arrays correspond to different frequency points; determine a first two-dimensional subband coefficient array from the at least two two-dimensional subband coefficient arrays according to the preset frequency point scanning order; determine a first transform coefficient from the first two-dimensional subband coefficient array according to the preset coefficient scanning order; and entropy encode the first transform coefficient based on a context area corresponding to the first transform coefficient.

In a possible implementation, the processing module is configured to: obtain at least two two-dimensional subband coefficient arrays from the at least two transform coefficient blocks, where a two-dimensional subband coefficient array includes the transform coefficients that correspond to the same frequency point and that are in the at least two transform coefficient blocks, and the transform coefficients included in different two-dimensional subband coefficient arrays correspond to different frequency points; combine the at least two two-dimensional subband coefficient arrays according to the preset frequency point scanning order to obtain a three-dimensional subband coefficient array; determine a first two-dimensional subband coefficient array from the three-dimensional subband coefficient array according to a preset three-dimensional subband coefficient scanning order; determine a first transform coefficient from the first two-dimensional subband coefficient array according to the preset coefficient scanning order; and entropy encode the first transform coefficient based on a context area corresponding to the first transform coefficient.

In a possible implementation, the processing module is configured to: sort the at least two transform coefficient blocks according to the preset frequency point scanning order to obtain the sorted at least two transform coefficient blocks; obtain, from the sorted at least two transform coefficient blocks, a plurality of two-dimensional subband coefficient arrays corresponding to different frequency points; combine the plurality of two-dimensional subband coefficient arrays corresponding to the different frequency points to obtain a three-dimensional subband coefficient array; determine a first two-dimensional subband coefficient array from the three-dimensional subband coefficient array according to a preset three-dimensional subband coefficient scanning order; determine a first transform coefficient from the first two-dimensional subband coefficient array according to the preset coefficient scanning order; and entropy encode the first transform coefficient based on a context area corresponding to the first transform coefficient.

In a possible implementation, the three-dimensional subband coefficient scanning order includes a preset change order of horizontal position indexes, a preset change order of vertical position indexes, or a preset change order of frequency indexes.

In a possible implementation, the processing module is configured to: determine, according to the preset frequency point scanning order, a first two-dimensional subband coefficient array including the transform coefficients that correspond to the same frequency point and that are in the at least two transform coefficient blocks; determine a first transform coefficient from the first two-dimensional subband coefficient array according to the preset coefficient scanning order; and entropy encode the first transform coefficient based on a context area corresponding to the first transform coefficient.

In a possible implementation, the processing module is configured to: determine, according to the preset frequency point scanning order, the transform coefficients that are in the at least two transform coefficient blocks and that are included in a frequency subband, where the transform coefficients that are in the at least two transform coefficient blocks and that are included in the frequency subband correspond to the same frequency point; determine, according to the preset coefficient scanning order, a first transform coefficient included in the frequency subband; and entropy encode the first transform coefficient based on a context area corresponding to the first transform coefficient.

In a possible implementation, the processing module is configured to: obtain context information of the first transform coefficient from the context area corresponding to the first transform coefficient, where the context information of the first transform coefficient includes an encoded transform coefficient in the context area corresponding to the first transform coefficient; estimate the first transform coefficient based on the context information of the first transform coefficient, to obtain probability distribution information of the first transform coefficient; and arithmetic encode the first transform coefficient based on the probability distribution information of the first transform coefficient.

In a possible implementation, the context area corresponding to the first transform coefficient includes at least one of the following: a spatially neighboring area of the first transform coefficient, a subband neighboring area of the first transform coefficient, and a three-dimensional neighboring area of the first transform coefficient.

In a possible implementation, the processing module is configured to: when the first transform coefficient is a plurality of transform coefficients, obtain context information of the plurality of transform coefficients from a context area corresponding to the plurality of transform coefficients, where the context information of the plurality of transform coefficients includes an encoded transform coefficient in the context area corresponding to the plurality of transform coefficients; estimate the plurality of transform coefficients concurrently based on the context information of the plurality of transform coefficients, to obtain probability distribution information of the plurality of transform coefficients; and arithmetic encode the plurality of transform coefficients concurrently based on the probability distribution information of the plurality of transform coefficients.

In a possible implementation, the context area corresponding to the plurality of transform coefficients includes at least one of the following: a spatially neighboring area of the plurality of transform coefficients, a subband neighboring area of the plurality of transform coefficients, and a three-dimensional neighboring area of the plurality of transform coefficients.

In a possible implementation, the processing module is configured to: obtain at least two two-dimensional subband coefficient arrays from the at least two transform coefficient blocks, where a two-dimensional subband coefficient array includes the transform coefficients that correspond to the same frequency point and that are in the at least two transform coefficient blocks, and the transform coefficients included in different two-dimensional subband coefficient arrays correspond to different frequency points; determine, according to the preset frequency point scanning order, at least two subband pictures corresponding to the at least two two-dimensional subband coefficient arrays; encode transform coefficients in the at least two subband pictures according to the preset coefficient scanning order.

In a possible implementation, the transceiver module is configured to: obtain transform coefficient encoded information of the at least two picture blocks; and entropy decode the transform coefficient encoded information to obtain the at least two transform coefficient blocks.

In a possible implementation, the transceiver module is configured to: split an original picture area into at least two picture blocks, where the original picture area includes a pixel picture area or a residual picture area; and transform and quantize the at least two picture blocks to obtain the at least two transform coefficient blocks.

In the third aspect of this application, composition modules of the picture processing apparatus may further perform the steps described in the first aspect and the possible implementations. For details, refer to the descriptions in the first aspect and the possible implementations.

According to a fourth aspect, an embodiment of this application further provides a picture processing apparatus, including a transceiver module and a processing module. The transceiver module is configured to obtain picture encoded information. The processing module is configured to: determine, according to a preset frequency point scanning order, the to-be-decoded transform coefficients that correspond to a frequency point and that are in the picture encoded information; and decode, according to a preset coefficient scanning order, the to-be-decoded transform coefficients corresponding to the frequency point, to obtain at least two transform coefficient blocks, where each of the at least two transform coefficient blocks includes at least two transform coefficients, and transform coefficients in a transform coefficient block correspond to different frequency points.

In a possible implementation, the processing module is configured to: determine, according to the preset frequency point scanning order, a first to-be-decoded two-dimensional subband coefficient array from the picture encoded information, where the first to-be-decoded two-dimensional subband coefficient array includes the to-be-decoded transform coefficients that correspond to the frequency point and that are in the picture encoded information; determine a first to-be-decoded transform coefficient from the first to-be-decoded two-dimensional subband coefficient array according to the preset coefficient scanning order; and entropy decode the first to-be-decoded transform coefficient based on a context area corresponding to the first to-be-decoded transform coefficient.

In a possible implementation, the processing module is configured to: determine, according to the preset frequency point scanning order, a to-be-decoded three-dimensional subband coefficient array from the picture encoded information, where the to-be-decoded three-dimensional subband coefficient array includes to-be-decoded transform coefficients that correspond to all frequency points and that are in the picture encoded information; determine a first to-be-decoded two-dimensional subband coefficient array from the to-be-decoded three-dimensional subband coefficient array according to a preset three-dimensional subband coefficient scanning order, where the first to-be-decoded two-dimensional subband coefficient array includes the to-be-decoded transform coefficients that correspond to the frequency point and that are in the picture encoded information; determine a first to-be-decoded transform coefficient from the first to-be-decoded two-dimensional subband coefficient array according to the preset coefficient scanning order; and entropy decode the first to-be-decoded transform coefficient based on a context area corresponding to the first to-be-decoded transform coefficient.

In a possible implementation, the three-dimensional subband coefficient scanning order includes a preset change order of horizontal position indexes, a preset change order of vertical position indexes, or a preset change order of frequency indexes.

In a possible implementation, the processing module is configured to: determine, according to the preset frequency point scanning order, the to-be-decoded transform coefficients that are included in a frequency subband and that are in the picture encoded information, where the to-be-decoded transform coefficients included in the frequency subband correspond to the same frequency point; determine a first to-be-decoded transform coefficient from the frequency subband based on the preset coefficient scanning order; and entropy decode the first to-be-decoded transform coefficient based on a context area corresponding to the first to-be-decoded transform coefficient.

In a possible implementation, the processing module is configured to: obtain context information of the first to-be-decoded transform coefficient from the context area corresponding to the first to-be-decoded transform coefficient, where the context area corresponding to the first to-be-decoded transform coefficient includes a decoded transform coefficient in the context area corresponding to the first to-be-decoded transform coefficient; estimate the first to-be-decoded transform coefficient based on the context information of the first to-be-decoded transform coefficient, to obtain probability distribution information of the first to-be-decoded transform coefficient; and arithmetic decode the first to-be-decoded transform coefficient based on the probability distribution information of the first to-be-decoded transform coefficient, to obtain a decoded first transform coefficient, where the decoded first transform coefficient belongs to the at least two transform coefficient blocks.

In a possible implementation, the context area corresponding to the first to-be-decoded transform coefficient includes at least one of the following: a spatially neighboring area of the first to-be-decoded transform coefficient, a subband neighboring area of the first to-be-decoded transform coefficient, and a three-dimensional neighboring area of the first to-be-decoded transform coefficient.

In a possible implementation, the processing module is configured to: when the first to-be-decoded transform coefficient is a plurality of to-be-decoded transform coefficients, obtain context information of the plurality of to-be-decoded transform coefficients from a context area corresponding to the plurality of to-be-decoded transform coefficients, where the context information of the plurality of to-be-decoded transform coefficients includes a decoded transform coefficient in the context area corresponding to the plurality of to-be-decoded transform coefficients; estimate the plurality of to-be-decoded transform coefficients concurrently based on the context information of the plurality of to-be-decoded transform coefficients, to obtain probability distribution information of the first to-be-decoded transform coefficient; and arithmetic decode the plurality of to-be-decoded transform coefficients concurrently based on the probability distribution information of the plurality of to-be-decoded transform coefficients, to obtain a decoded first transform coefficient, where the decoded first transform coefficient belongs to the at least two transform coefficient blocks.

In a possible implementation, the context area corresponding to the plurality of to-be-decoded transform coefficients includes at least one of the following: a spatially neighboring area of the plurality of to-be-decoded transform coefficients, a subband neighboring area of the plurality of to-be-decoded transform coefficients, and a three-dimensional neighboring area of the plurality of to-be-decoded transform coefficients.

In a possible implementation, the processing module is configured to: determine a first subband picture from the picture encoded information according to the preset frequency point scanning order, where the first subband picture includes the to-be-decoded transform coefficients that correspond to the frequency point and that are in the picture encoded information; and decode to-be-decoded coefficients of the first subband picture according to the preset coefficient scanning order, to obtain the at least two transform coefficient blocks.

In a possible implementation, the processing module is further configured to: after obtaining the at least two transform coefficient blocks, entropy encode the at least two transform coefficient blocks to obtain transform coefficient encoded information; generate at least two picture blocks based on the transform coefficient encoded information; and restore an original picture area based on the at least two picture blocks, where the original picture area includes a pixel picture area or a residual picture area.

In a possible implementation, the processing module is further configured to: after obtaining the at least two transform coefficient blocks, perform dequantization and inverse transformation on the at least two transform coefficient blocks to obtain at least two picture blocks; and restore an original picture area based on the at least two picture blocks, where the original picture area includes a pixel picture area or a residual picture area.

In the fourth aspect of this application, composition modules of the picture processing apparatus may further perform the steps described in the second aspect and the possible implementations. For details, refer to the descriptions in the second aspect and the possible implementations.

According to a fifth aspect, an embodiment of this application provides a computer-readable storage medium. The computer-readable storage medium stores instructions. When the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a picture processing apparatus. The picture processing apparatus may include an entity, for example, a picture encoding apparatus, a picture decoding apparatus, or a chip. The picture processing apparatus includes a processor. The picture processing apparatus may further include a memory. The memory is configured to store instructions. The processor is configured to execute the instructions in the memory, so that the picture processing apparatus performs the method according to the first aspect or the second aspect.

According to an eighth aspect, an embodiment of this application provides a computer-readable storage medium. The computer-readable storage medium stores instructions. When the instructions are run on a computer, the computer is enabled to perform the method according to the first aspect or the second aspect.

According to a ninth aspect, an embodiment of this application provides a computer program product including instructions. When the computer program product runs on a computer, the computer is enabled to perform the method according to the first aspect or the second aspect.

According to a tenth aspect, this application provides a chip system. The chip system includes a processor, configured to support a picture encoding apparatus or a picture decoding apparatus to implement functions in the first aspect or the second aspect, for example, send or process data and/or information in the foregoing methods. In a possible design, the chip system further includes a memory. The memory is configured to store necessary program instructions and data of the picture encoding apparatus or the picture decoding apparatus. The chip system may include a chip, or may include a chip and another discrete component.

DESCRIPTION OF EMBODIMENTS

Embodiments of this application provide a picture processing method and apparatus, to improve picture compression efficiency and reduce storage costs of picture encoded information.

The following describes embodiments of this application with reference to the accompanying drawings.

In the specification, claims, and accompanying drawings of this application, terms "first", "second", and the like are intended to distinguish between similar objects, but do not necessarily indicate a specific order or sequence. It should be understood that terms used in such a way are interchangeable in appropriate circumstances, which is merely a distinguishing manner that is used when objects having the same attribute are described in embodiments of this application. In addition, terms "include", "comprise" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
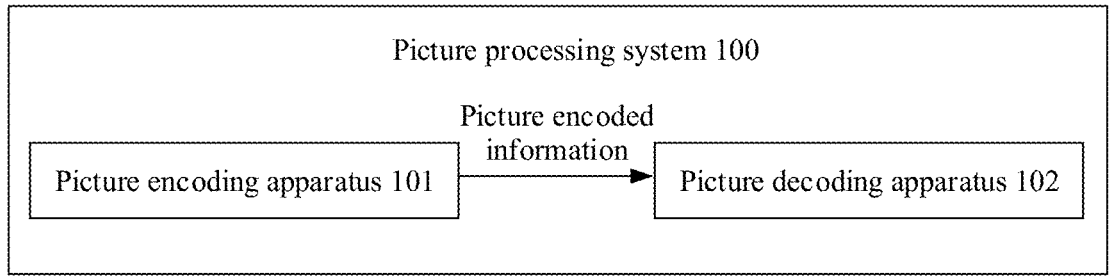
FIG. 1 is a schematic diagram of a composition structure of a picture processing system according to an embodiment of this application.

The technical solutions in embodiments of this application may be applied to various picture processing systems. FIG. 1 is a schematic diagram of a composition structure of a picture processing system according to an embodiment of this application. The picture processing system 100 may include a picture encoding apparatus 101 and a picture decoding apparatus 102. The picture encoding apparatus 101 may be configured to generate picture encoded information based on at least two transform coefficient blocks. For example, the at least two transform coefficient blocks may be generated based on at least two picture blocks corresponding to an original picture area. The original picture area may be an entire picture, a rectangular picture area, or a picture area in another shape. This is not limited herein. For example, the original picture area includes a pixel picture area or a residual picture area. In addition, the picture encoded information may be a picture encoded bitstream (which may also be referred to as a compressed bitstream), and the picture encoded information may be transmitted to the picture decoding apparatus 102 through a picture transmission channel. The picture decoding apparatus 102 may receive the picture encoded information, and then, the picture decoding apparatus 102 may decode the picture encoded information to obtain the at least two transform coefficient blocks. For example, the at least two transform coefficient blocks may be further used to restore an original picture.

In some embodiments of this application, the picture encoding apparatus may be used in any terminal device that has a picture communication requirement, or any wireless device or core network device that has a picture transcoding requirement. For example, the picture encoding apparatus may be a picture encoder of the foregoing terminal device, wireless device, or core network device. Similarly, the picture decoding apparatus may be used in any terminal device that has a picture communication requirement, or any wireless device or core network device that has a picture transcoding requirement. For example, the picture decoding apparatus may be a picture decoder of the foregoing terminal device, wireless device, or core network device.

For example, the picture encoding apparatus is a picture encoder, and the picture decoding apparatus is a picture decoder. The terminal device may include a picture encoder and a channel encoder, or the terminal device may include a picture decoder and a channel decoder. Specifically, the channel encoder is configured to perform channel encoding on a picture signal, the channel decoder is configured to perform channel decoding on the picture signal, and the picture encoder is configured to encode an original picture area. For example, the picture encoder has a lossless encoding function. The picture decoder is configured to decode picture encoded information. For example, the picture decoder has a lossless decoding function. For example, an available lossless encoding method includes entropy encoding, Huffman encoding, and the like. For example, an available lossless decoding method includes entropy decoding, Huffman decoding, and the like.

Figure 2:
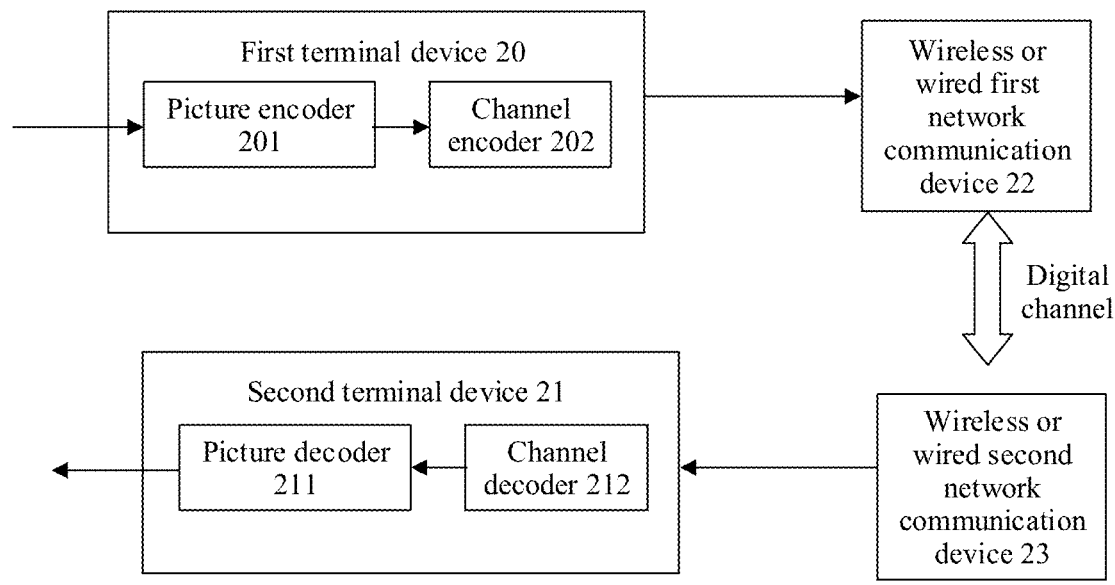
FIG. 2 is a schematic diagram of using a picture encoding apparatus and a picture decoding apparatus in a terminal device according to an embodiment of this application.

FIG. 2 is a schematic diagram of using a picture encoding apparatus and a picture decoding apparatus in a terminal device according to an embodiment of this application. A first terminal device 20 may include a picture encoder 201 and a channel encoder 202. A second terminal device 21 may include a picture decoder 211 and a channel decoder 212. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be a signal transmission device in general, for example, a communication base station or a data switching device.

In picture communication, a terminal device serving as a transmit end performs picture encoding on a collected picture signal, performs channel encoding, and then transmits an encoded signal on a digital channel by using a wireless network or a core network. A terminal device serving as a receive end performs channel decoding based on the received signal to obtain a picture signal encoded bitstream, and then restores the picture signal through picture decoding, and the terminal device serving as the receive end plays back the picture signal.

An embodiment of this application provides encoding for a transform coefficient block corresponding to an original picture area, to improve picture encoding performance, further save storage resources, and further improve picture encoding efficiency. For example, a current compressed file generated through entropy encoding consumes a large quantity of storage resources on a server side. This embodiment of this application may be applied to efficient transcoding of an entropy encoded picture. Embodiments of this application may be further applied to a server side, to transcode a compressed file generated through entropy encoding. This can improve picture encoding performance, and further save storage resources.

Figure 3:
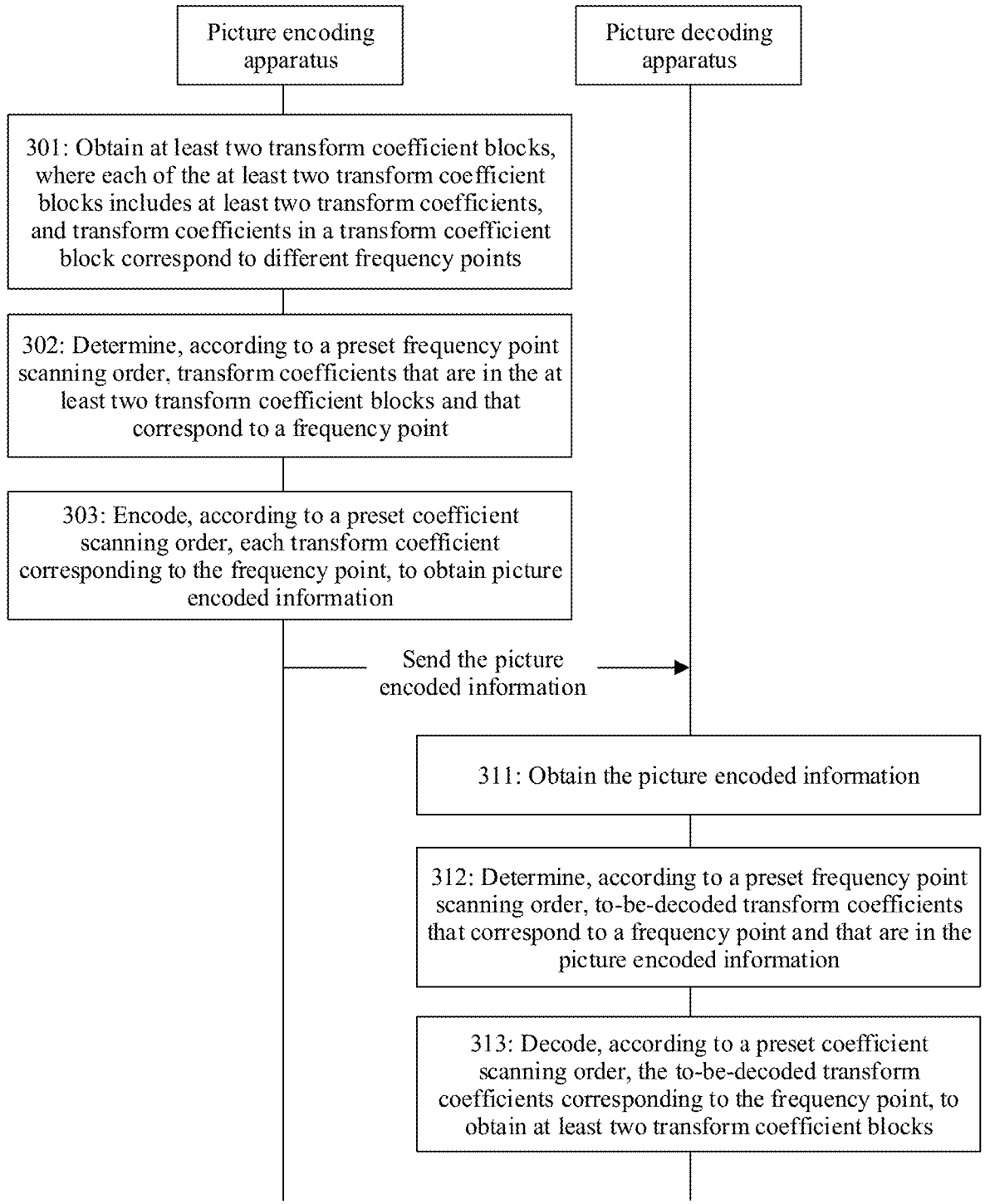
FIG. 3 is a schematic flowchart of interaction between a picture encoding apparatus and a picture decoding apparatus according to an embodiment of this application.

The following describes a picture processing method provided in an embodiment of this application based on the foregoing system architecture, picture encoding apparatus, and picture decoding apparatus. FIG. 3 is a schematic flowchart of interaction between a picture encoding apparatus and a picture decoding apparatus according to an embodiment of this application. The following steps 301 to 303 may be performed by the picture encoding apparatus (hereinafter referred to as an encoder side). The following steps 311 to 313 may be performed by the picture decoding apparatus (hereinafter referred to as a decoder side). The following process is mainly provided.

301: Obtain at least two transform coefficient blocks, where each of the at least two transform coefficient blocks includes at least two transform coefficients, and transform coefficients in a transform coefficient block correspond to different frequency points.

That each of the at least two transform coefficient blocks includes at least two transform coefficients, and transform coefficients in a transform coefficient block correspond to different frequency points is as follows: All transform coefficients in each of the transform coefficient blocks have different frequency points, and each transform coefficient includes frequency point information. Each transform coefficient may further include position information in addition to a frequency point.

A frequency point of a transform coefficient may be represented by (fx,fy), and fx and fy represent values of two-dimensional frequency coordinates corresponding to the frequency point. Position information of a transform coefficient may be represented by (bx,by), and bx and by represent values of two-dimensional position coordinates of the transform coefficient. Each transform coefficient in a transform coefficient block may be represented by $C\_(bx,by)^{(fx,fy)}$. In addition, frequency indexes may be set for different frequency points. For example, a frequency index is fs.

In some embodiments of this application, step 301 of obtaining at least two transform coefficient blocks includes:

A1: Split an original picture area into at least two picture blocks, where the original picture area includes a pixel picture area or a residual picture area.

A2: Transform and quantize the at least two picture blocks to obtain the at least two transform coefficient blocks.

The original picture area (which may also be an original picture for short) may be an entire picture, a rectangular picture area, or a picture area of another shape. The original picture area is a to-be-encoded (or referred to as a to-be-processed) picture. The encoder side splits the to-be-processed picture or a to-be-processed picture area into at least two picture blocks of the same preset size. For example, the picture subblocks of the preset size may have sizes of 4×4, 8×8, 16×16, 32×32, 64×64, 128×128, 256×256, and the like. In some embodiments of this application, the picture block is obtained by splitting the original picture, or the picture block is transmitted to the encoder side by an external device of the encoder side. The picture block may also be referred to as a subpicture, a picture subblock, or the like.

It should be noted that, in some embodiments of this application, picture data included in the picture block may include a luminance component, a chrominance component, an R component, a G component, a B component, and the like.

In some embodiments of this application, after splitting the to-be-processed original picture area into the picture blocks of the preset size, the encoder side may transform and quantize each picture block to obtain at least two transform coefficient blocks. For example, after the encoder side obtains the at least two picture blocks, the encoder side obtains at least two transform coefficient blocks based on the at least two picture blocks. One transform coefficient block may be generated for each picture block, and picture blocks one-to-one correspond to transform coefficient blocks. A transform coefficient block is a data block including a plurality of transform coefficients. For example, the transform coefficient block may be obtained by performing discrete cosine transform (DCT) on a picture block. For example, in DCT transform, f_m represents a transform coefficient corresponding to a frequency point (for example, a frequency point m), k=0, . . . , n−1, k represents a position of a pixel, x_k represents a pixel value in a position k and f_m=Σ_(k=0)^(n−1) ⟮ x_k cos[πm/n](k+½)] ⟯.

In some embodiments of this application, a picture block may be transformed and quantized to generate a transform coefficient block, so that the transform coefficient block may be encoded to obtain picture encoded information. In this way, picture compression processing can be implemented.

In some embodiments of this application, step 301 of obtaining at least two transform coefficient blocks includes:

B1: Obtain transform coefficient encoded information of at least two picture blocks.

B2: Entropy decode the transform coefficient encoded information to obtain the at least two transform coefficient blocks.

The transform coefficient encoded information may be the transform coefficient encoded information corresponding to the at least two picture blocks. For example, the at least two picture blocks may be picture blocks in a JPEG file, the picture processing apparatus may entropy decode transform coefficient encoded information of all picture blocks in the JPEG file by using a Huffman decoding method, to obtain the at least two transform coefficient blocks corresponding to the at least two picture blocks. In some embodiments of this application, the transform coefficient encoded information is entropy decoded to obtain the at least two transform coefficient blocks, and the transform coefficient blocks may be encoded to obtain picture encoded information. In this way, picture compression processing can be implemented.

302: Determine, according to a preset frequency point scanning order, the transform coefficients that are in the at least two transform coefficient blocks and that correspond to a frequency point.

303: Encode, according to a preset coefficient scanning order, each transform coefficient corresponding to the frequency point, to obtain picture encoded information.

In some embodiments of this application, the frequency point scanning order may be preset or preconfigured on the encoder side. The frequency point scanning order is a sequence in which frequency points are scanned. Each of the at least two transform coefficient blocks includes at least two transform coefficients, and transform coefficients in a transform coefficient block correspond to different frequency points. Therefore, a frequency point scanning order may be set for all the frequency points, and a frequency point is determined according to the frequency point scanning order. Similarly, different frequency points may be determined in sequence according to the frequency point scanning order. In step 302 and step 303, an encoding processing procedure for a frequency point is used as an example. All encoding processing procedures for other frequency points may be implemented based on step 302 and step 303 and detailed procedures included in step 302 and step 303.

In some embodiments of this application, the at least two transform coefficient blocks may be N transform coefficient blocks, and a transform coefficient that is in each of the at least two transform coefficient blocks and that corresponds to a frequency point may be a transform coefficient that is in each of the N transform coefficient blocks and that corresponds to a frequency point. In this case, one frequency point corresponds to N transform coefficients, and the N transform coefficients respectively come from each of the N transform coefficient blocks. A value of N may be a positive integer, for example, N is an integer greater than or equal to 2.

In some embodiments of this application, the coefficient scanning order may be preset or preconfigured on the encoder side. The coefficient scanning order is a sequence in which transform coefficients are scanned. One transform coefficient corresponding to the frequency point is determined according to the preset coefficient scanning order, then the determined transform coefficient is encoded, other transform coefficients corresponding to the frequency point may be sequentially determined according to the coefficient scanning order in step 302, and then the sequentially determined transform coefficients are encoded to finally obtain picture encoded information.

In some embodiments of this application, after obtaining the at least two transform coefficient blocks, the encoder side may encode a plurality of transform coefficients that correspond to the same frequency point and that are in the at least two transform coefficient blocks. For example, an available lossless encoding method includes entropy encoding, Huffman encoding, and the like. It is not limited that a deep network is used for entropy encoding. In some embodiments of this application, and a structure of the deep network is not limited.

After all transform coefficients corresponding to a frequency point are encoded, a next frequency point is determined according to a preset frequency point scanning order, a plurality of transform coefficients corresponding to the next frequency point are encoded, and all frequency points are obtained in sequence according to the frequency point scanning order. After lossless encoding is completed for transform coefficients corresponding to all frequency points, the encoder side may generate picture encoded information. After the encoder side generates the picture encoded information, the encoder side may write the picture encoded information into a bitstream, and then the encoder side sends the bitstream to the decoder side.

The frequency point scanning order is a sequence in which frequency points are selected during encoding, and the frequency point scanning order is referred to as a "preset order" or a "preset order 1" for short in the following embodiments. The frequency point scanning order may be implemented in a plurality of implementations. For example, the frequency point scanning order may be a processing order obtained through zig-zag scanning, or may be a processing order obtained by using another scanning method, for example, row-by-row scanning, column-by-column scanning, diagonal scanning, horizontal reverse scanning, or vertical reverse scanning. Row-by-row scanning is to perform continuous scanning from a first row to a last row of a picture. Column-by-column scanning is to perform continuous scanning from a first column to a last column of the picture. Diagonal scanning is to perform continuous scanning from the first row to the last row of the picture diagonally. Horizontal reverse scanning is to perform continuous scanning from the last row to the first row of the picture in a horizontal direction. Vertical reverse scanning is to perform continuous scanning from the last row to the first row of the picture in a vertical direction. The coefficient scanning order is a sequence in which transform coefficients are selected during encoding. The coefficient scanning order is a "preset order" or a "preset order 2" for short in the following embodiments. The coefficient scanning order may be implemented in a plurality of implementations. For example, the coefficient scanning order may be a processing order obtained through zig-zag scanning, or may be a processing order obtained by using another scanning method, for example, row-by-row scanning, column-by-column scanning, diagonal scanning, horizontal reverse scanning, or vertical reverse scanning.

The frequency point scanning order and the coefficient scanning order are the same picture scanning order, or the frequency point scanning order and the coefficient scanning order are different picture scanning orders. This is not limited herein.

For example, all transform coefficients corresponding to a frequency point (fx=0,fy=0) are first obtained according to a frequency point scanning order, then one transform coefficient corresponding to the frequency point (fx=0, fy=0) is obtained according to a coefficient scanning order, the transform coefficient is encoded, then a next transform coefficient corresponding to the frequency point (fx=0,fy=0) is obtained according to the coefficient scanning order, and the next transform coefficient is encoded until all transform coefficients corresponding to the frequency point (fx=0, fy=0) are encoded according to the coefficient scanning order. After all the transform coefficients corresponding to the frequency point (fx=0, fy=0) are encoded, all transform coefficients corresponding to a frequency point (fx=0, fy=1) are obtained, all the transform coefficients corresponding to the frequency point (fx=0, fy=1) are encoded, and transform coefficients corresponding to all frequency points are sequentially determined according to the frequency point scanning order and encoded. After all the transform coefficients corresponding to all the frequency points are encoded, the encoder side may output picture encoded information.

In some embodiments of this application, step 302 of determining, according to a preset frequency point scanning order, the transform coefficients that are in the at least two transform coefficient blocks and that correspond to a frequency point includes:

C1: Obtain at least two two-dimensional subband coefficient arrays from the at least two transform coefficient blocks, where a two-dimensional subband coefficient array includes the transform coefficients that correspond to the same frequency point and that are in the at least two transform coefficient blocks, and the transform coefficients included in different two-dimensional subband coefficient arrays correspond to different frequency points.

C2: Determine a first two-dimensional subband coefficient array from the at least two two-dimensional subband coefficient arrays according to the preset frequency point scanning order.

Step 303 of encoding, according to a preset coefficient scanning order, each transform coefficient corresponding to the frequency point includes:

C3: Determine a first transform coefficient from the first two-dimensional subband coefficient array according to the preset coefficient scanning order.

C4: Entropy encode the first transform coefficient based on a context area corresponding to the first transform coefficient.

The encoder side may arrange the at least two transform coefficient blocks based on different frequency points, to obtain the at least two two-dimensional subband coefficient arrays. A two-dimensional subband coefficient array includes the transform coefficients that are in a transform coefficient block and that correspond to a frequency point, and different two-dimensional subband coefficient arrays have different frequency points. That is, the encoder side may group the transform coefficients that are in at least two transform coefficient blocks and that correspond to the same frequency point into one two-dimensional subband coefficient array. Therefore, a two-dimensional subband coefficient array corresponding to a plurality of frequency points may be obtained based on the plurality of frequency points.

For example, transform coefficient values that correspond to a specified frequency point and that are in an 8×8 transform coefficient block in a picture are obtained, to form a two-dimensional subband coefficient array corresponding to the frequency point. After two-dimensional subband coefficient arrays obtained based on transform coefficient values that correspond to the frequency point and that are in all 8×8 transform coefficient blocks in the picture are obtained, similarly, a two-dimensional subband coefficient array corresponding to a remaining frequency point is obtained. An 8×8 transform coefficient block has a total of 64 frequency points. Therefore, 64 two-dimensional subband coefficient arrays of a current encoded picture can be obtained.

The encoder side combines the transform coefficients of the at least two transform coefficient blocks based on different frequency points to obtain the at least two two-dimensional subband coefficient arrays, and obtains the first two-dimensional subband coefficient array from the at least two two-dimensional subband coefficient arrays according to the preset frequency point scanning order. The first two-dimensional subband coefficient array is a two-dimensional subband coefficient array in the at least two two-dimensional subband coefficient arrays, the first two-dimensional subband coefficient array is a two-dimensional subband coefficient array obtained according to the frequency point scanning order, and the first two-dimensional subband coefficient array includes a plurality of transform coefficients. The encoder side may determine the first transform coefficient from the first two-dimensional subband coefficient array according to the preset coefficient scanning order, where the first transform coefficient may be any transform coefficient in the first two-dimensional subband coefficient array. The encoder side may lossless encode each transform coefficient in the first two-dimensional subband coefficient array, for example, may entropy encode the first transform coefficient based on the context area corresponding to the first transform coefficient. In some embodiments of this application, a transform coefficient in a two-dimensional subband coefficient array is encoded to obtain picture encoded information. This can implement picture compression processing.

The frequency point scanning order may be a sequence in which the two-dimensional subband coefficient arrays are scanned, and the coefficient scanning order is a sequence in which transform coefficients in the two-dimensional subband coefficient array are scanned. The frequency point scanning order is a "preset order 1" for short in the following embodiments, and the coefficient scanning order is a "preset order 2" for short in the following embodiments.

In some embodiments of this application, step 302 of determining, according to a preset frequency point scanning order, the transform coefficients that are in the at least two transform coefficient blocks and that correspond to a frequency point includes:

D1: Obtain at least two two-dimensional subband coefficient arrays from the at least two transform coefficient blocks, where a two-dimensional subband coefficient array includes the transform coefficients that correspond to the same frequency point and that are in the at least two transform coefficient blocks, and the transform coefficients included in different two-dimensional subband coefficient arrays correspond to different frequency points.

D2: Combine the at least two two-dimensional subband coefficient arrays according to the preset frequency point scanning order to obtain a three-dimensional subband coefficient array.

D3: Determine a first two-dimensional subband coefficient array from the three-dimensional subband coefficient array according to a preset three-dimensional subband coefficient scanning order.

Step 303 of encoding, according to a preset coefficient scanning order, each transform coefficient corresponding to the frequency point includes:

D4: Determine a first transform coefficient from the first two-dimensional subband coefficient array according to the preset coefficient scanning order.

D5: Entropy encode the first transform coefficient based on a context area corresponding to the first transform coefficient.

A difference between the scenario with steps D1 to D5 and the scenario with steps C1 to C4 lies in that the three-dimensional subband coefficient array needs to be generated in the scenario with steps D1 to D5, and the first transform coefficient in the first two-dimensional subband coefficient array in the three-dimensional subband coefficient array is encoded, while no three-dimensional subband coefficient array is generated in the scenario with steps C1 to C4.

Specifically, the following describes steps D1 to D5. After generating the at least two two-dimensional subband coefficient arrays, the encoder side combines the at least two two-dimensional subband coefficient arrays according to the preset frequency point scanning order to obtain the three-dimensional subband coefficient array. That is, one frequency point corresponds to one two-dimensional subband coefficient array, and the two-dimensional subband coefficient arrays respectively corresponding to all the frequency points may be combined according to the preset frequency point scanning order to obtain the three-dimensional subband coefficient array.

The three-dimensional subband coefficient array includes a plurality of two-dimensional subband coefficient arrays. The encoder side first determines a two-dimensional subband coefficient array from the three-dimensional subband coefficient array according to a preset three-dimensional subband coefficient scanning order, for example, determines the first two-dimensional subband coefficient array. The first two-dimensional subband coefficient array is a two-dimensional subband coefficient array in the three-dimensional subband coefficient array. The three-dimensional subband coefficient scanning order is an order of performing scanning for the three-dimensional subband coefficient array. After the encoder side determines the first two-dimensional subband coefficient array, the encoder side may entropy encode each transform coefficient in the first two-dimensional subband coefficient array according to the preset coefficient scanning order. In some embodiments of this application, a transform coefficient in a two-dimensional subband coefficient array is encoded to obtain picture encoded information. This can implement picture compression processing.

In some embodiments of this application, step 302 of determining, according to a preset frequency point scanning order, the transform coefficients that are in the at least two transform coefficient blocks and that correspond to a frequency point includes:

E1: Sort the at least two transform coefficient blocks according to the preset frequency point scanning order to obtain the sorted at least two transform coefficient blocks.

E2: Obtain, from the sorted at least two transform coefficient blocks, a plurality of two-dimensional subband coefficient arrays corresponding to different frequency points.

E3: Combine the plurality of two-dimensional subband coefficient arrays corresponding to the different frequency points to obtain a three-dimensional subband coefficient array.

E4: Determine a first two-dimensional subband coefficient array from the three-dimensional subband coefficient array according to a preset three-dimensional subband coefficient scanning order.

Step 303 of encoding, according to a preset coefficient scanning order, each transform coefficient corresponding to the frequency point includes:

E5: Determine a first transform coefficient from the first two-dimensional subband coefficient array according to the preset coefficient scanning order.

E6: Entropy encode the first transform coefficient based on a context area corresponding to the first transform coefficient.

A difference between the scenario with steps E1 to E6 and the scenario with steps D1 to D5 lies in that a manner in which the three-dimensional subband coefficient array is obtained in the scenario with steps E1 to E6 is different from a manner in which the three-dimensional subband coefficient array is obtained in steps D1 to D5. That is, in the scenario with steps E1 to E6, the at least two transform coefficient blocks are first sorted, then the plurality of two-dimensional subband coefficient arrays corresponding to the different frequency points are determined based on different frequency points, and the plurality of two-dimensional subband coefficient arrays corresponding to the different frequency points are combined to obtain the three-dimensional subband coefficient array.

Specifically, the following describes steps E1 to E6. After obtaining the plurality of two-dimensional subband coefficient arrays, the encoder side combines the plurality of two-dimensional subband coefficient arrays to obtain the three-dimensional subband coefficient array, where the three-dimensional subband coefficient array includes the plurality of two-dimensional subband coefficient arrays. The encoder side first determines a two-dimensional subband coefficient array from the three-dimensional subband coefficient array according to the preset three-dimensional subband coefficient scanning order, for example, determines the first two-dimensional subband coefficient array, where the first two-dimensional subband coefficient array is a two-dimensional subband coefficient array in the three-dimensional subband coefficient array. The three-dimensional subband coefficient scanning order is an order of performing scanning for the three-dimensional subband coefficient array. After the encoder side determines the first two-dimensional subband coefficient array, the encoder side may entropy encode each transform coefficient in the first two-dimensional subband coefficient array according to the preset coefficient scanning order. In some embodiments of this application, a transform coefficient in a two-dimensional subband coefficient array is encoded to obtain picture encoded information. This can implement picture compression processing.

For example, the encoder side sorts all transform coefficients in a transform coefficient block (hereinafter referred to as a coefficient block for short) according to a frequency point scanning order, and then obtains and combine coefficients corresponding to the same frequency point, to obtain a three-dimensional subband coefficient array. For example, the transform coefficient block may be an 8×8 transform coefficient block. All transform coefficients in the 8×8 transform coefficient blocks are arranged according to the frequency point scanning order to obtain the sorted 8×8 transform coefficient blocks. Transform coefficient values that correspond to a specified frequency point and that are in the 8×8 transform coefficient blocks in a picture are obtained, to form two-dimensional subband coefficient arrays corresponding to the frequency point, and two-dimensional subband coefficient arrays corresponding to a plurality of frequency points are combined to obtain a three-dimensional subband coefficient array. After obtaining the three-dimensional subband coefficient array, the encoder side may further perform encoding processing on each transform coefficient in the three-dimensional subband coefficient array. For details, refer to examples of an encoding procedure in the following embodiments.

Further, in some embodiments of this application, the three-dimensional subband coefficient scanning order includes: a preset change order of horizontal position indexes; a preset change order of vertical position indexes; or a preset change order of frequency indexes.

Each transform coefficient in the three-dimensional subband coefficient array has one horizontal position index, one vertical position index, and one frequency index. For example, each transform coefficient may be expressed as C(bx,by,fs), where bx is a horizontal position index, and by is a vertical position index, fs is a frequency index corresponding to a frequency point. The three-dimensional subband coefficient scanning order is an order of performing scanning for the three-dimensional subband coefficient array. For example, in the three-dimensional subband coefficient scanning order, a plurality of two-dimensional subband coefficient arrays in the three-dimensional subband coefficient array are determined in descending (or ascending) change order of horizontal position indexes. A transform coefficient in a two-dimensional subband coefficient array is determined according to the foregoing coefficient scanning order each time after the two-dimensional subband coefficient array is determined, that is, the three-dimensional subband coefficient scanning order may be used to indicate to sequentially encode two-dimensional subband coefficient arrays corresponding to different horizontal position indexes in the three-dimensional subband coefficient array.

For another example, in the three-dimensional subband coefficient scanning order, a plurality of two-dimensional subband coefficient arrays in the three-dimensional subband coefficient array are determined in descending (or ascending) change order of vertical position indexes. A transform coefficient in a two-dimensional subband coefficient array is determined according to the foregoing coefficient scanning order each time after the two-dimensional subband coefficient array is determined, that is, the three-dimensional subband coefficient scanning order may be used to indicate to sequentially encode two-dimensional subband coefficient arrays corresponding to different vertical position indexes in the three-dimensional subband coefficient array.

For another example, in the three-dimensional subband coefficient scanning order, a plurality of two-dimensional subband coefficient arrays in the three-dimensional subband coefficient array are determined in descending (or ascending) change order of frequency indexes. A transform coefficient in a two-dimensional subband coefficient array is determined according to the foregoing coefficient scanning order each time after the two-dimensional subband coefficient array is determined, that is, the three-dimensional subband coefficient scanning order may be used to indicate to sequentially encode two-dimensional subband coefficient arrays corresponding to different frequency indexes in the three-dimensional subband coefficient array. Specifically, a specific implementation of the three-dimensional subband coefficient scanning order may be determined based on an application scenario, which is not limited herein.

There are a plurality of implementations for the three-dimensional subband coefficient scanning order, which are described as follows by using examples:

The three-dimensional subband coefficient array is expressed as C(bx,by,fs). (bx,by) represents a horizontal position index and a vertical position index of a transform coefficient block, bx=0, . . . , M−1, by=0, . . . , N−1, M=W/subW, N=H/subH, and where M is a maximum quantity of picture blocks in a horizontal direction on a per-picture block basis, N is a maximum quantity of picture blocks in a vertical direction on a per-picture block basis, W represents the width value of a current picture, H represents the height value of the current picture, subW represents the width value of a picture block in the current picture, and subH represents the height value of the picture block in the current picture. (fx,fy) represents a frequency point of each transform coefficient in a transform coefficient block, and fs represents a frequency index corresponding to each frequency point, where fx=0, . . . , subW−1, and fy=0, . . . , subH−1.

Method 1: When each transform coefficient in the three-dimensional subband coefficient array C(bx,by,fs) is processed, two-dimensional coefficient subband arrays at each layer fs satisfying fs=0 to subW×subH−1 are processed in sequence. When the two-dimensional coefficient subband arrays at each layer are processed, each transform coefficient in a two-dimensional coefficient subband array C(bx,by) is processed according to the foregoing coefficient scanning order.

Method 2: When each transform coefficient in the three-dimensional subband coefficient array C(bx,by,fs) is processed, two-dimensional coefficient subband arrays at each layer bx satisfying bx=0 to M−1 are processed in sequence. When the two-dimensional coefficient subband arrays at each layer are processed, each transform coefficient in a two-dimensional coefficient subband array C(by,fs) is processed according to the foregoing coefficient scanning order.

Method 3: When each transform coefficient in the three-dimensional subband coefficient array C(bx,by,fs) is processed, two-dimensional coefficient subband arrays at each layer by satisfying by=0 to N−1 are processed in sequence. When the two-dimensional coefficient subband arrays at each layer are processed, each transform coefficient in the two-dimensional coefficient subband array C(bx, fs) according to the preset coefficient scanning order.

It should be noted that the preset coefficient scanning order may be a zig-zag scanning order, a row-by-row scanning order, a column-by-column scanning order, or the like.

In some embodiments of this application, step 302 of determining, according to a preset frequency point scanning order, the transform coefficients that are in the at least two transform coefficient blocks and that correspond to a frequency point includes:

F1: Determine, according to the preset frequency point scanning order, a first two-dimensional subband coefficient array including the transform coefficients that correspond to the same frequency point and that are in the at least two transform coefficient blocks.

Step 303 of encoding, according to a preset coefficient scanning order, each transform coefficient corresponding to the frequency point includes:

F2: Determine a first transform coefficient from the first two-dimensional subband coefficient array according to the preset coefficient scanning order.

F3: Entropy encode the first transform coefficient based on a context area corresponding to the first transform coefficient.

Specifically, after the encoder side obtains the at least two transform coefficient blocks, the encoder side may further obtain, from the at least two transform coefficient blocks according to the preset frequency point scanning order, the first two-dimensional subband coefficient array including the transform coefficients that correspond to the same frequency point. The encoder side does not need to obtain a three-dimensional subband coefficient array through combination. After the encoder side determines the first two-dimensional subband coefficient array, the encoder side may encode each transform coefficient in the first two-dimensional subband coefficient array according to the preset coefficient scanning order. For example, the encoder side determines the first transform coefficient from the first two-dimensional subband coefficient array according to the preset coefficient scanning order, and entropy encodes the first transform coefficient based on the context area corresponding to the first transform coefficient. In some embodiments of this application, a transform coefficient in a two-dimensional subband coefficient array is encoded to obtain picture encoded information. This can implement picture compression processing.

For example, the encoder side first scans each transform coefficient in the at least two transform coefficient blocks according to the frequency point scanning order, for example, determines a frequency point (a frequency index of the frequency point is fs) according to the frequency point scanning order, and obtains a transform coefficient in a transform coefficient block that corresponds to the specified frequency index fs and that is in each of the at least two transform coefficient blocks, to form a two-dimensional subband coefficient array corresponding to the frequency point. After a two-dimensional subband coefficient array is determined, each transform coefficient in the two-dimensional subband coefficient array may be processed according to a preset coefficient scanning order. For example, each transform coefficient in the two-dimensional subband coefficient array may be entropy encoded, to obtain picture encoded information.

In some embodiments of this application, step 302 of determining, according to a preset frequency point scanning order, the transform coefficients that are in the at least two transform coefficient blocks and that correspond to a frequency point includes:

G1: Determine, according to the preset frequency point scanning order, the transform coefficients that are in the at least two transform coefficient blocks and that are included in a frequency subband, where the transform coefficients that are in the at least two transform coefficient blocks and that are included in the frequency subband correspond to the same frequency point.

Step 303 of encoding, according to a preset coefficient scanning order, each transform coefficient corresponding to the frequency point includes:

G2: Determine, according to the preset coefficient scanning order, a first transform coefficient included in the frequency subband.

G3: Entropy encode the first transform coefficient based on a context area corresponding to the first transform coefficient.

In the foregoing application scenario, the encoder side needs to generate the two-dimensional subband coefficient array or the three-dimensional subband coefficient array. In step G1, the encoder side may alternatively use a manner of generating neither a two-dimensional subband coefficient array nor a three-dimensional subband coefficient array. The encoder side determines, according to the preset frequency point scanning order, the transform coefficients that are in the at least two transform coefficient blocks and that are included in the frequency subband, where the transform coefficients that are in the at least two transform coefficient blocks and that are included in the frequency subband correspond to the same frequency point. The encoder side encodes, according to the preset coefficient scanning order, each transform coefficient that is in the at least two transform coefficient blocks and that corresponds to the frequency subband, for example, determines, according to the preset coefficient scanning order, the first transform coefficient included in the frequency subband, where the first transform coefficient may be any one of the plurality of transform coefficients included in the frequency subband. The encoder side entropy encodes the first transform coefficient based on the context area corresponding to the first transform coefficient. In some embodiments of this application, a transform coefficient in a frequency subband is encoded to obtain picture encoded information. This can implement picture compression processing.

In some embodiments of this application, a specific process in which the encoder side entropy encodes the first transform coefficient is used for description. For an encoding process of another transform coefficient in the first two-dimensional subband coefficient array or an encoding process of another transform coefficient included in the frequency subband, both may be implemented based on the entropy encoding process of the first transform coefficient. For example, the entropy encoding the first transform coefficient based on a context area corresponding to the first transform coefficient in the foregoing steps C4, D5, E6, F3, and G3 includes the following steps.

H1: Obtain context information of the first transform coefficient from the context area corresponding to the first transform coefficient, where the context information of the first transform coefficient includes an encoded transform coefficient in the context area corresponding to the first transform coefficient.

Specifically, the context area corresponding to the first transform coefficient may be preset. For example, the context area corresponding to the first transform coefficient and an encoded transform coefficient in the context area corresponding to the first transform coefficient are determined based on a horizontal position index, a vertical position index, and a frequency index of the current first transform coefficient. The encoded transform coefficient is a transform coefficient that has been entropy encoded before the first transform coefficient is entropy encoded. Therefore, the context information of the first transform coefficient is obtained from the context area corresponding to the first transform coefficient.

In some embodiments of this application, the context area corresponding to the first transform coefficient includes at least one of the following: a spatially neighboring area of the first transform coefficient, a subband neighboring area of the first transform coefficient, and a three-dimensional neighboring area of the first transform coefficient.

The context area corresponding to the first transform coefficient has a plurality of implementations, for example, may include the spatially neighboring area of the first transform coefficient, the subband neighboring area of the first transform coefficient, or the three-dimensional neighboring area of the first transform coefficient. The spatially neighboring area of the first transform coefficient is a neighboring area in same horizontal space or same vertical space as the first transform coefficient. The subband neighboring area of the first transform coefficient is a neighboring area in the same subband as the first transform coefficient. The three-dimensional neighboring area is a neighboring area in same three-dimensional space as the first transform coefficient. The encoded transform coefficient may be included in the spatially neighboring area of the first transform coefficient, the subband neighboring area of the first transform coefficient, or the three-dimensional neighboring area of the first transform coefficient, so that the encoder side can obtain the context information of the first transform coefficient.

H2: Estimate the first transform coefficient based on the context information of the first transform coefficient, to obtain probability distribution information of the first transform coefficient.

H3: Arithmetic encode the first transform coefficient based on the probability distribution information of the first transform coefficient.

In some embodiments of this application, after obtaining the context information of the first transform coefficient, the encoder side entropy encodes the first transform coefficient based on the context information of the first transform coefficient, to obtain picture encoded information corresponding to the first transform coefficient. The entropy encoding process performed by the encoder side may include probability estimation and arithmetic encoding. Specifically, the encoder side performs probability estimation on the first transform coefficient based on the context information of the first transform coefficient, to obtain a probability distribution of the first transform coefficient. Then, the encoder side arithmetic encodes the first transform coefficient based on the probability distribution of the first transform coefficient, to obtain the picture encoded information corresponding to the first transform coefficient.

For example, when each two-dimensional subband coefficient array is processed, each transform coefficient in the two-dimensional subband coefficient array is processed according to a coefficient scanning order. A processed coefficient in a preset context area is selected as context, the context information is input into a probability estimation network, a probability distribution of a current coefficient is estimated to obtain a probability distribution of the current coefficient, and the current coefficient is arithmetic encoded by using the probability distribution to obtain encoded information of the current coefficient. The preset context area may include a spatially neighboring area and/or a subband neighboring area of the coefficient.

Specifically, a method for estimating the probability distribution of the current coefficient includes: The probability estimation network directly performs probability estimation on a value in a value range based on a dynamic value range of the coefficient, to obtain a probability vector. The probability vector includes a probability value of each value in the value range, where a sum of all probability values is 1. For another example, the method for estimating the probability distribution of the current coefficient includes: obtaining a probability vector by using a probability distribution model. For example, modeling is performed by using a Gaussian single model (GSM) or a Gaussian mixture model (GMM), a probability estimation network is used to estimate a model parameter, and the model parameter is substituted into the probability distribution model to obtain the probability vector.

For example, after an encoded coefficient in the three-dimensional neighboring area of the first transform coefficient is obtained as context information, the context information is input into the probability estimation network, probability estimation is performed on the first transform coefficient to obtain a probability distribution of the first transform coefficient, and the current first transform coefficient is arithmetic encoded by using the probability distribution, to obtain encoded information of the first transform coefficient. A probability distribution estimation method used in the probability estimation network includes a probability distribution estimation method based on a deep learning network, for example, a recurrent neural network (RNN) or a pixel convolutional neural network (PixelCNN).

In some embodiments of this application, a specific process in which the encoder side entropy encodes the first transform coefficient is used for description. For an encoding process of another transform coefficient in the first two-dimensional subband coefficient array or an encoding process of another transform coefficient included in the frequency subband, both may be implemented based on the entropy encoding process of the first transform coefficient. For example, the entropy encoding the first transform coefficient based on a context area corresponding to the first transform coefficient in the foregoing steps C4, D5, E6, F3, and G3 includes the following steps.

I1: When the first transform coefficient is a plurality of transform coefficients, obtain context information of the plurality of transform coefficients from a context area corresponding to the plurality of transform coefficients, where the context information of the plurality of transform coefficients includes an encoded transform coefficient in the context area corresponding to the plurality of transform coefficients.

I2: Estimate the plurality of transform coefficients concurrently based on the context information of the plurality of transform coefficients, to obtain probability distribution information of the plurality of transform coefficients.

I3: Arithmetic encode the plurality of transform coefficients concurrently based on the probability distribution information of the plurality of transform coefficients.

A difference between the application scenario of steps H1 to H3 and the application scenario of steps I1 to I3 lies in that, in steps I1 to I3, when the first transform coefficient is a plurality of transform coefficients, concurrent probability distribution estimation and concurrent arithmetic encoding may be performed. The encoder side may obtain the plurality of transform coefficients, and the encoder side entropy encodes the plurality of transform coefficients concurrently based on the context information of the plurality of transform coefficients. Through concurrent entropy encoding, picture encoding efficiency can be improved. For example, when obtaining a probability distribution of a coefficient, the encoder side may also perform probability estimation concurrently on probability distributions of a plurality of transform coefficients, that is, obtain the probability distributions of the plurality of transform coefficients at a time, and arithmetic encode the plurality of transform coefficients concurrently.

In some embodiments of this application, the context area corresponding to the plurality of transform coefficients includes at least one of the following: a spatially neighboring area of the plurality of transform coefficients, a subband neighboring area of the plurality of transform coefficients, and a three-dimensional neighboring area of the plurality of transform coefficients.

The context area corresponding to the plurality of transform coefficients has a plurality of implementations, for example, may include the spatially neighboring area of the plurality of transform coefficients, the subband neighboring area of the plurality of transform coefficients, or the three-dimensional neighboring area of the plurality of transform coefficients. The spatially neighboring area of the plurality of transform coefficients is a neighboring area in same horizontal space or same vertical space as the plurality of transform coefficients. The subband neighboring area of the plurality of transform coefficients is a neighboring area in the same subband as the plurality of transform coefficients. The three-dimensional neighboring area is a neighboring area in same three-dimensional space as the first transform coefficient. The encoded transform coefficients may be included in the spatially neighboring area of the plurality of transform coefficients, the subband neighboring area of the plurality of transform coefficients, or the three-dimensional neighboring area of the plurality of transform coefficients, so that the encoder side can obtain the context information of the plurality of transform coefficients.

In some embodiments of this application, step 302 of determining, according to a preset frequency point scanning order, the transform coefficients that are in the at least two transform coefficient blocks and that correspond to a frequency point includes:

J1: Obtain at least two two-dimensional subband coefficient arrays from the at least two transform coefficient blocks, where a two-dimensional subband coefficient array includes the transform coefficients that correspond to the same frequency point and that are in the at least two transform coefficient blocks, and the transform coefficients included in different two-dimensional subband coefficient arrays correspond to different frequency points.

J2: Determine, according to the preset frequency point scanning order, at least two subband pictures corresponding to the at least two two-dimensional subband coefficient arrays.

Step 303 of encoding, according to a preset coefficient scanning order, each transform coefficient corresponding to the frequency point includes:

J3: Encode transform coefficients in the at least two subband pictures according to the preset coefficient scanning order.

The encoder side may arrange the at least two transform coefficient blocks based on different frequency points, to obtain the at least two two-dimensional subband coefficient arrays. A two-dimensional subband coefficient array includes the transform coefficients that are in a transform coefficient block and that correspond to a frequency point, and different two-dimensional subband coefficient arrays have different frequency points. That is, the encoder side may group the transform coefficients that are in at least two transform coefficient blocks and that correspond to the same frequency point into one two-dimensional subband coefficient array. Therefore, a two-dimensional subband coefficient array corresponding to a plurality of frequency points may be obtained based on the plurality of frequency points.

After the encoder side obtains the at least two two-dimensional subband coefficient arrays, in a manner of lossless encoding the subband pictures, the encoder side performs, according to the preset frequency point scanning order by using the at least two two-dimensional subband coefficient arrays as the at least two subband pictures, picture lossless encoding on the transform coefficients in the at least two subband pictures. During picture lossless encoding, the encoder side may encode a two-dimensional subband coefficient array as a subband picture. This simplifies an implementation process of lossless encoding.

It can be learned from the foregoing description of the picture processing method that, in some embodiments of this application, at least two transform coefficient blocks may be obtained, so that picture encoded information can be obtained only by encoding, according to a frequency point scanning order, the transform coefficients that correspond to the same frequency point and that are in the at least two transform coefficient blocks. Therefore, a plurality of transform coefficients corresponding to the same frequency point may be encoded at the same time. This can improve picture compression efficiency, reduce storage costs of picture encoded information, and further save storage resources.

In some embodiments of this application, after the encoder side generates the picture encoded information, the encoder side may send the picture encoded information to a decoder side through a picture transmission channel. For example, the encoder sends a compressed bitstream, where the compressed bitstream includes the picture encoded information. The picture encoded information is obtained by encoding the at least two transform coefficient blocks by the encoder side, and needs to be decoded by the decoder side by using a picture processing method corresponding to the encoder side. Specifically, the decoder side performs the following step 311 to step 313.

311: Obtain the picture encoded information.

In some embodiments of this application, the decoder side first obtains the picture encoded information from the encoder side. For example, the decoder side receives the compressed bitstream from the encoder side, and then parses the compressed bitstream to obtain the picture encoded information.

312: Determine, according to a preset frequency point scanning order, the to-be-decoded transform coefficients that correspond to a frequency point and that are in the picture encoded information.

313: Decode, according to a preset coefficient scanning order, the to-be-decoded transform coefficients corresponding to the frequency point, to obtain at least two transform coefficient blocks.

Each of the at least two transform coefficient blocks includes at least two transform coefficients, and transform coefficients in a transform coefficient block correspond to different frequency points.

In some embodiments of this application, after obtaining the picture encoded information, the decoder side decodes the to-be-decoded transform coefficients that correspond to the same frequency point and that are in the picture encoded information. The to-be-decoded transform coefficient may also be referred to as a transform coefficient to be decoded. For example, an available decoding method includes entropy decoding, Huffman decoding, and the like. After all transform coefficients corresponding to a frequency point are obtained, a next frequency point is determined according to a preset frequency point scanning order, a plurality of transform coefficients corresponding to the next frequency point are obtained through decoding, and all frequency points are obtained in sequence according to the frequency point scanning order. After transform coefficients corresponding to all the frequency points are obtained through decoding, the decoder side may generate at least two transform coefficient blocks. Each of the at least two transform coefficient blocks includes at least two transform coefficients, and transform coefficients in a transform coefficient block correspond to different frequency points. For description of the transform coefficient block, the frequency point scanning order, and the coefficient scanning order, refer to the examples of the foregoing encoder side.

In some embodiments of this application, when the encoder side performs encoding shown in steps C1 to C4, the decoder side performs a corresponding decoding method. Specifically, step 312 of determining, according to a preset frequency point scanning order, the to-be-decoded transform coefficients that correspond to a frequency point and that are in the picture encoded information includes:

K1: Determine, according to the preset frequency point scanning order, a first to-be-decoded two-dimensional subband coefficient array from the picture encoded information, where the first to-be-decoded two-dimensional subband coefficient array includes the to-be-decoded transform coefficients that correspond to the frequency point and that are in the picture encoded information.

Step 313 of decoding, according to a preset coefficient scanning order, the to-be-decoded transform coefficients corresponding to the frequency point includes:

K2: Determine a first to-be-decoded transform coefficient from the first to-be-decoded two-dimensional subband coefficient array according to the preset coefficient scanning order.

K3: Entropy decode the first to-be-decoded transform coefficient based on a context area corresponding to the first to-be-decoded transform coefficient.

Specifically, the decoder side uses a picture decoding manner corresponding to the encoder side. If the encoder side performs the encoding method shown in steps C1 to C4, the picture encoded information received by the decoder side may include at least two to-be-decoded two-dimensional subband coefficient arrays. The frequency point scanning order is an order of scanning the to-be-decoded two-dimensional subband coefficient arrays, and the first to-be-decoded two-dimensional subband coefficient array is obtained from the at least two to-be-decoded two-dimensional subband coefficient arrays according to the preset frequency point scanning order, where the first to-be-decoded two-dimensional subband coefficient array includes a plurality of to-be-decoded transform coefficients.

In some embodiments of this application, when the encoder side performs encoding shown in steps D1 to D5, the decoder side performs a corresponding decoding method. Specifically, step 312 of determining, according to a preset frequency point scanning order, the to-be-decoded transform coefficients that correspond to a frequency point and that are in the picture encoded information includes:

L1: Determine, according to the preset frequency point scanning order, a to-be-decoded three-dimensional subband coefficient array from the picture encoded information, where the to-be-decoded three-dimensional subband coefficient array includes the to-be-decoded transform coefficients that correspond to all frequency points and that are in the picture encoded information.

L2: Determine a first to-be-decoded two-dimensional subband coefficient array from the to-be-decoded three-dimensional subband coefficient array according to a preset three-dimensional subband coefficient scanning order, where the first to-be-decoded two-dimensional subband coefficient array includes the to-be-decoded transform coefficients that correspond to the frequency point and that are in the picture encoded information.

Step 313 of decoding, according to a preset coefficient scanning order, the to-be-decoded transform coefficients corresponding to the frequency point includes:

L3: Determine a first to-be-decoded transform coefficient from the first to-be-decoded two-dimensional subband coefficient array according to the preset coefficient scanning order.

L4: Entropy decode the first to-be-decoded transform coefficient based on a context area corresponding to the first to-be-decoded transform coefficient.

Specifically, the decoder side uses a picture decoding manner corresponding to the encoder side, and the picture encoded information received by the decoder side may include a to-be-decoded three-dimensional subband coefficient array. The decoder side may obtain at least two two-dimensional subband coefficient arrays from the to-be-decoded three-dimensional subband coefficient array according to the preset three-dimensional subband coefficient scanning order. Each two-dimensional subband coefficient array includes the transform coefficients that are in at least two transform coefficient blocks and that correspond to a frequency point, and different two-dimensional subband coefficient arrays have different frequency points.

The three-dimensional subband coefficient array includes a plurality of two-dimensional subband coefficient arrays. The decoder side first determines a two-dimensional subband coefficient array from the three-dimensional subband coefficient array according to the preset three-dimensional subband coefficient scanning order, for example, determines the first two-dimensional subband coefficient array. The first two-dimensional subband coefficient array is a two-dimensional subband coefficient array in the three-dimensional subband coefficient array. The three-dimensional subband coefficient scanning order is an order of performing scanning for the three-dimensional subband coefficient array.

The decoder side uses a picture decoding manner corresponding to the encoder side. When the encoder side generates the three-dimensional subband coefficient array, the decoder side lossless decodes a second two-dimensional subband coefficient array according to a preset coefficient scanning order, to obtain the at least two transform coefficient blocks. For example, lossless decoding may include entropy decoding.

In some embodiments of this application, the three-dimensional subband coefficient scanning order includes:
a preset change order of horizontal position indexes;
a preset change order of vertical position indexes; or
a preset change order of frequency indexes.

For details, refer to the description of the three-dimensional subband coefficient scanning order in the foregoing embodiment.

In some embodiments of this application, when the encoder side performs encoding shown in steps G1 to G3, the decoder side performs a corresponding decoding method. Specifically, step 312 of determining, according to a preset frequency point scanning order, the to-be-decoded transform coefficients that correspond to a frequency point and that are in the picture encoded information includes:

M1: Determine, according to the preset frequency point scanning order, the to-be-decoded transform coefficients that are included in a frequency subband and that are in the picture encoded information, where the to-be-decoded transform coefficients included in the frequency subband correspond to the same frequency point.

Step 313 of decoding, according to a preset coefficient scanning order, the to-be-decoded transform coefficients corresponding to the frequency point includes:

M2: Determine a first to-be-decoded transform coefficient from the frequency subband based on the preset coefficient scanning order.

M3: Entropy decode the first to-be-decoded transform coefficient based on a context area corresponding to the first to-be-decoded transform coefficient.

The decoder side uses a picture decoding manner corresponding to the encoder side. During encoding, the encoder side may encode a two-dimensional subband coefficient array as a frequency subband. In this case, the picture encoded information received by the decoder side may include to-be-decoded transform coefficients corresponding to a plurality of frequency subbands. The decoder side obtains, from the picture encoded information according to the frequency point scanning order, the to-be-decoded transform coefficients that correspond to the frequency subband.

The decoder side may use a manner of generating no subband coefficient array, for example, generating neither a two-dimensional subband coefficient array nor a three-dimensional subband coefficient array. The decoder side first determines a first frequency subband, where the transform coefficients that are in at least two transform coefficient blocks and that correspond to the first frequency subband correspond to the same frequency point. The decoder side lossless decodes picture encoded information corresponding to the first frequency subband according to a preset coefficient scanning order, and lossless decodes picture encoded information corresponding to each of the plurality of frequency subbands in this sampling manner, to obtain a plurality of transform coefficients.

Specifically, the decoder side obtains the picture encoded information corresponding to the plurality of frequency subbands. In a manner of lossless decoding the frequency subbands, the decoder side lossless decodes, according to a preset coefficient scanning order by using at least two two-dimensional subband coefficient arrays as at least two frequency subbands, picture encoded information corresponding to the at least two frequency subbands. During lossless decoding, the decoder side may decode a two-dimensional subband coefficient array as a frequency subband. This simplifies an implementation process of lossless decoding.

In some embodiments of this application, the entropy decoding the first to-be-decoded transform coefficient based on a context area corresponding to the first to-be-decoded transform coefficient in the foregoing steps K3, L4, and M4 includes:

N1: Obtain context information of the first to-be-decoded transform coefficient from the context area corresponding to the first to-be-decoded transform coefficient, where the context area corresponding to the first to-be-decoded transform coefficient includes a decoded transform coefficient in the context area corresponding to the first to-be-decoded transform coefficient.

N2: Estimate the first to-be-decoded transform coefficient based on the context information of the first to-be-decoded transform coefficient, to obtain probability distribution information of the first to-be-decoded transform coefficient.

N3: Arithmetic decode the first to-be-decoded transform coefficient based on the probability distribution information of the first to-be-decoded transform coefficient, to obtain a decoded first transform coefficient, where the decoded first transform coefficient belongs to the at least two transform coefficient blocks.

Lossless decoding performed by the decoder side may be entropy decoding. In the following, an entropy decoding process of the first transform coefficient is used for description. All decoding processes of other transform coefficients in the first two-dimensional subband coefficient array may be implemented according to the entropy decoding process of the first transform coefficient.

In some embodiments of this application, after the decoder side obtains the context information of the first transform coefficient, the decoder side entropy decodes the first transform coefficient based on the context information of the first transform coefficient, to obtain the decoded first transform coefficient. Entropy decoding performed by the decoder side may include probability estimation and arithmetic decoding. Specifically, the decoder side performs probability estimation on the first transform coefficient based on the context information of the first transform coefficient, to obtain a probability distribution of the first transform coefficient. Then, the decoder side arithmetic decodes the first transform coefficient based on the probability distribution of the first transform coefficient, to obtain picture decoded information corresponding to the first transform coefficient.

For example, when the encoded information obtained through entropy encoding is entropy decoded, each bit is decoded according to the same processing order as that of the encoder side. When each bit is processed, a decoded bit in a preset context area of the to-be-decoded bit is used as context and input to a probability estimation network, a probability distribution of the current bit is estimated, and the current bit is decoded by using the probability distribution to obtain a transform coefficient of the current bit. After each bit is decoded, two-dimensional subband coefficient arrays are obtained.

Lossless decoding performed by the decoder side may be entropy decoding. In the following, an entropy decoding process of the first transform coefficient is used for description. All decoding processes of other transform coefficients in the first two-dimensional subband coefficient array may be implemented according to the entropy decoding process of the first transform coefficient.

In some embodiments of this application, after the decoder side obtains the context information of the first transform coefficient, the decoder side entropy decodes the first transform coefficient based on the context information of the first transform coefficient, to obtain the decoded first transform coefficient. Entropy decoding performed by the decoder side may include probability estimation and arithmetic decoding. Specifically, the decoder side performs probability estimation on the first transform coefficient based on the context information of the first transform coefficient, to obtain a probability distribution of the first transform coefficient. Then, the decoder side arithmetic decodes the first transform coefficient based on the probability distribution of the first transform coefficient, to obtain picture decoded information corresponding to the first transform coefficient.

For example, when the encoded information obtained through entropy encoding is entropy decoded, each bit is decoded according to the same processing order as that of the encoder side. When each bit is processed, a decoded bit in a preset context area of the to-be-decoded bit is used as context and input to a probability estimation network, a probability distribution of the current bit is estimated, and the current bit is decoded by using the probability distribution to obtain a transform coefficient of the current bit. After each bit is decoded, two-dimensional subband coefficient arrays are obtained.

In some embodiments of this application, the context area corresponding to the first to-be-decoded transform coefficient includes at least one of the following: a spatially neighboring area of the first to-be-decoded transform coefficient, a subband neighboring area of the first to-be-decoded transform coefficient, and a three-dimensional neighboring area of the first to-be-decoded transform coefficient.

In some embodiments of this application, the entropy decoding the first to-be-decoded transform coefficient based on a context area corresponding to the first to-be-decoded transform coefficient in the foregoing steps K3, L4, and M4 includes:

P1: When the first to-be-decoded transform coefficient is a plurality of to-be-decoded transform coefficients, obtain context information of the plurality of to-be-decoded transform coefficients from a context area corresponding to the plurality of to-be-decoded transform coefficients, where the context information of the plurality of to-be-decoded transform coefficients includes a decoded transform coefficient in the context area corresponding to the plurality of to-be-decoded transform coefficients.

P2: Estimate the plurality of to-be-decoded transform coefficients concurrently based on the context information of the plurality of to-be-decoded transform coefficients, to obtain probability distribution information of the first to-be-decoded transform coefficient.

P3: Arithmetic decode the plurality of to-be-decoded transform coefficients concurrently based on the probability distribution information of the plurality of to-be-decoded transform coefficients, to obtain a decoded first transform coefficient, where the decoded first transform coefficient belongs to the at least two transform coefficient blocks.

The decoder side uses a picture decoding manner corresponding to the encoder side. The encoder side may perform encoding concurrently during encoding. In this case, the decoder side may perform decoding concurrently, to improve picture decoding efficiency.

In some embodiments of this application, the context area corresponding to the plurality of to-be-decoded transform coefficients includes at least one of the following: a spatially neighboring area of the plurality of to-be-decoded transform coefficients, a subband neighboring area of the plurality of to-be-decoded transform coefficients, and a three-dimensional neighboring area of the plurality of to-be-decoded transform coefficients.

In some embodiments of this application, when the encoder side performs encoding shown in steps G1 to G3, the decoder side performs a corresponding decoding method. Specifically, step 312 of determining, according to a preset frequency point scanning order, the to-be-decoded transform coefficients that correspond to a frequency point and that are in the picture encoded information includes:

Q1: Determine a first subband picture from the picture encoded information according to the preset frequency point scanning order, where the first subband picture includes the to-be-decoded transform coefficients that correspond to the frequency point and that are in the picture encoded information.

Step 313 of decoding, according to a preset coefficient scanning order, the to-be-decoded transform coefficients corresponding to the frequency point includes:

Q2: Decode to-be-decoded coefficients of the first subband picture according to the preset coefficient scanning order, to obtain the at least two transform coefficient blocks.

Specifically, the decoder side uses a picture decoding manner corresponding to the encoder side. During encoding, the encoder side may encode a two-dimensional subband coefficient array as a subband picture. In this case, picture encoded information received by the decoder side may include to-be-decoded transform coefficients corresponding to a plurality of subband pictures. The decoder side obtains, from the picture encoded information according to the frequency point scanning order, the to-be-decoded transform coefficients corresponding to the first subband picture.

After the decoder side lossless decodes a subband picture to obtain a plurality of transform coefficients, in a manner of lossless decoding a subband picture, the decoder side lossless decodes, according to the preset coefficient scanning order by using at least two two-dimensional subband coefficient arrays as at least two subband pictures, picture encoded information corresponding to the at least two subband pictures. During lossless decoding, the decoder side may decode a two-dimensional subband coefficient array as a subband picture. This simplifies an implementation procedure of lossless decoding.

In some embodiments of this application, after the at least two transform coefficient blocks are obtained in step 313, the method provided in some embodiments further includes:

R1: Entropy encode the at least two transform coefficient blocks to obtain transform coefficient encoded information.

R2: Generate at least two picture blocks based on the transform coefficient encoded information.

R3: Restore an original picture area based on the at least two picture blocks, where the original picture area includes a pixel picture area or a residual picture area.

The decoder side uses a picture decoding manner corresponding to the encoder side. If the encoder side entropy encodes transform coefficient encoded information to obtain transform coefficient blocks, and encodes the transform coefficient blocks, the decoder side may entropy decode at least two transform coefficient blocks, to obtain the transform coefficient encoded information. In some embodiments of this application, the at least two picture blocks are generated based on the transform coefficient encoded information, and then the original picture area is restored based on the at least two picture blocks, so that picture decompression processing can be completed.

In some embodiments of this application, after the at least two transform coefficient blocks are obtained in step 313, the method further includes:

S1: Perform dequantization and inverse transformation on the at least two transform coefficient blocks to obtain at least two picture blocks.

S2: Restore an original picture area based on the at least two picture blocks, where the original picture area includes a pixel picture area or a residual picture area.

In some embodiments of this application, after generating the at least two transform coefficient blocks, the decoder side generates the at least two picture blocks based on the at least two transform coefficient blocks. The decoder side may process the at least two transform coefficient blocks through inverse transformation and dequantization, so that the at least two picture blocks can be generated.

Inverse transform and dequantization are performed on the transform coefficients that are in the at least two transform coefficient blocks and that correspond to the same frequency point, to obtain the at least two picture blocks; or the transform coefficients that are in the at least two transform coefficient blocks and that correspond to the same frequency point are entropy decoded, to obtain the at least two picture blocks.

In some embodiments of this application, after the decoder side generates the at least two picture blocks, the decoder side restores an original picture based on the at least two picture blocks. The original picture may be obtained by splicing a plurality of picture blocks.

It can be learned from the foregoing description of the picture processing method that, in some embodiments of this application, the to-be-decoded transform coefficients that correspond to the same frequency point and that are in the picture coding information may be decoded according to the preset frequency point scanning order and the preset frequency point scanning order, to obtain the at least two transform coefficient blocks. Because transform coefficients in a transform coefficient block correspond to different frequency points, when picture encoded information is decoded, different transform coefficients corresponding to the same frequency point may be obtained. This can improve picture decompression efficiency, reduce storage costs of picture encoded information, and further save storage resources.

For better understanding and implementation of the foregoing solutions in embodiments of this application, the following uses a corresponding application scenario as an example for specific description.

Embodiments of this application provide a block transform and coefficient encoding scheme in video picture compression. Embodiments of this application can improve picture encoding performance, further save storage resources, and improve video picture encoding efficiency. For example, a compressed file generated through entropy encoding consumes a large quantity of storage resources on a server side. Embodiments of this application may be applied to an efficient lossless transcoding process of an entropy encoded picture. Embodiments of this application may be further applied to the server side, to lossless transcode the compressed file generated through entropy encoding. This can improve picture encoding performance, and further save storage resources.

The following describes in detail picture processing methods provided in embodiments of this application by using five different embodiments. In each embodiment, a picture encoding process is first described from an encoder side. After generating a picture encoded bitstream, the encoder side sends the picture encoded bitstream to a decoder side. After the decoder side receives the picture encoded bitstream, the decoder side decodes the picture encoded bitstream, to restore an original picture.

Embodiment 1

Figure 4:
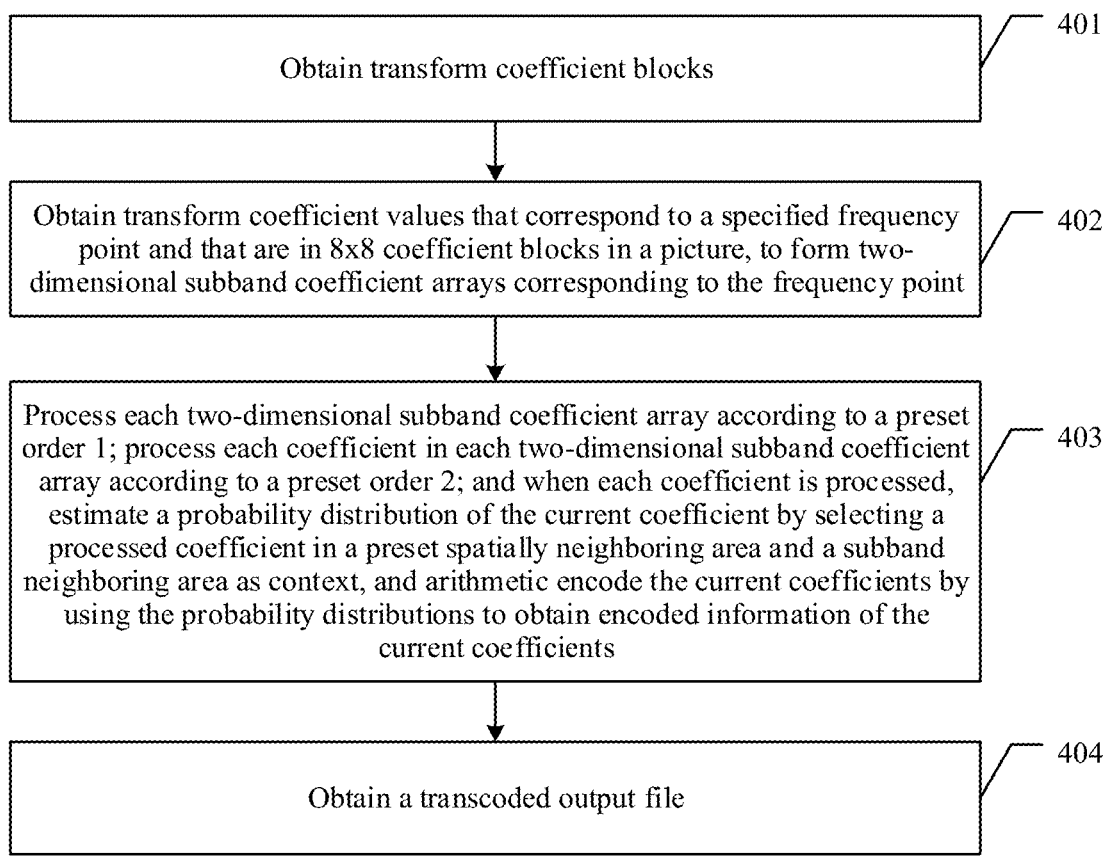
FIG. 4 is a schematic diagram of a picture encoding procedure according to an embodiment of this application.

This embodiment relates to a picture coding scheme. First, a transform coefficient block (coefficient block for short) is obtained, and then the coefficient block is lossless encoded, to obtain encoded picture data. This embodiment provides an entire encoding process, which may include, for example, transforming and quantizing a picture area, and then lossless encoding quantized coefficients to obtain encoded picture data. As shown in FIG. 4, a picture encoding procedure mainly includes the following steps.

Step 401: Obtain transform coefficient blocks.

Method 1: Split a to-be-processed picture area into picture blocks of a preset size, and transform and quantize each picture block to obtain a transform coefficient block, where the transform coefficient block may be a transform coefficient array C(bx,by,fx,fy).

First, a to-be-processed picture or the to-be-processed picture area is split into picture subblocks of the same preset size, where the picture subblocks of the preset size may have sizes of 4×4, 8×8, 16×16, 32×32, 64×64, 128×128, 256×256, and the like.

Figure 5:
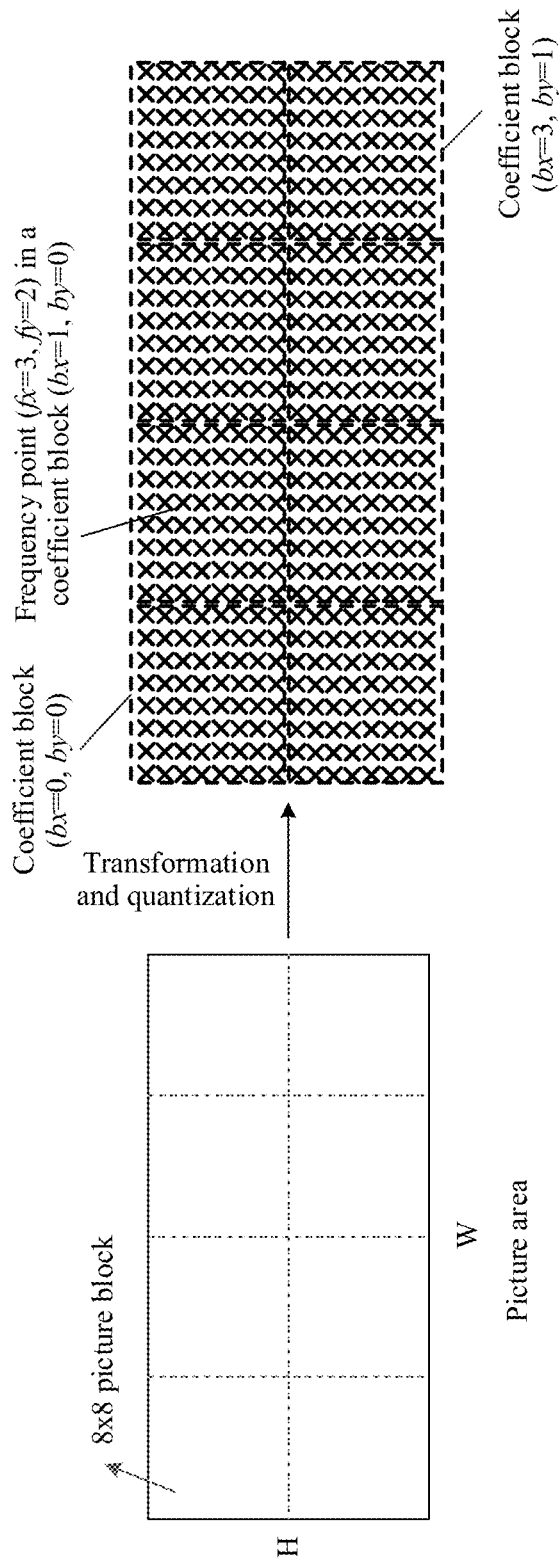
FIG. 5 is a schematic diagram of obtaining transform coefficient blocks according to an embodiment of this application.

FIG. 5 is a schematic diagram of obtaining transform coefficient blocks according to this embodiment of this application. DCT transform is performed on the picture subblocks of the preset size to obtain the transform coefficient blocks. Optionally, the transform coefficient blocks are quantized to obtain quantized coefficient arrays C(bx,by,fx,fy). Each transform coefficient in the coefficient array may be represented by $C\_(bx,by)^\wedge(fx,fy)$. (bx,by) represents horizontal and vertical position indexes of a coefficient block, $bx=0, \ldots, M-1$, $by=0, \ldots, N-1$, M=W/subW, and N=H/subH, where M and N are respectively the width and the height of a picture on a per-picture subblock basis, W and H respectively represent the width and the height of the current picture, and subW and subH respectively represent the width and the height of a picture subblock in the current picture. (fx,fy) represents a frequency index of each frequency point in the coefficient block relative to a frequency point of the top-left vertex, where $fx=0, \ldots, subW-1$, and $fy=0, \ldots, subH-1$. An example in which a picture subblock of a preset size has a size of 8×8 is used in some embodiments of this application. That is, both the width and the height of the picture subblock are 8, that is, values of both subW and subH are 8. Details are not described in the following.

For example, as shown in FIG. 5, (bx=0, by=0) represents the first coefficient block, (bx=0, by=1) represents the second coefficient block in a first row, and so on. (fx=0, fy=1) represents a frequency index of a frequency point whose coordinates are (0, 1) and that is relative to the frequency point of the top-left vertex in the coefficient block. $C (bx=1, by=0)^\wedge(fx=3,fy=2)$ represents a coefficient value represented by a position (fx=3,fy=2) in a coefficient block (bx=1, by=0).

Method 2: Entropy decode entropy encoded picture data, to obtain transform coefficients (coefficients for short) in 8×8 blocks in a picture.

Transform coefficient encoded information of all picture subblocks in a JPEG file is entropy decoded by using a Huffman decoding method, to obtain a transform coefficient block of one or more picture subblocks, where each transform coefficient of the coefficient block is denoted as $C\_(bx,by)^\wedge(fx,fy)$. (bx,by) represents horizontal and vertical position indexes of the coefficient block, $bx=0, \ldots, M-1$, $by=0, \ldots, N-1$, M=W/subW, and N=H/subH, where M and N are respectively the width and the height of a picture on a per-picture subblock basis, W and H respectively represent the width and the height of the current picture, and subW and subH respectively represent the width and the height of a picture subblock in the current picture. (fx,fy) represents a frequency index of each frequency point in the coefficient block relative to a frequency point of the top-left vertex, where $fx=0, \ldots, subW-1$, and $fy=0, \ldots, subH-1$. In some embodiments of this application, both widths and heights of all the picture subblocks in the JPEG file are 8, that is, values of both subW and subH are 8. Details are not described in the following. It is not limited that the technical solutions described in embodiments of this application may alternatively be applied to a case in which values of subW and subH are not 8. For example, subW is not equal to subH.

For example, as shown in FIG. 5, (bx=0, by=0) represents the first coefficient block, (bx=0, by=1) represents the second coefficient block in a first row, and so on. (fx=0, fy−1) represents a frequency index of a frequency point whose coordinates are (0, 1) and that is relative to the frequency point of the top-left vertex in the coefficient block. C (bx=1, by=0)^(fx=3,fy=2) represents a coefficient value represented by a position (fx=3,fy=2) in a coefficient block (bx=0, by=1).

Step 402: Obtain transform coefficient values that correspond to a specified frequency point and that are in 8×8 transform coefficient blocks (8×8 coefficient blocks for short) in the picture, to form two-dimensional subband coefficient arrays corresponding to the frequency point.

Figure 6:
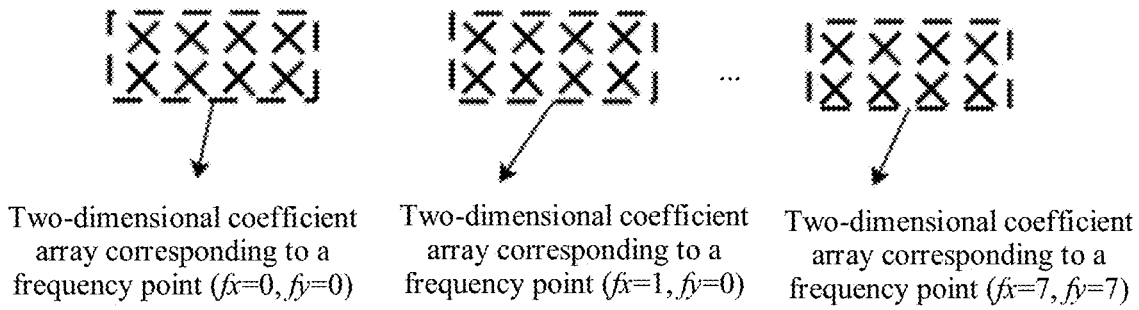
FIG. 6 is a schematic diagram of obtaining a two-dimensional subband coefficient array according to an embodiment of this application.

Specifically, FIG. 6 is a schematic diagram of obtaining a two-dimensional subband coefficient array according to this embodiment of this application. Transform coefficient values that correspond to a specified frequency point (fx,fy) and that are in an 8×8 transform coefficient block in the picture are obtained, to form a two-dimensional subband coefficient array C^(fx,fy) (bx,by) corresponding to the frequency point.

For example, the first figure of FIG. 6 shows a two-dimensional subband coefficient array formed by obtaining transform coefficient values that correspond to the frequency point (fx=0, fy=0) and that are in all 8×8 transform coefficient blocks in the picture. Similarly, a two-dimensional subband coefficient array corresponding to a remaining frequency point is obtained. An 8×8 transform coefficient block has a total of 64 frequency points. Therefore, 64 two-dimensional subband coefficient arrays of a current encoded picture can be obtained.

Step 403: Process each two-dimensional subband coefficient array according to a preset order 1; process each transform coefficient in each two-dimensional subband coefficient array according to a preset order 2; and when each transform coefficient is processed, estimate a probability distribution of the current coefficient by selecting a processed coefficient in a preset spatially neighboring area and a subband neighboring area as context, and arithmetic encode the current coefficients by using the probability distributions to obtain encoded information of the current coefficients.

It should be noted that the processing each two-dimensional subband coefficient array according to a preset order 1 is to determine each two-dimensional subband coefficient array according to the preset order 1. The processing each transform coefficient according to a preset order 2 is to encode each transform coefficient according to the preset order 2.

Step 403.1: Process each two-dimensional subband coefficient array according to the preset order 1.

Figure 7:
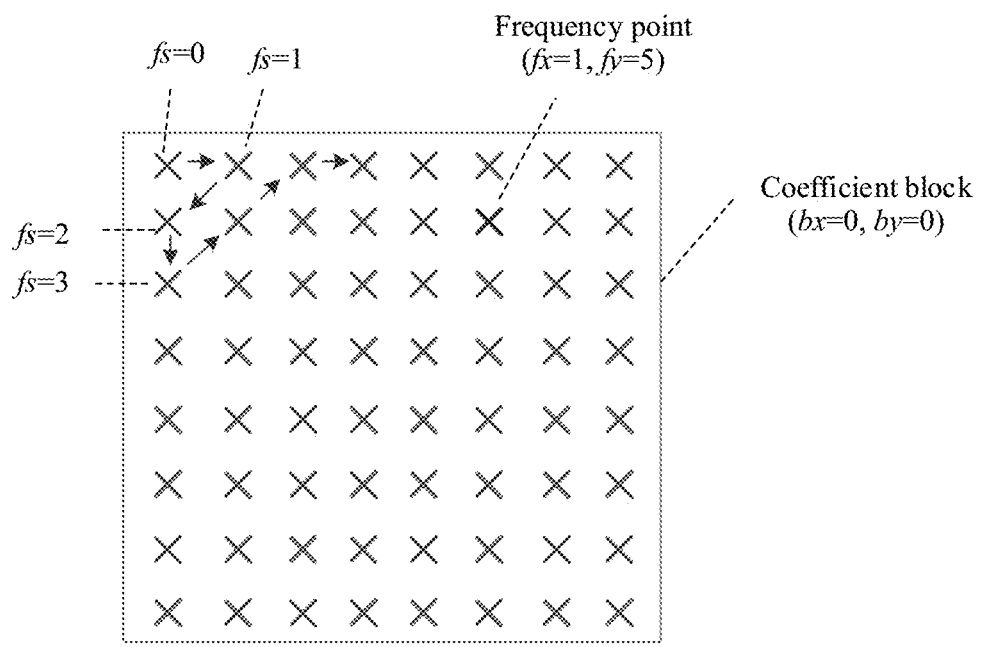
FIG. 7 is a schematic diagram of transform coefficient blocks according to an embodiment of this application.

FIG. 7 is a schematic diagram of a transform coefficient block according to this embodiment of this application. A frequency index of the two-dimensional subband coefficient array corresponding to the specified frequency point (fx,fy) is set to fs, and each index value corresponds to one two-dimensional subband coefficient array. First, any 8×8 transform coefficient block in the picture is obtained, and the transform coefficients that correspond to the specified frequency point (fx,fy) and that are in the coefficient block are scanned according to the preset order 1. In this case, the index fs of the two-dimensional subband coefficient array corresponding to the specified frequency point (fx,fy) is the same as a scanning order of the frequency point in the coefficient block, and the two-dimensional subband coefficient array C^(fx,fy) (bx,by) corresponding to fs is processed according to a value order ofs. A coefficient block (bx=0, by=0) is used as an example. If the preset order 1 is Z scanning, fs=0 corresponds to a two-dimensional subband coefficient array corresponding to a frequency point (fx=0, fy=0), fs=1 corresponds to a two-dimensional subband coefficient array corresponding to a frequency point (fx=1, fy=0), fs=2 corresponds to a two-dimensional subband coefficient array corresponding to a frequency point (fx=0, fy=1), and the two-dimensional subband coefficient arrays for the corresponding frequency points are processed according to the value order ofs. fs is an integer ranging from 0 to subW×subH−1.

Step 403.2: Process each transform coefficient in each two-dimensional subband coefficient array.

When each two-dimensional subband coefficient array is processed, each transform coefficient in the two-dimensional subband coefficient array is processed according to the preset order 2. A processed coefficient in a preset context area is selected as context, the context information is input into a probability estimation network, a probability distribution of a current coefficient is estimated to obtain a probability distribution of the current coefficient, and the current coefficient is arithmetic encoded by using the probability distribution to obtain encoded information of the current coefficient. The preset context area (explained below) may include a spatially neighboring area and/or a subband neighboring area of the coefficient, or a three-dimensional neighboring area defined in the following embodiment. It should be noted that when probability distributions of the coefficients are obtained, probability estimation may also be performed concurrently on the probability distributions of the coefficients, that is, the probability distributions of plurality of coefficients are obtained at a time. Then, each transform coefficient is lossless encoded according to the preset order 2. Alternatively, the plurality of coefficients are lossless encoded concurrently.

Specifically, a method for estimating the probability distribution of the current coefficient is as follows: Method 1: The probability estimation network directly performs probability estimation on a value in a value range based on a dynamic value range of the coefficient, to obtain a probability vector. The probability vector includes a probability value of each value in the value range, where a sum of all probability values is 1. Method 2: Obtain a probability vector by using a probability distribution model. For example, modeling is performed by using a Gaussian single model or a Gaussian mixture model, a model parameter is estimated by using a probability estimation network, and the model parameter is substituted into the probability distribution model to obtain a probability vector.

First, after a coefficient in the preset context area of the coefficient is obtained as context, context information is input into the probability estimation network, probability estimation is performed on the coefficient to obtain a probability distribution of the coefficient, and the current coefficient is lossless encoded by using the probability distribution, to obtain encoded information of the coefficient. A probability distribution estimation method used in the probability estimation network may include a probability distribution estimation method based on a deep learning network, for example, a recurrent neural network or a convolutional neural network.

It is assumed that coordinates of the coefficient are (bx0,by0,fs0). If any coordinate position (bx1,by1,fs1) in a preset context area satisfies bx0−M1≤bx1≤bx0+N1, by0−M2≤by1≤by0+N2, and fs1=fs0, a coefficient in a position (bx1,by1,fs1) falls within a subband neighboring area of the coefficient.

If any coordinate position (bx1,by1,fs1) in a preset context area satisfies bx1=bx0, by0−M2≤by1≤by0+N2, and fs0−N3≤fs1≤fs0, or satisfies bx0−M1≤bx1≤bx0+N1, by1=by0, and fs0−N3≤fs1≤fs0, a coefficient in the (bx1,by1, fs1) position falls within a spatially neighboring area of the coefficient. M1, M2, N1, N2, and N3 are integers greater than or equal to 0, and values of M1, M2, N1, N2, and N3 may be equal or may be not equal to each other. This is not limited herein. For example, the values of M1, M2, N1, N2, and N3 may be 1, 2, 3, 4, or 5.

The preset order 1 and the preset order 2 may be processing orders obtained through zig-zag (zig-zag or referred to as Z) scanning, or may be processing orders obtained by using another scanning method, for example, row-by-row scanning, column-by-column scanning, diagonal scanning, horizontal reverse scanning, or vertical reverse scanning. Row-by-row scanning is to perform continuous scanning from a first row to a last row of a picture. Column-by-column scanning is to perform continuous scanning from a first column to a last column of the picture.

Step 404: Obtain a transcoded output file.

The entropy encoded information is output to obtain a compressed file.

Figure 8:
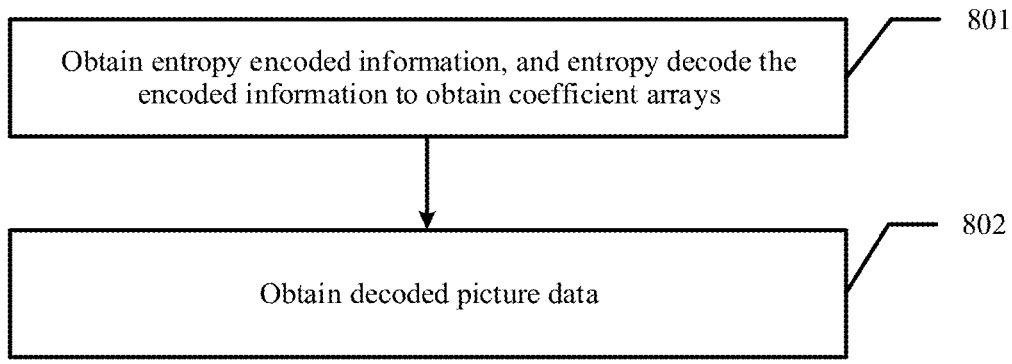
FIG. 8 is a schematic diagram of a picture decoding procedure according to an embodiment of this application.

FIG. 8 is a schematic diagram of a picture decoding procedure according to an embodiment of this application. The picture decoding procedure mainly includes the following steps.

Step 801: Obtain entropy encoded information, and entropy decode the encoded information to obtain coefficient arrays.

When the entropy encoded information is entropy decoded, each bit is decoded according to the same processing order as that of the encoder side. That is, each encoded two-dimensional subband coefficient array is first processed according to the preset order 1. When each encoded two-dimensional subband coefficient array is processed, each encoded coefficient in the two-dimensional subband coefficient array is processed according to the preset order 2. In this embodiment, the encoded coefficient may be understood as a bit. When each bit is processed, a decoded bit in a preset context area of the to-be-decoded bit is used as context and input to a probability estimation network, a probability distribution of the current bit is estimated, and the current bit is decoded by using the probability distribution to obtain a transform coefficient of the current bit. After each bit is decoded, a plurality of 8×8 transform coefficient blocks or coefficient arrays C(bx,by,fx,fy) of the picture are obtained.

Step 802: Obtain decoded picture data.

Method 1 corresponding to decoding in Method 1 in step 401: Perform inverse transformation and dequantization on the coefficient array C(bx,by,fx,fy), to obtain the decoded picture data.

Method 2 corresponding to decoding in Method 2 in step 401: Entropy encode the 8×8 transform coefficient block to obtain the entropy encoded picture data.

In the coding scheme provided in Embodiment 1, an input picture block is split into picture blocks of a preset size, and then the picture blocks are transformed and quantized to obtain a transform coefficient array. Each transform coefficient in the transform coefficient array is processed according to a preset order. When one of the coefficients is arithmetic coded, a probability distribution of the coefficient value is estimated by using a processed coefficient in a neighboring area of the coefficient context. This embodiment of this application can increase a picture compression rate, and save storage resources on a server side.

Embodiment 2

Figure 9:
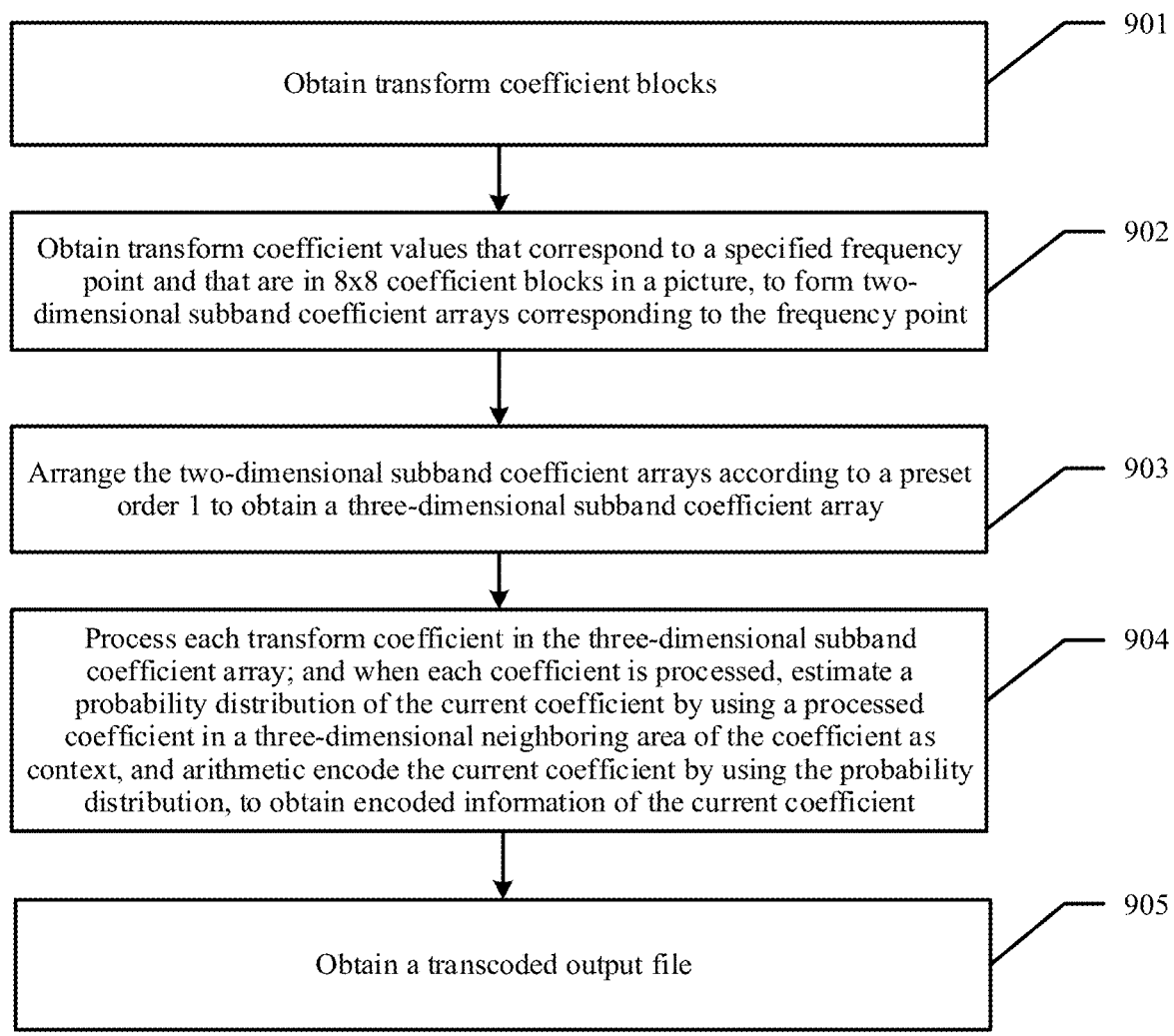
FIG. 9 is a schematic diagram of a correspondence between a two-dimensional subband coefficient array and a transform coefficient block according to an embodiment of this application.

This embodiment relates to a picture coding scheme. First, a transform coefficient block (coefficient block for short) is obtained, and then the coefficient block is lossless encoded, to obtain encoded picture data. This embodiment provides an entire encoding process, which may include, for example, transforming and quantizing a picture area, and then lossless encoding quantized coefficients to obtain encoded picture data. As shown in FIG. 9, a picture encoding procedure mainly includes the following steps.

Step 901: Obtain transform coefficient blocks.

This step is the same as step 401 in Embodiment 1.

Step 902: Obtain transform coefficient values that correspond to a specified frequency point and that are in 8×8 transform coefficient blocks in the picture, to form two-dimensional subband coefficient arrays corresponding to the frequency point.

This step is the same as step 402 in Embodiment 1.

Step 903: Arrange the two-dimensional subband coefficient arrays according to a preset order 1 to obtain a three-dimensional subband coefficient array.

Figure 10:
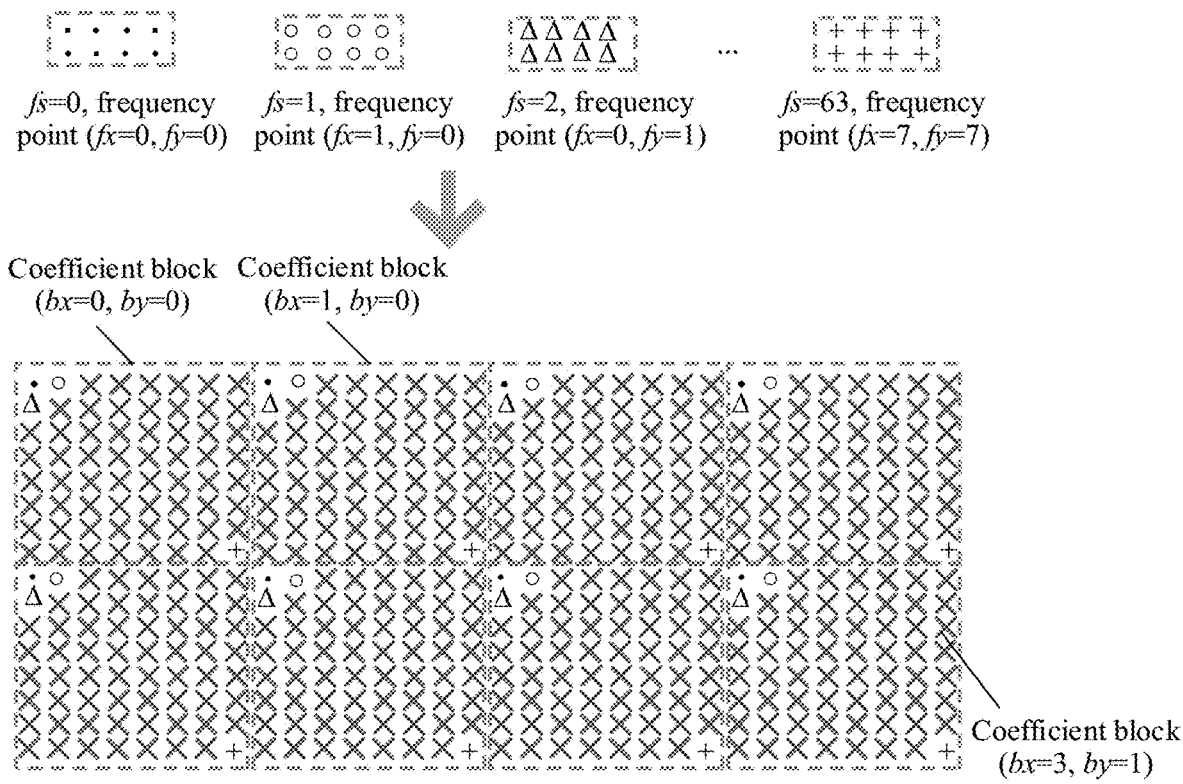
FIG. 10 is a schematic diagram of a picture encoding procedure according to an embodiment of this application.

As shown in FIG. 10, two-dimensional subband coefficient arrays Cˆ(fx,fy) (bx,by) corresponding to a specified frequency point (fx,fy) are arranged according to the preset order 1, and a frequency index of sorted two-dimensional subband coefficient arrays is set to fs. First, any 8×8 transform coefficient block in the picture is obtained, and the transform coefficients that correspond to the specified frequency point (fx,fy) and that are in the coefficient block are sorted according to the preset order 1. In this case, a sorting index of the two-dimensional subband coefficient array corresponding to the specified frequency point (fx,fy) is the same as a sorting index of the two-dimensional subband coefficient array in the coefficient block. In this way, the frequency index fs of the two-dimensional subband coefficient array Cˆ(fx,fy) (bx,by) corresponding to the specified frequency point (fx,fy) is determined. A coefficient block (bx=0, by=0) is used as an example. If the preset order 1 is zigzag scanning, fs=0 corresponds to a two-dimensional subband coefficient array corresponding to a frequency point (fx=0, fy=0), fs=1 corresponds to a two-dimensional subband coefficient array corresponding to a frequency point (fx=1,fy=0), and fs=2 corresponds to a two-dimensional subband coefficient array corresponding to a frequency point (fx=0, fy=1). The two-dimensional subband coefficient arrays Cˆ(fx,fy) (bx, by) are combined together to obtain a three-dimensional subband coefficient array C(bx,by,fs) shown in FIG. 11a. A value of a one-dimensional frequency index fs is an integer in 0, . . . , and subW×subH−1. It may be understood that the frequency index fs is an index obtained after the two-dimensional subband coefficient arrays are sorted according to the preset order.

The preset order 1 may be an arrangement order obtained through zig-zag scanning, or may be a preset order obtained by using another scanning method, for example, row-by-row scanning, column-by-column scanning, or diagonal scanning. Row-by-row scanning is to perform continuous scanning from a first row to a last row of a picture. Column-by-column scanning is to perform continuous scanning from a first column to a last column of the picture.

Figure 11A:
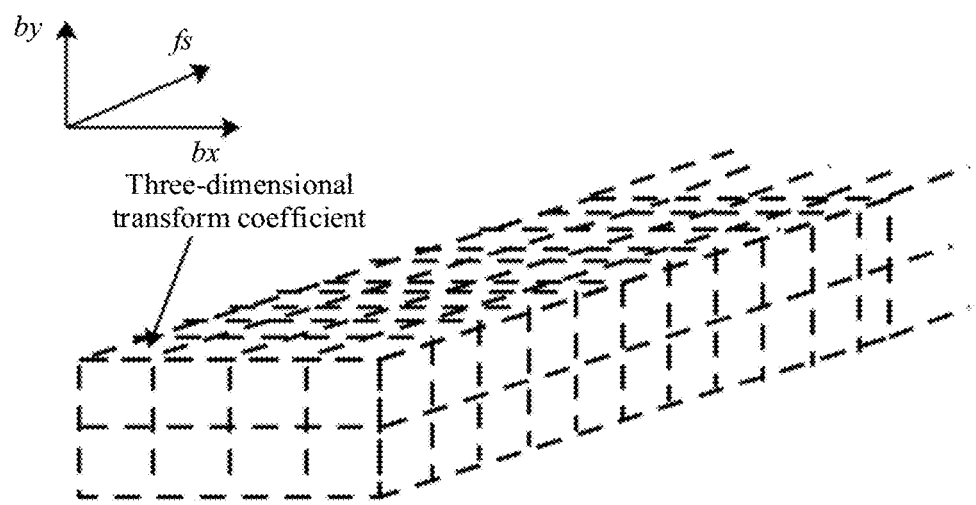
FIG. 11a is a schematic diagram of a three-dimensional subband coefficient array according to an embodiment of this application.

FIG. 11a is a schematic diagram of a three-dimensional subband coefficient array according to this embodiment of this application. A three-dimensional subband coefficient array C(bx,by,fs) may include data in three dimensions: bx, by, and fs.

It should be noted that steps 901 and 902 in this embodiment are the same as steps 401 and 402 in Embodiment 1. A difference lies in that, in Embodiment 2, a step of combining the two-dimensional subband coefficient arrays into the three-dimensional subband coefficient array according to a preset order is added.

Step 904: Process each transform coefficient in the three-dimensional subband coefficient array; and when each coefficient is processed, estimate a probability distribution of the current coefficient by using a processed coefficient in a three-dimensional neighboring area of the coefficient as context, and arithmetic encode the current coefficient by using the probability distribution, to obtain encoded information of the current coefficient.

Figure 11B:
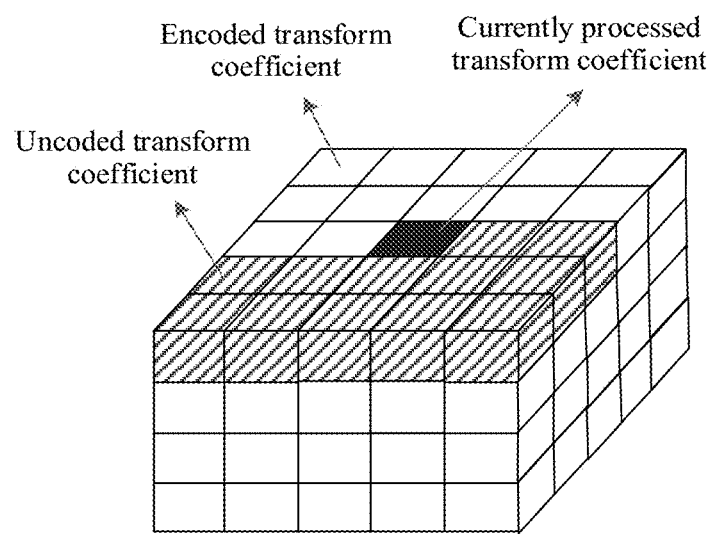
FIG. 11b is a schematic diagram of a three-dimensional neighboring area of a transform coefficient according to an embodiment of this application.

FIG. 11b is a schematic diagram of a three-dimensional transform coefficient according to this embodiment of this application. In the figure, one square filled in black represents a currently processed transform coefficient, a square filled with horizontal lines represents an unencoded transform coefficient, and a white square represents an encoded transform coefficient. In this case, a three-dimensional neighboring area of the currently processed transform coefficient may include the encoded transform coefficient.

Step 9041: Set a processing order of each transform coefficient in the three-dimensional subband coefficient array C(bx,by,fs).

Specifically, one of the following methods may be used to set the processing order of each transform coefficient, where Method 1 is an optimal method.

Method 1: When each transform coefficient in the three-dimensional subband coefficient array C(bx,by,fs) is processed, two-dimensional coefficient subband arrays at each layer fs satisfying fs=0 to subW×subH−1 are processed in sequence. When the two-dimensional coefficient subband arrays at each layer are processed, each transform coefficient in a two-dimensional coefficient subband array C(bx,by) is processed according to the preset order 2.

Method 2: When each transform coefficient in the three-dimensional subband coefficient array C(bx,by,fs) is processed, two-dimensional coefficient subband arrays at each layer bx satisfying bx=0 to M−1 are processed in sequence. When the two-dimensional coefficient subband arrays at each layer are processed, each transform coefficient in a two-dimensional coefficient subband array C(by,fs) is processed according to the preset order 2.

Method 3: When each transform coefficient in the three-dimensional subband coefficient array C(bx,by,fs) is processed, two-dimensional coefficient subband arrays at each layer by satisfying by=0 to N−1 are processed in sequence. When the two-dimensional coefficient subband arrays at each layer are processed, each transform coefficient in a two-dimensional coefficient subband array C(bx,fs) is processed according to the preset order 2.

It should be noted that a processing order, for example, zig-zag scanning, row-by-row scanning, or column-by-column scanning, may be used for the preset order 2. A meaning of the preset order 2 is the same as that of the "preset order 1" in step 3. Details are not described herein again.

Step 9042: Obtain a probability distribution of the coefficient.

When a coefficient is processed, a probability distribution of the coefficient is estimated by using a processed coefficient in a three-dimensional neighboring area of the coefficient as context, and the current coefficient is arithmetic encoded by using the probability distribution to obtain encoded information of the current coefficient.

The coefficient in the three-dimensional neighboring area of the coefficient may be obtained according to the following method: It is assumed that coordinates of the coefficient are (bx0,by0,fs0). If a coordinate position (bx1,by1,fs1) satisfies bx0−M1≤bx1≤bx0+N1, by0−M2≤by1≤by0+N2, and fs0−N3≤fs1≤fs0, a coefficient in a position (bx1,by1,fs1) falls within a three-dimensional neighboring area of the coefficient. M1, M2, N1, N2, and N3 are integers greater than or equal to 0, and values of M1, M2, N1, N2, and N3 may be equal or may be not equal to each other. This is not limited herein. For example, the values of M1, M2, N1, N2, and N3 may be 1, 2, 3, 4, or 5. Therefore, the processed coefficient in the three-dimensional neighboring area of the coefficient further includes a processed coefficient in the two-dimensional neighboring area of the coefficient. This is not limited herein. Particularly, when fs1=fs0, the selected context and a to-be-processed coefficient are in the same two-dimensional neighboring area. This facilitates concurrent encoding. In other words, probability estimation is performed concurrently on a plurality of coefficients, and probability distributions of the plurality of coefficients are obtained at the same time. This improves encoding efficiency.

It should be noted that when probability distributions of the coefficients are obtained, probability estimation may also be performed concurrently on the probability distributions of the coefficients, that is, the probability distributions of plurality of coefficients are obtained at a time. Then, each transform coefficient is lossless encoded according to the preset order 2. Alternatively, the plurality of coefficients are lossless encoded concurrently.

First, after a coefficient in a three-dimensional neighboring area of the coefficient is obtained as context, context information is input into a probability estimation network, probability estimation is performed on the coefficient to obtain a probability distribution of the coefficient, and the current coefficient is lossless encoded by using the probability distribution, to obtain encoded information of the coefficient. A probability distribution estimation method used in the probability estimation network includes a probability distribution estimation method based on a deep learning network, for example, a recurrent neural network or a pixel convolutional neural network.

Specifically, a coefficient probability distribution estimation method is as follows: Method 1: The probability estimation network directly performs probability estimation on a value in a value range based on a dynamic value range of the coefficient, to obtain a probability vector. The probability vector includes a probability value of each value in the value range, where a sum of all probability values is 1. Method 2: Obtain a probability vector by using a probability distribution model. For example, modeling is performed by using a Gaussian single model or a Gaussian mixture model, a model parameter is estimated by using a probability estimation network, and the model parameter is substituted into the probability distribution model to obtain a probability vector.

Step 905: Obtain a transcoded output file.

Entropy encoded information is output, to obtain a transcoded output file.

Figure 12:
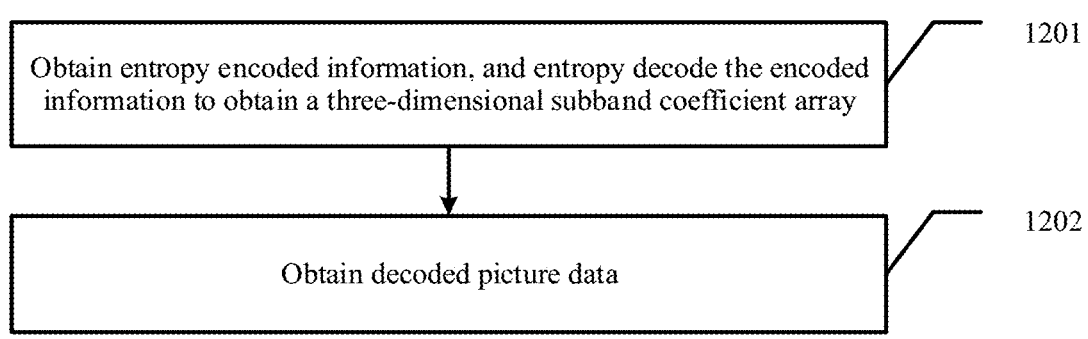
FIG. 12 is a schematic diagram of a picture decoding procedure according to an embodiment of this application.

FIG. 12 is a schematic diagram of a picture decoding procedure according to an embodiment of this application. The picture decoding procedure mainly includes the following steps.

Step 1201: Obtain entropy encoded information, and entropy decode the encoded information to obtain decoded transform coefficients.

When the entropy encoded information is entropy decoded, each bit is decoded according to the same processing order as that of an encoder side. For example, the same processing order is as follows: To-be-decoded coefficients that correspond to a frequency point and that are in the picture encoded information are first determined according to a frequency point scanning order. Then, the to-be-decoded coefficients corresponding to the frequency point are decoded according to a coefficient scanning order. When each bit is processed, the to-be-decoded bit is input into the same probability estimation network as that of the encoder side, a probability distribution of the current bit is estimated by using a processed bit in a three-dimensional neighboring area of the bit as context, and the current bit is decoded by using the probability distribution, to obtain a transform coefficient of the current bit. After each bit is decoded, transform coefficient blocks or coefficient arrays C(bx,by,fx,fy) are obtained.

Step 1203: Obtain decoded picture data.

Method 1 corresponding to decoding in Method 1 in step 401: Perform inverse transformation and dequantization on the coefficient array C(bx,by,fx,fy), to obtain the decoded picture data.

Method 2 corresponding to decoding in Method 2 in step 401: Entropy encode the 8×8 transform coefficient block to obtain the entropy encoded picture data.

In the coding scheme provided in Embodiment 2, in this embodiment, transform coefficients are combined based on frequency components to obtain a three-dimensional coefficient array C(bx,by,fs). When one of the coefficients is arithmetic encoded, a probability distribution of the coefficient value is estimated by using a processed coefficient in a neighboring area of the coefficient as context. This embodiment of this application can increase a picture compression rate, and save storage resources on a server side.

Embodiment 3

This embodiment relates to a picture coding scheme. First, a transform coefficient block (coefficient block for short) is obtained, and then the coefficient block is lossless encoded, to obtain encoded picture data. This embodiment provides an entire encoding process, which may include, for example, transforming and quantizing a picture area, and then lossless encoding quantized coefficients to obtain encoded picture data.

Figure 13:
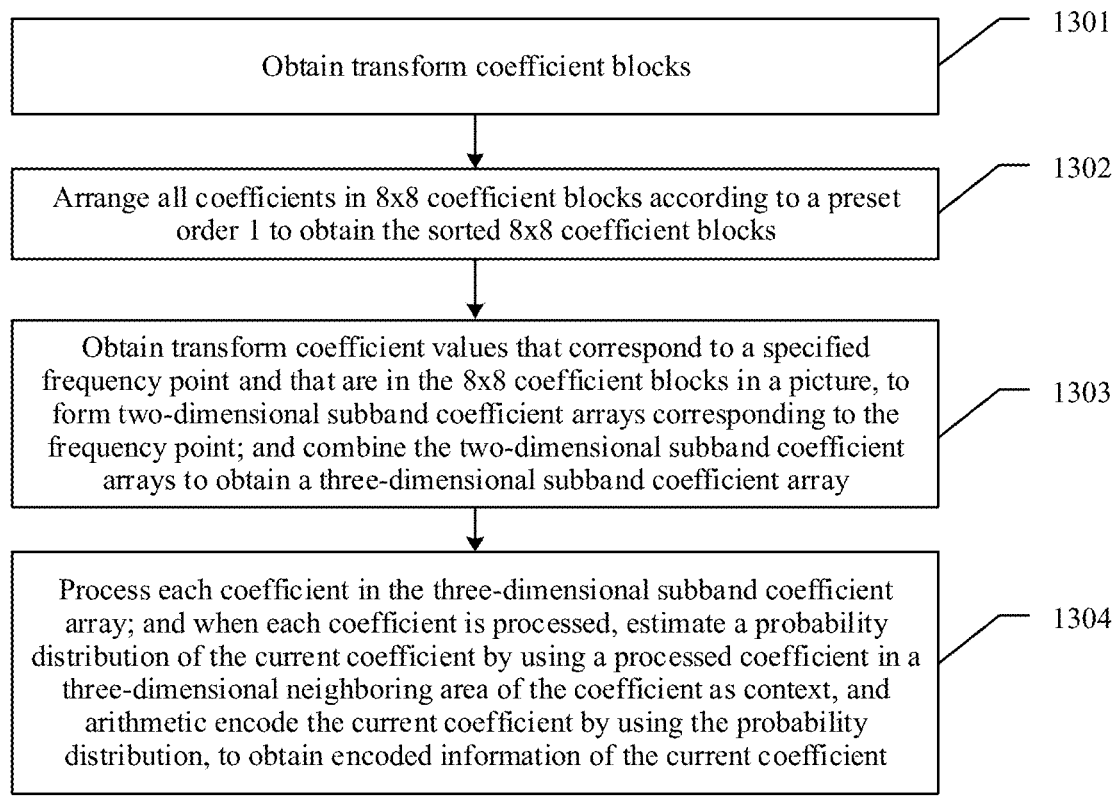
FIG. 13 is a schematic diagram of a picture encoding procedure according to an embodiment of this application.

In this embodiment, the method in step 401 of Embodiment 1 is used. After the transform coefficient array C(bx,by,fx,fy) is obtained, the following two encoding methods are available:

Method 1: First, all transform coefficients in the coefficient block are sorted according to a preset order 1, and then coefficients corresponding to the same frequency point are obtained and combined to obtain a three-dimensional subband coefficient array (three-dimensional coefficient array for short). As shown in FIG. 13, a picture encoding procedure mainly includes the following steps.

Step 1301: Obtain transform coefficient blocks.

This step is the same as step 401 in Embodiment 1.

Step 1302: Arrange all transform coefficients in 8×8 transform coefficient blocks according to a preset order 1 to obtain the sorted 8×8 transform coefficient blocks.

Step 1303: Obtain transform coefficient values that correspond to a specified frequency point and that are in the 8×8 transform coefficient blocks in a picture, to form two-dimensional subband coefficient arrays corresponding to the frequency point; and combine the two-dimensional subband coefficient arrays to obtain a three-dimensional subband coefficient array.

Step 1304: Process each transform coefficient in the three-dimensional subband coefficient array; and when each coefficient is processed, estimate a probability distribution of the current coefficient by using a processed coefficient in a three-dimensional neighboring area of the coefficient as context, and arithmetic encode the current coefficient by using the probability distribution, to obtain encoded information of the current coefficient. Specifically, this step is the same as step 904 in Embodiment 2.

Method 2: The implementation solution of this method is similar to that of Embodiment 1, and combination into a three-dimensional subband coefficient array is not required.

First, each transform coefficient in the 8×8 transform coefficient blocks is scanned according to a preset order 1 to obtain a frequency index fs. Then, transform coefficient values that correspond to a specified frequency point and that are in the 8×8 transform coefficient blocks are obtained, to form two-dimensional subband coefficient arrays corresponding to the frequency point.

Each two-dimensional subband coefficient array is processed based on fs. Each transform coefficient in each two-dimensional subband coefficient array is processed according to a preset order 2. When each transform coefficient is processed, a probability distribution of the current coefficient is estimated by selecting a processed coefficient in a preset spatially neighboring area and a subband neighboring area as context, and the current coefficient is arithmetic encoded by using the probability distribution to obtain encoded information of the current coefficient.

In the coding scheme provided in Embodiment 3, the processing order of processing each transform coefficient in this embodiment is different from that in Embodiment 1 and that in Embodiment 2.

FIG. 12 is a schematic diagram of a picture decoding procedure according to an embodiment of this application. The picture decoding procedure mainly includes the following steps.

Step 1201: Obtain entropy encoded information, and entropy decode the encoded information to obtain decoded transform coefficients.

When the entropy encoded information is entropy decoded, each bit is decoded according to the same processing order as that of an encoder side. For example, the same processing order is as follows: To-be-decoded coefficients that correspond to a frequency point and that are in the picture encoded information are first determined according to a frequency point scanning order. Then, the to-be-decoded coefficients corresponding to the frequency point are decoded according to a coefficient scanning order. When each bit is processed, the to-be-decoded bit is input into the same probability estimation network as that of the encoder side, a probability distribution of the current bit is estimated by using a processed bit in a three-dimensional neighboring area of the bit as context, and the current bit is decoded by using the probability distribution, to obtain a transform coefficient of the current bit. After each bit is decoded, transform coefficient blocks or coefficient arrays C(bx,by,fx,fy) are obtained.

Step 1202: Obtain decoded picture data.

Method 1 corresponding to decoding in Method 1 in step 401: Perform inverse transformation and dequantization on the coefficient array C(bx,by,fx,fy), to obtain the decoded picture data.

Method 2 corresponding to decoding in Method 2 in step 401: Entropy encode the 8×8 transform coefficient block to obtain the entropy encoded picture data.

In the coding scheme provided in Embodiment 3, in this embodiment, transform coefficients are combined based on frequency components to obtain a three-dimensional coefficient array C(bx,by,fs). When one of the coefficients is arithmetic encoded, a probability distribution of the coefficient value is estimated by using a processed coefficient in a neighboring area of the coefficient as context. This embodiment of this application can increase a picture compression rate, and save storage resources on a server side.

Embodiment 4

Figure 14:
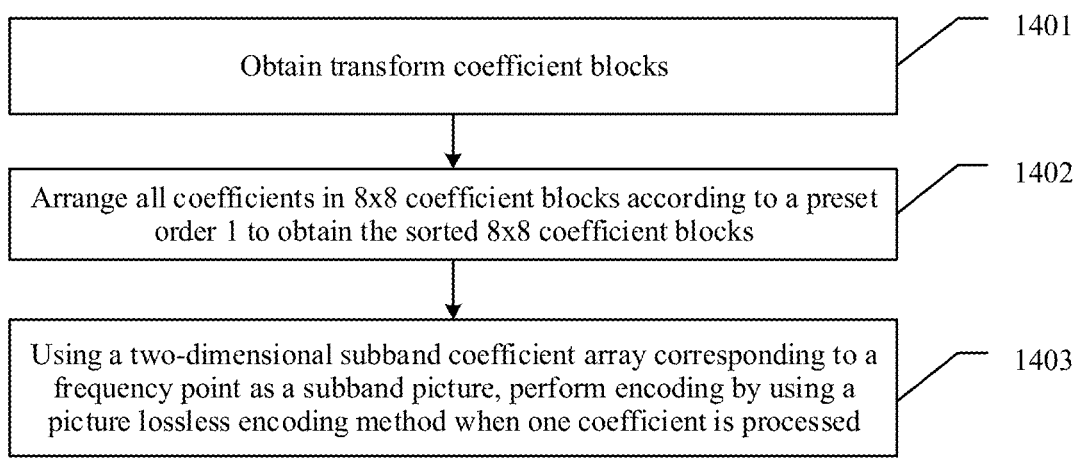
FIG. 14 is a schematic diagram of a picture encoding procedure according to an embodiment of this application.

This embodiment relates to a picture coding scheme. First, a transform coefficient block (coefficient block for short) is obtained, and then the coefficient block is lossless encoded, to obtain encoded picture data. This embodiment provides an entire encoding process, which may include, for example, transforming and quantizing a picture area, and then lossless encoding quantized coefficients to obtain encoded picture data. As shown in FIG. 14, a picture encoding procedure mainly includes the following steps.

Step 1401: Obtain transform coefficient blocks.

This step is the same as step 401 in Embodiment 1.

Step 1402: Obtain transform coefficient values that correspond to a specified frequency point and that are in 8×8 transform coefficient blocks in the picture, to form two-dimensional subband coefficient arrays corresponding to the frequency point.

It should be noted that steps 1401 and 1402 in this embodiment are the same as steps 401 and 402 in Embodiment 1. A difference lies in that, during entropy coding in Embodiment 4, a two-dimensional subband coefficient array is used as a subband picture for encoding.

Step 1403: Using a two-dimensional subband coefficient array corresponding to the frequency point as a subband picture, perform encoding by using a picture lossless encoding method when one coefficient is processed.

A subband picture is processed according to a preset order by using a two-dimensional subband coefficient array C^(fx, fy) (bx,by) corresponding to a specified frequency point as the subband picture, and a subband picture processing order index is set to fs. When a coefficient of the subband picture is processed, an existing lossless picture processing method is used for encoding, for example, a lossless encoding mode in standard solutions such as H.264 and H.265, for example, an arithmetic encoding method.

A method for obtaining the processing order index fs includes: first obtaining any 8×8 transform coefficient block in a picture, and sorting, according to a preset order 1, the transform coefficients that correspond to a specified frequency point (fx,fy) and that are in the coefficient block. In this case, the processing order index fs of the two-dimensional subband coefficient array corresponding to the specified frequency point (fx,fy) is the same as a sorting index of the two-dimensional subband coefficient array in the coefficient block.

The preset order has the same meaning as that in Embodiment 1. Details are not described herein again.

In the coding scheme provided in Embodiment 4, during entropy encoding, a two-dimensional subband coefficient array is used as a subband picture for encoding. In this way, the scheme is easier to implement.

Embodiment 5

Figure 15:
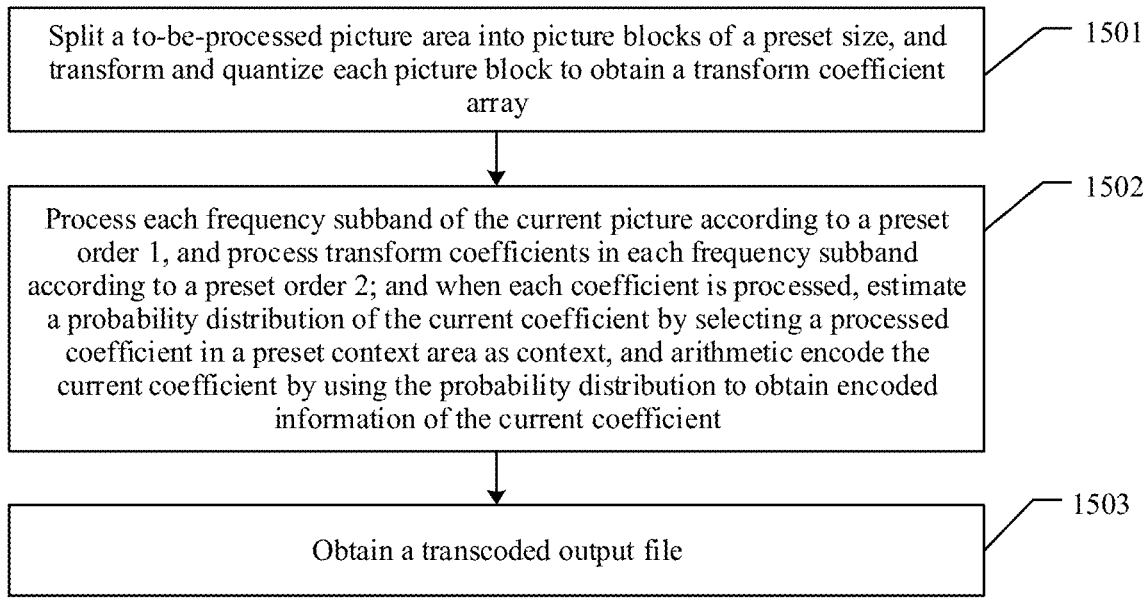
FIG. 15 is a schematic diagram of a picture encoding procedure according to an embodiment of this application.

This embodiment relates to a picture coding scheme. First, a transform coefficient block (coefficient block for short) is obtained, and then the coefficient block is lossless encoded, to obtain encoded picture data. This embodiment provides an entire encoding process, which may include, for example, transforming and quantizing a picture area, and then lossless encoding quantized coefficients to obtain encoded picture data. As shown in FIG. 15, a picture encoding procedure mainly includes the following steps.

Step 1501: Obtain transform coefficient blocks.

This step is the same as step 401 in Embodiment 1.

Step 1501: Split a to-be-processed picture area into picture blocks of a preset size, and transform and quantize each picture block to obtain a transform coefficient array.

First, a to-be-processed picture or the to-be-processed picture area is split into picture subblocks of the same preset size, where the picture subblocks of the preset size may have sizes of 4×4, 8×8, 16×16, 32×32, 64×64, 128×128, 256×256, and the like.

As shown in FIG. 5, DCT transform is performed on the picture subblocks of the preset size to obtain the transform coefficient blocks. Optionally, the transform coefficient blocks are quantized to obtain quantized transform coefficient arrays C(bx,by,fx,fy). Each transform coefficient in the coefficient array may be represented by C_(bx,by)^(fx,fy). (bx,by) represents horizontal and vertical position indexes of a coefficient block, bx=0, . . . , M−1, by=0, . . . , N−1, M=W/subW, and N=H/subH, where M and N are respectively the width and the height of a picture on a per-picture subblock basis, W and H respectively represent the width and the height of the current picture, and subW and subH respectively represent the width and the height of a picture subblock in the current picture. (fx,fy) represents a frequency index of each frequency point in the coefficient block relative to a frequency point of the top-left vertex, where fx=0, . . . , subW−1, and fy=0, . . . , subH−1. An example in which a picture subblock of a preset size has a size of 8×8 is used in some embodiments of this application. That is, both the width and the height of the picture subblock are 8, that is, values of both subW and subH are 8. Details are not described in the following.

For example, as shown in FIG. 5, (bx=0, by=0) represents the first coefficient block, (bx=0, by=1) represents the second coefficient block in a first row, and so on. (fx=0, fy=1) represents a frequency index of a frequency point whose coordinates are (0, 1) and that is relative to the frequency point of the top-left vertex in the coefficient block. C (bx=1, by=0)^(fx=3,fy=2) represents a coefficient value represented by a position (fx=3,fy=2) in a coefficient block (bx=1, by=0).

A difference between Embodiment 5 and Embodiments 1 to 4 lies in that, when each transform coefficient is processed, neither an action of forming a two-dimensional subband coefficient array nor an action of forming a three-dimensional coefficient array is performed, but the coefficient blocks obtained in step 1501 are directly processed according to the preset order 1 and the preset order 2. This is easy to implement, and complexity is low.

It is not limited that the foregoing step 1501 may be replaced by the following step: entropy decoding entropy encoded picture data, to obtain transform coefficients in 8×8 blocks in a picture.

Transform coefficient encoded information of all picture subblocks in a JPEG file is entropy decoded by using a Huffman decoding method, to obtain transform coefficients, which are a coefficient block for short, of one or more picture subblocks, where each transform coefficient of the coefficient block is denoted as C_(bx,by)^(fx,fy). (bx,by) represents horizontal and vertical position indexes of the coefficient block, bx=0, . . . , M−1, by=0, . . . , N−1, M=W/subW, and N=H/subH, where M and N are respectively the width and the height of a picture on a per-picture subblock basis, W and H respectively represent the width and the height of the current picture, and subW and subH respectively represent the width and the height of a picture subblock in the current picture. (fx,fy) represents a frequency index of each frequency point in the coefficient block relative to a frequency point of the top-left vertex, where fx=0, . . . , subW−1, and fy=0, . . . , subH−1. In some embodiments of this application, both widths and heights of all the picture subblocks in the JPEG file are 8, that is, values of both subW and subH are 8. Details are not described in the following. It is not limited that the technical solutions described in embodiments of this application may alternatively be applied to a case in which values of subW and subH are not 8. For example, subW is not equal to subH.

For example, as shown in FIG. 5, (bx=0, by=0) represents the first coefficient block, (bx=0, by=1) represents the second coefficient block in a first row, and so on. (fx=0, fy=1) represents a frequency index of a frequency point whose coordinates are (0, 1) and that is relative to the frequency point of the top-left vertex in the coefficient block. C (bx=1, by=0)^(fx=3,fy=2) represents a coefficient value represented by a position (fx=3,fy=2) in a coefficient block (bx=0, by=1).

Step 1502: Process each frequency subband of the coefficient blocks of the current picture according to a preset order 1, and process transform coefficients in each frequency subband according to a preset order 2; and when each transform coefficient is processed, estimate a probability distribution of the current coefficient by selecting a processed coefficient in a preset context area as context, and arithmetic encode the current coefficient by using the probability distribution to obtain encoded information of the current coefficient.

It is not limited that the foregoing step 1502 may be replaced by the following step: processing, according to a preset order 1, the transform coefficients that correspond to a frequency point and that are in the coefficient blocks in the current picture, and processing, according to a preset order 2, transform coefficients corresponding to each frequency point; and when each transform coefficient is processed, estimating a probability distribution of the current coefficient by selecting a processed coefficient in a preset context area as context, and arithmetic encoding the current coefficient by using the probability distribution to obtain encoded information of the current coefficient.

For example, the frequency subband is a set $C^{(fx,fy)}(bx,by)$ of coefficients that correspond to a specified frequency point (fx,fy) and that are in an 8×8 transform coefficient block, and there are 64 frequency subbands in this embodiment. First, any 8×8 transform coefficient block in the picture is obtained, and coefficients that correspond to the specified frequency point (fx,fy) and that are in the coefficient block are scanned according to the preset order 1. In this case, an index fs of frequency subbands corresponding to the specified frequency point (fx,fy) is the same as a scanning order of the frequency point in the coefficient block, and the frequency subbands corresponding to fs are processed according to a value order offs. fs is an integer ranging from 0 to subW×subH−1.

Then, when each frequency subband is processed, each transform coefficient in the frequency subband is processed according to the preset order 2. When each transform coefficient is processed, a processed coefficient in a preset context area is selected as context, the context information is input into a probability estimation network, a probability distribution of a coefficient is estimated to obtain a probability distribution of the current coefficient, and the current coefficient is arithmetic encoded by using the probability distribution to obtain encoded information of the current coefficient. The preset context area may include a spatially neighboring area and/or a subband neighboring area of the coefficient, or a three-dimensional neighboring area defined in Embodiment 2.

Specifically, a coefficient probability distribution estimation method is as follows: Method 1: The probability estimation network directly performs probability estimation on a value in a value range based on a dynamic value range of the coefficient, to obtain a probability vector. The probability vector includes a probability value of each value in the value range, where a sum of all probability values is 1. Method 2: Obtain a probability vector by using a probability distribution model. For example, modeling is performed by using a Gaussian single model or a Gaussian mixture model, a model parameter is estimated by using a probability estimation network, and the model parameter is substituted into the probability distribution model to obtain a probability vector.

First, after a coefficient in a three-dimensional neighboring area of the coefficient is obtained as context, context information is input into the probability estimation network, probability estimation is performed on the coefficient to obtain a probability distribution of the coefficient, and the current coefficient is lossless encoded by using the probability distribution, to obtain encoded information of the coefficient. A probability distribution estimation method used in the probability estimation network may include a probability distribution estimation method based on a deep learning network, for example, a recurrent neural network or a convolutional neural network.

It is assumed that coordinates of the coefficient are (bx0,by0,fs0). If any coordinate position (bx1,by1,fs1) in a preset context area satisfies bx0−M1≤bx1≤bx0+N1, by0−M2≤by1≤by0+N2, and fs1=fs0, a coefficient in a position (bx1,by1,fs1) falls within a subband neighboring area of the coefficient.

If any coordinate position (bx1,by1,fs1) in a preset context area satisfies bx1=bx0, by0−M2≤by1≤by0+N2, and fs0−N3≤fs1≤fs0, or satisfies bx0−M1≤bx1≤bx0+N1, by1=by0, and fs0−N3≤fs1≤fs0, a coefficient in the (bx1,by1,fs1) position falls within a spatially neighboring area of the coefficient. M1, M2, N1, N2, and N3 are integers greater than or equal to 0, and values of M1, M2, N1, N2, and N3 may be equal or may be not equal to each other. This is not limited herein. For example, the values of M1, M2, N1, N2, and N3 may be 1, 2, 3, 4, or 5.

The preset order 1 and the preset order 2 may be processing orders obtained through zig-zag (zig-zag) scanning, or may be processing orders obtained by using another scanning method, for example, row-by-row scanning, column-by-column scanning, diagonal scanning, horizontal reverse scanning, or vertical reverse scanning. Row-by-row scanning is to perform continuous scanning from a first row to a last row of a picture. Column-by-column scanning is to perform continuous scanning from a first column to a last column of the picture.

Step 1503: Obtain a transcoded output file.

Entropy encoded information is output, to obtain a transcoded output file.

Figure 16:
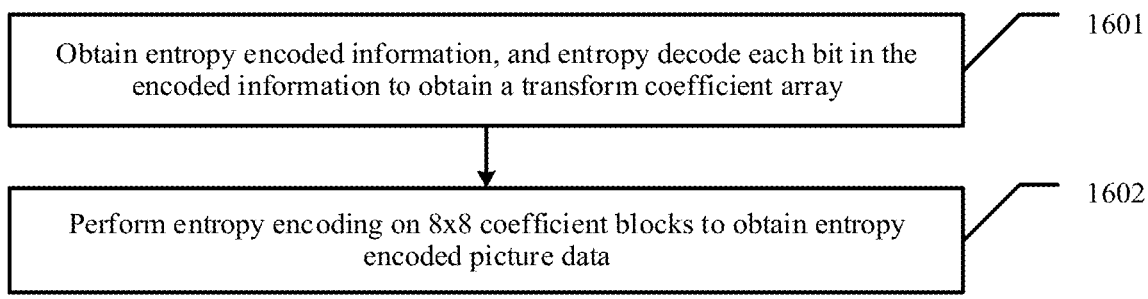
FIG. 16 is a schematic diagram of a picture decoding procedure according to an embodiment of this application.

FIG. 16 is a schematic diagram of a picture decoding procedure according to an embodiment of this application. The picture decoding procedure mainly includes the following steps.

Step 1601: Obtain entropy encoded information, and entropy decode each bit in the encoded information to obtain decoded transform coefficients.

When the entropy encoded information is entropy decoded, each bit is decoded according to the same processing order as that of the encoder side. Each frequency subband is first obtained according to a frequency subband index or a preset order 1, and then bits in each frequency subband are processed according to a preset order 2. When each bit is processed, a decoded bit in a preset context area of the bit is used as context and input to a probability estimation network, a probability distribution of the current bit is obtained, and the current bit is decoded by using the probability distribution to obtain a transform coefficient of the current bit. All bits output by the encoder side are entropy decoded in sequence to obtain transform coefficients of each bit, so as to obtain a coefficient block of the picture.

Step 1602: Obtain decoded picture data.

Method 1 corresponding to decoding in Method 1 in step 401: Perform inverse transformation and dequantization on the coefficient block to obtain decoded picture data.

Method 2 corresponding to decoding in Method 2 in step 401: Entropy encode the 8×8 transform coefficient block to obtain the entropy encoded picture data.

In the coding scheme provided in Embodiment 5, a frequency subband is directly encoded without generating a two-dimensional subband coefficient array. This scheme is easier to implement.

Embodiments of this application relate to block transform and coefficient coding in video picture compression. Transform coefficients are combined according to a specified frequency point to obtain a three-dimensional coefficient array $C(bx,by,fs)$, and coefficient subpictures corresponding to each frequency index fs are lossless coded. Transform coefficients are combined according to a specified frequency point to obtain a three-dimensional coefficient array $C(bx,by,fs)$. When one of the coefficients is arithmetic coded, a probability distribution of the coefficient value is estimated by using a processed coefficient in a three-dimensional neighboring area of the coefficient as context. Each two-dimensional subband coefficient array $C\hat{\,}(fx,fy)(bx,by)$ is processed according to a preset order 1. Each transform coefficient in each two-dimensional subband coefficient array is processed according to a preset order 2. A probability distribution of the coefficient value is estimated by using a processed coefficient in a neighboring area of the coefficient is used as context. A two-dimensional subband coefficient array $C\hat{\,}(fx,fy)(bx,by)$ corresponding to a specified frequency point is obtained. The two-dimensional subband coefficient array corresponding to the frequency point is used as a subband picture. Each subband picture is processed according to a preset order 1. When each transform coefficient of the subband pictures is processed, the transform coefficient is coded by using a picture lossless coding method. All frequency subbands of the current picture are processed according to a preset order 1, and transform coefficients in each frequency subband are processed according to a preset order 2. The frequency subband is a set $C\hat{\,}(fx,fy)(bx,by)$ of coefficients that correspond to a specified frequency point $(fx,fy)$ and that are in an 8×8 transform coefficient block.

It can be learned from the foregoing example description that in embodiments of this application, a to-be-processed picture area is split into picture blocks of a preset size, and each picture block is transformed and quantized to obtain a transform coefficient array $C(bx,by,fx,fy)$. Then, all coefficients are entropy encoded according to a preset order, where coefficients of all coefficient blocks corresponding to each frequency index are preferentially processed according to the preset order. When each coefficient is entropy encoded, a processed coefficient in a neighboring area is selected as a context according to a spatially neighboring relationship of the coefficient and a frequency component neighboring relationship of the coefficient, to estimate a probability distribution of the current coefficient, and a subsequent coding operation is performed on the current coefficient based on the probability distribution. This embodiment of this application can further reduce the size of a compressed file and the storage costs of a video picture file on a server side.

It should be noted that, for brief description, the foregoing method embodiments are expressed as a series of action combinations. However, a person skilled in the art should appreciate that this application is not limited to the described action sequence, because some steps may be performed in another sequence or simultaneously according to this application.

To better implement the foregoing solutions in embodiments of this application, the following further provides related apparatuses configured to implement the foregoing solutions.

Figure 17:
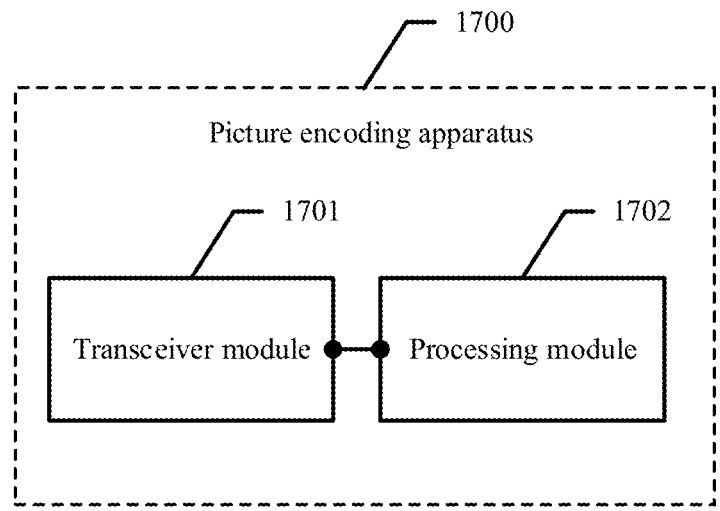
FIG. 17 is a schematic diagram of a composition structure of a picture encoding apparatus according to an embodiment of this application.

Refer to FIG. 17. An embodiment of this application provides a picture encoding apparatus 1700, which may include a transceiver module 1701 and a processing module 1702.

The transceiver module is configured to obtain at least two transform coefficient blocks, where each of the at least two transform coefficient blocks includes at least two transform coefficients, and transform coefficients in a transform coefficient block correspond to different frequency points.

The processing module is configured to: determine, according to a preset frequency point scanning order, the transform coefficients that are in the at least two transform coefficient blocks and that correspond to a frequency point; and encode, according to a preset coefficient scanning order, each transform coefficient corresponding to the frequency point, to obtain picture encoded information. In some embodiments of this application, the frequency point scanning order may be preset or preconfigured, and the frequency point is determined based on the frequency point scanning order. The frequency point may be any frequency point. Each frequency point corresponds to one transform coefficient in each of the at least two transform coefficient blocks, that is, one frequency point corresponds to a plurality of transform coefficients, and the plurality of transform coefficients come from different transform coefficient blocks. The coefficient scanning order may be preset or preconfigured, and transform coefficients corresponding to the frequency point are encoded according to the coefficient scanning order, to finally obtain picture encoded information. In some embodiments of this application, the picture encoded information can be obtained only by encoding, according to the coefficient scanning order, the transform coefficients that correspond to the same frequency point and that are in the at least two transform coefficient blocks. Therefore, a plurality of transform coefficients corresponding to the same frequency point can be encoded, thereby improving picture compression efficiency. In addition, in some embodiments of this application, the picture encoded information is obtained by encoding, according to the coefficient scanning order, the transform coefficients that correspond to the same frequency point and that are in the at least two transform coefficient blocks. In this way, the file size of the picture encoded information obtained through encoding is reduced, storage costs of the picture encoded information are reduced, and storage resources are saved.

In a possible implementation, the processing module is configured to: obtain at least two two-dimensional subband coefficient arrays from the at least two transform coefficient blocks, where each two-dimensional subband coefficient array includes the transform coefficients that correspond to the same frequency point and that are in the at least two transform coefficient blocks, and the transform coefficients included in different two-dimensional subband coefficient arrays correspond to different frequency points; determine a first two-dimensional subband coefficient array from the at least two two-dimensional subband coefficient arrays according to the preset frequency point scanning order; determine a first transform coefficient from the first two-dimensional subband coefficient array according to the preset coefficient scanning order; and entropy encode the first transform coefficient based on a context area corresponding to the first transform coefficient.

In a possible implementation, the processing module is configured to: obtain at least two two-dimensional subband coefficient arrays from the at least two transform coefficient blocks, where each two-dimensional subband coefficient array includes the transform coefficients that correspond to the same frequency point and that are in the at least two transform coefficient blocks, and the transform coefficients included in different two-dimensional subband coefficient arrays correspond to different frequency points; combine the at least two two-dimensional subband coefficient arrays according to the preset frequency point scanning order to obtain a three-dimensional subband coefficient array; determine a first two-dimensional subband coefficient array from the three-dimensional subband coefficient array according to a preset three-dimensional subband coefficient scanning order; determine a first transform coefficient from the first two-dimensional subband coefficient array according to the preset coefficient scanning order; and entropy encode the first transform coefficient based on a context area corresponding to the first transform coefficient.

In a possible implementation, the processing module is configured to: sort the at least two transform coefficient blocks according to the preset frequency point scanning order to obtain the sorted at least two transform coefficient blocks; obtain, from the sorted at least two transform coefficient blocks, a plurality of two-dimensional subband coefficient arrays corresponding to different frequency points; combine the plurality of two-dimensional subband coefficient arrays corresponding to the different frequency points to obtain a three-dimensional subband coefficient array; determine a first two-dimensional subband coefficient array from the three-dimensional subband coefficient array according to a preset three-dimensional subband coefficient scanning order; determine a first transform coefficient from the first two-dimensional subband coefficient array according to the preset coefficient scanning order; and entropy encode the first transform coefficient based on a context area corresponding to the first transform coefficient.

In a possible implementation, the three-dimensional subband coefficient scanning order includes a preset change order of horizontal position indexes, a preset change order of vertical position indexes, or a preset change order of frequency indexes.

In a possible implementation, the processing module is configured to: determine, according to the preset frequency point scanning order, a first two-dimensional subband coefficient array including the transform coefficients that correspond to the same frequency point and that are in the at least two transform coefficient blocks; determine a first transform coefficient from the first two-dimensional subband coefficient array according to the preset coefficient scanning order; and entropy encode the first transform coefficient based on a context area corresponding to the first transform coefficient.

In a possible implementation, the processing module is configured to: determine, according to the preset frequency point scanning order, the transform coefficients that are in the at least two transform coefficient blocks and that are included in a frequency subband, where the transform coefficients that are in the at least two transform coefficient blocks and that are included in the frequency subband correspond to the same frequency point; determine, according to the preset coefficient scanning order, a first transform coefficient included in the frequency subband; and entropy encode the first transform coefficient based on a context area corresponding to the first transform coefficient.

In a possible implementation, the processing module is configured to: obtain context information of the first transform coefficient from the context area corresponding to the first transform coefficient, where the context information of the first transform coefficient includes an encoded transform coefficient in the context area corresponding to the first transform coefficient; estimate the first transform coefficient based on the context information of the first transform coefficient, to obtain probability distribution information of the first transform coefficient; and arithmetic encode the first transform coefficient based on the probability distribution information of the first transform coefficient.

In a possible implementation, the context area corresponding to the first transform coefficient includes at least one of the following: a spatially neighboring area of the first transform coefficient, a subband neighboring area of the first transform coefficient, and a three-dimensional neighboring area of the first transform coefficient.

In a possible implementation, the processing module is configured to: when the first transform coefficient is a plurality of transform coefficients, obtain context information of the plurality of transform coefficients from a context area corresponding to the plurality of transform coefficients, where the context information of the plurality of transform coefficients includes an encoded transform coefficient in the context area corresponding to the plurality of transform coefficients; estimate the plurality of transform coefficients concurrently based on the context information of the plurality of transform coefficients, to obtain probability distribution information of the plurality of transform coefficients; and arithmetic encode the plurality of transform coefficients concurrently based on the probability distribution information of the plurality of transform coefficients.

In a possible implementation, the context area corresponding to the plurality of transform coefficients includes at least one of the following: a spatially neighboring area of the plurality of transform coefficients, a subband neighboring area of the plurality of transform coefficients, and a three-dimensional neighboring area of the plurality of transform coefficients.

In a possible implementation, the processing module is configured to: obtain at least two two-dimensional subband coefficient arrays from the at least two transform coefficient blocks, where each two-dimensional subband coefficient array includes the transform coefficients that correspond to the same frequency point and that are in the at least two transform coefficient blocks, and the transform coefficients included in different two-dimensional subband coefficient arrays correspond to different frequency points; determine, according to the preset frequency point scanning order, at least two subband pictures corresponding to the at least two two-dimensional subband coefficient arrays; encode transform coefficients in the at least two subband pictures according to the preset coefficient scanning order.

In a possible implementation, the transceiver module is configured to: obtain transform coefficient encoded information of the at least two picture blocks; and entropy decode the transform coefficient encoded information to obtain the at least two transform coefficient blocks.

In a possible implementation, the transceiver module is configured to: split an original picture area into at least two picture blocks, where the original picture area includes a pixel picture area or a residual picture area; and transform and quantize the at least two picture blocks to obtain the at least two transform coefficient blocks.

In the third aspect of this application, composition modules of the picture processing apparatus may further perform the steps described in the first aspect and the possible implementations. For details, refer to the descriptions in the first aspect and the possible implementations.

Figure 18:
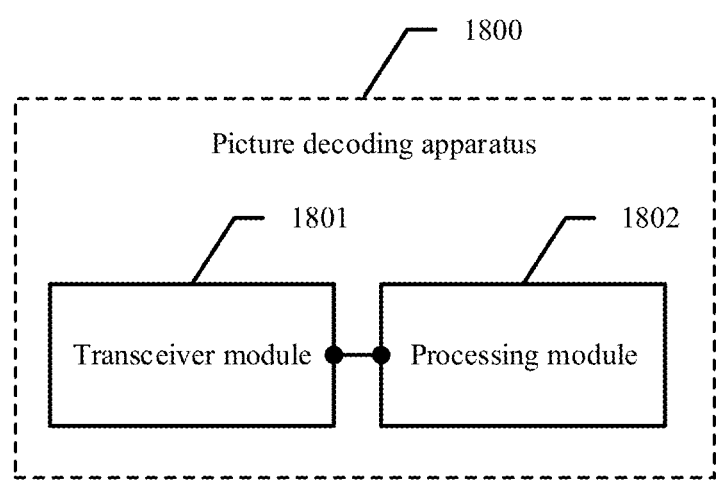
FIG. 18 is a schematic diagram of a composition structure of a picture decoding apparatus according to an embodiment of this application.

Refer to FIG. 18. An embodiment of this application provides a picture decoding apparatus 1800, which may include a transceiver module 1801 and a processing module 1802.

The transceiver module is configured to obtain picture encoded information.

The processing module is configured to: determine, according to a preset frequency point scanning order, the to-be-decoded transform coefficients that correspond to a frequency point and that are in the picture encoded information; and decode, according to a preset coefficient scanning order, the to-be-decoded transform coefficients corresponding to the frequency point, to obtain at least two transform coefficient blocks, where each of the at least two transform coefficient blocks includes at least two transform coefficients, and transform coefficients in a transform coefficient block correspond to different frequency points.

In a possible implementation, the processing module is configured to: determine, according to the preset frequency point scanning order, a first to-be-decoded two-dimensional subband coefficient array from the picture encoded information, where the first to-be-decoded two-dimensional subband coefficient array includes the to-be-decoded transform coefficients that correspond to the frequency point and that are in the picture encoded information; determine a first to-be-decoded transform coefficient from the first to-be-decoded two-dimensional subband coefficient array according to the preset coefficient scanning order; and entropy decode the first to-be-decoded transform coefficient based on a context area corresponding to the first to-be-decoded transform coefficient.

In a possible implementation, the processing module is configured to: determine, according to the preset frequency point scanning order, a to-be-decoded three-dimensional subband coefficient array from the picture encoded information, where the to-be-decoded three-dimensional subband coefficient array includes the to-be-decoded transform coefficients that correspond to all frequency points and that are in the picture encoded information; determine a first to-be-decoded two-dimensional subband coefficient array from the to-be-decoded three-dimensional subband coefficient array according to a preset three-dimensional subband coefficient scanning order, where the first to-be-decoded two-dimensional subband coefficient array includes the to-be-decoded transform coefficients that correspond to the frequency point and that are in the picture encoded information; determine a first to-be-decoded transform coefficient from the first to-be-decoded two-dimensional subband coefficient array according to the preset coefficient scanning order; and entropy decode the first to-be-decoded transform coefficient based on a context area corresponding to the first to-be-decoded transform coefficient.

In a possible implementation, the three-dimensional subband coefficient scanning order includes a preset change order of horizontal position indexes, a preset change order of vertical position indexes, or a preset change order of frequency indexes.

In a possible implementation, the processing module is configured to: determine, according to the preset frequency point scanning order, the to-be-decoded transform coefficients that are included in a frequency subband and that are in the picture encoded information, where the to-be-decoded transform coefficients included in the frequency subband correspond to the same frequency point; determine a first to-be-decoded transform coefficient from the frequency subband based on the preset coefficient scanning order; and entropy decode the first to-be-decoded transform coefficient based on a context area corresponding to the first to-be-decoded transform coefficient.

In a possible implementation, the processing module is configured to: obtain context information of the first to-be-decoded transform coefficient from the context area corresponding to the first to-be-decoded transform coefficient, where the context area corresponding to the first to-be-decoded transform coefficient includes a decoded transform coefficient in the context area corresponding to the first to-be-decoded transform coefficient; estimate the first to-be-decoded transform coefficient based on the context information of the first to-be-decoded transform coefficient, to obtain probability distribution information of the first to-be-decoded transform coefficient; and arithmetic decode the first to-be-decoded transform coefficient based on the probability distribution information of the first to-be-decoded transform coefficient, to obtain a decoded first transform coefficient, where the decoded first transform coefficient belongs to the at least two transform coefficient blocks.

In a possible implementation, the context area corresponding to the first to-be-decoded transform coefficient includes at least one of the following: a spatially neighboring area of the first to-be-decoded transform coefficient, a subband neighboring area of the first to-be-decoded transform coefficient, and a three-dimensional neighboring area of the first to-be-decoded transform coefficient.

In a possible implementation, the processing module is configured to: when the first to-be-decoded transform coefficient is a plurality of to-be-decoded transform coefficients, obtain context information of the plurality of to-be-decoded transform coefficients from a context area corresponding to the plurality of to-be-decoded transform coefficients, where the context information of the plurality of to-be-decoded transform coefficients includes a decoded transform coefficient in the context area corresponding to the plurality of to-be-decoded transform coefficients; estimate the plurality of to-be-decoded transform coefficients concurrently based on the context information of the plurality of to-be-decoded transform coefficients, to obtain probability distribution information of the first to-be-decoded transform coefficient; and arithmetic decode the plurality of to-be-decoded transform coefficients concurrently based on the probability distribution information of the plurality of to-be-decoded transform coefficients, to obtain a decoded first transform coefficient, where the decoded first transform coefficient belongs to the at least two transform coefficient blocks.

In a possible implementation, the context area corresponding to the plurality of to-be-decoded transform coefficients includes at least one of the following: a spatially neighboring area of the plurality of to-be-decoded transform coefficients, a subband neighboring area of the plurality of to-be-decoded transform coefficients, and a three-dimensional neighboring area of the plurality of to-be-decoded transform coefficients.

In a possible implementation, the processing module is configured to: determine a first subband picture from the picture encoded information according to the preset frequency point scanning order, where the first subband picture includes the to-be-decoded transform coefficients that correspond to the frequency point and that are in the picture encoded information; and decode to-be-decoded coefficients of the first subband picture according to the preset coefficient scanning order, to obtain the at least two transform coefficient blocks.

In a possible implementation, the processing module is further configured to: after obtaining the at least two transform coefficient blocks, entropy encode the at least two transform coefficient blocks to obtain transform coefficient encoded information; generate at least two picture blocks based on the transform coefficient encoded information; and restore an original picture area based on the at least two picture blocks, where the original picture area includes a pixel picture area or a residual picture area.

In a possible implementation, the processing module is further configured to: after obtaining the at least two transform coefficient blocks, perform dequantization and inverse transformation on the at least two transform coefficient blocks to obtain at least two picture blocks; and restore an original picture area based on the at least two picture blocks, where the original picture area includes a pixel picture area or a residual picture area.

It should be noted that, because content such as information exchange and an execution process between the modules/units of the foregoing apparatuses is based on the same idea as the method embodiments of this application, technical effects brought by the content are the same as those brought by the method embodiments of this application. For specific content, refer to the descriptions in the foregoing method embodiments of this application. Details are not described herein again.

An embodiment of this application further provides a computer storage medium. The computer storage medium stores a program, and the program performs a part or all of the steps described in the foregoing method embodiments.

Figure 19:
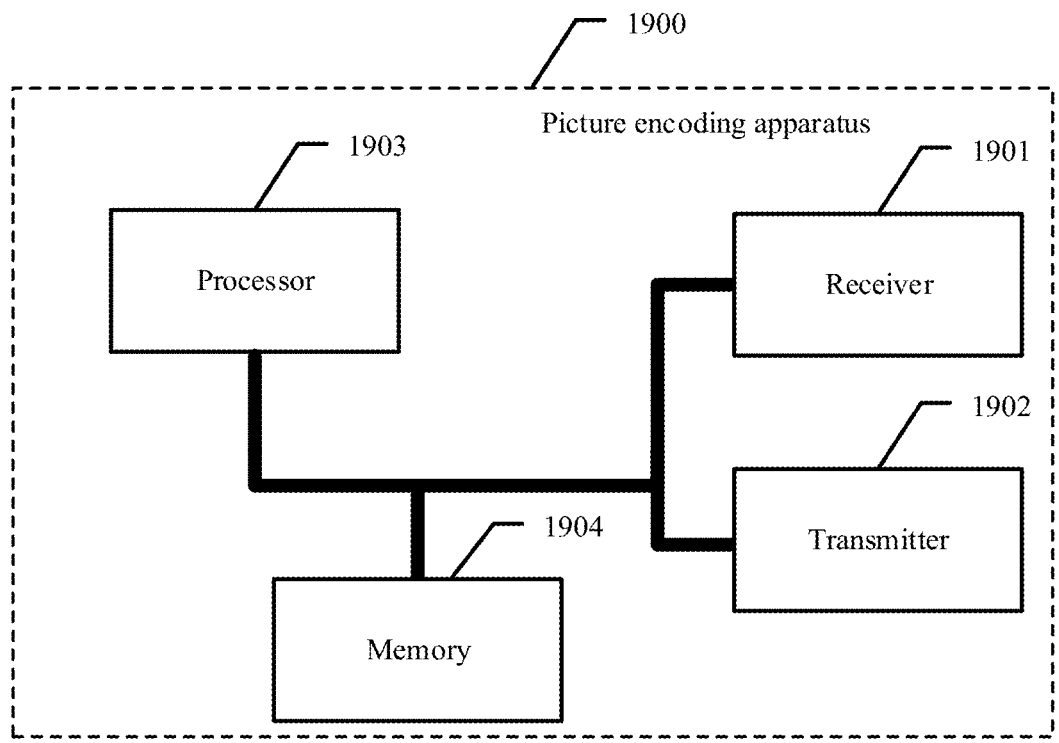
FIG. 19 is a schematic diagram of a composition structure of another picture encoding apparatus according to an embodiment of this application.

The following describes another picture encoding apparatus provided in an embodiment of this application. Refer to FIG. 19. The picture encoding apparatus 1900 includes: a receiver 1901, a transmitter 1902, a processor 1903, and a memory 1904 (there may be one or more processors 1903 in the picture encoding apparatus 1900, and one processor is used as an example in FIG. 19). In some embodiments of this application, the receiver 1901, the transmitter 1902, the processor 1903, and the memory 1904 may be connected through a bus or in another manner. Connection through a bus is used as an example in FIG. 19.

The memory 1904 may include a read-only memory and a random access memory, and provide instructions and data for the processor 1903. A part of the memory 1904 may further include a non-volatile random access memory (NVRAM). The memory 1904 stores an operating system and operation instructions, an executable module or a data structure, a subnet thereof, or an extended set thereof. The operation instructions may include various operation instructions to implement various operations. The operating system may include various system programs and is used to implement various basic services and process a hardware-based task.

The processor 1903 controls an operation of the picture encoding apparatus, and the processor 1903 may also be referred to as a central processing unit (CPU). In specific application, components of the picture encoding apparatus are coupled together by using a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1903, or may be implemented by the processor 1903. The processor 1903 may be an integrated circuit chip, and has a signal processing capability. In an implementation process, the steps in the foregoing methods may be implemented by using a hardware integrated logical circuit in the processor 1903, or by using instructions in a form of software. The processor 1903 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1903 may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly executed and accomplished by using a hardware decoding processor, or may be executed and accomplished by using a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 1904, and the processor 1903 reads information in the memory 1904 and completes the steps in the foregoing methods in combination with hardware in the processor 1903.

The receiver 1901 may be configured to: receive input digit or character information, and generate signal input related to a related setting and function control of the picture encoding apparatus. The transmitter 1902 may include a display device, for example, a display. The transmitter 1902 may be configured to output the digit or character information through an external interface.

In some embodiments of this application, the processor 1903 is configured to perform the picture processing method performed by the picture encoding apparatus shown in FIG. 4 in the foregoing embodiment.

Figure 20:
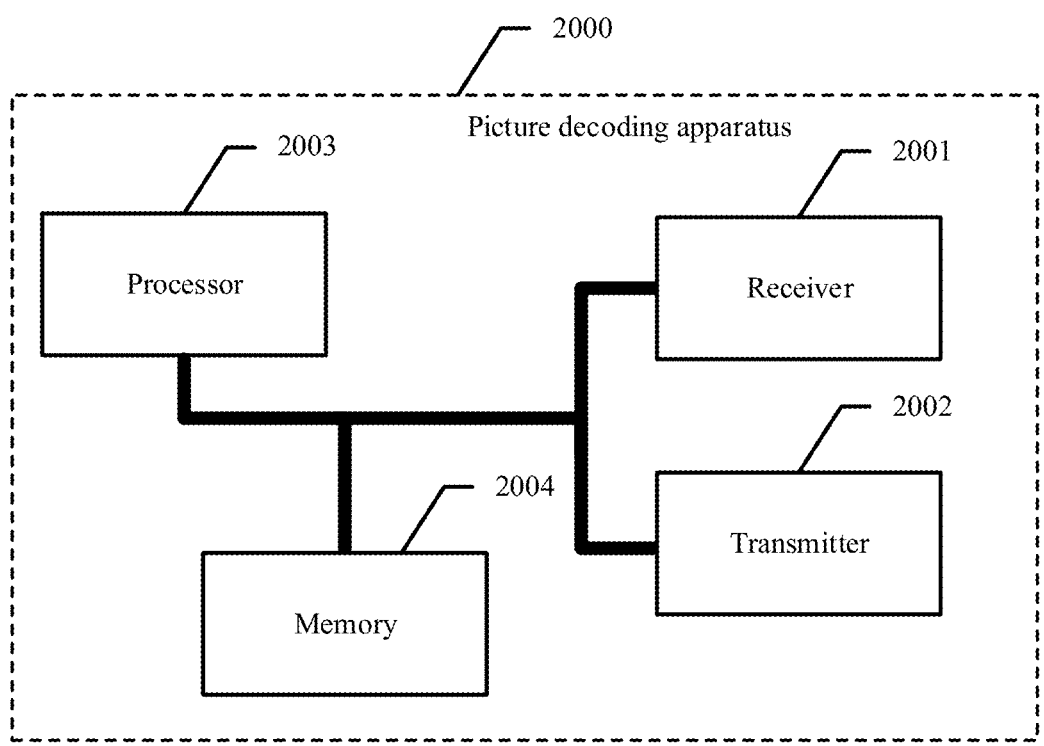
FIG. 20 is a schematic diagram of a composition structure of another picture decoding apparatus according to an embodiment of this application.

The following describes another picture decoding apparatus provided in an embodiment of this application. Refer to FIG. 20. The picture decoding apparatus 2000 includes:

a receiver 2001, a transmitter 2002, a processor 2003, and a memory 2004 (there may be one or more processors 2003 in the picture decoding apparatus 2000, and one processor is used as an example in FIG. 20). In some embodiments of this application, the receiver 2001, the transmitter 2002, the processor 2003, and the memory 2004 may be connected through a bus or in another manner. Connection through a bus is used as an example in FIG. 20.

The memory 2004 may include a read-only memory and a random access memory, and provide instructions and data for the processor 2003. A part of the memory 2004 may further include an NVRAM. The memory 2004 stores an operating system and operation instructions, an executable module or a data structure, a subnet thereof, or an extended set thereof. The operation instructions may include various operation instructions to implement various operations. The operating system may include various system programs and is used to implement various basic services and process a hardware-based task.

The processor 2003 controls an operation of the picture decoding apparatus, and the processor 2003 may also be referred to as a CPU. In specific application, components of the picture decoding apparatus are coupled together by using a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 2003, or may be implemented by the processor 2003. The processor 2003 may be an integrated circuit chip, and has a signal processing capability. In an implementation process, the steps in the foregoing methods may be implemented by using a hardware integrated logical circuit in the processor 2003, or by using instructions in a form of software. The processor 2003 may be a general purpose processor, a DSP, an ASIC, an FPGA or another programmable logic device, a discrete gate or transistor logic device, or a discrete hardware component. The processor 2003 may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly executed and accomplished by using a hardware decoding processor, or may be executed and accomplished by using a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 2004, and the processor 2003 reads information in the memory 2004 and completes the steps in the foregoing methods in combination with hardware in the processor 2003.

In some embodiments of this application, the processor 2003 is configured to perform the picture processing method performed by the picture decoding apparatus shown in FIG. 4 in the foregoing embodiment.

In another possible design, when the picture processing apparatus is a chip in a terminal, the chip includes a processing unit and a communication unit. The processing unit may be, for example, a processor. The communication unit may be, for example, an input/output interface, a pin, or a circuit. The processing unit may execute computer executable instructions stored in a storage unit, so that the chip in the terminal performs the method according to any implementation of the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that can store static information and instructions, or a random access memory (RAM).

The processor mentioned above may be a general-purpose central processing unit, a microprocessor, an ASIC, or one or more integrated circuits configured to control program execution of the method in the first aspect or the second aspect.

In addition, it should be noted that the described apparatus embodiments are merely examples. The units described as separate parts may or may not be physically separate, and parts displayed as units may or may not be physical units, may be located in one position, or may be distributed on a plurality of network units. A part or all of the modules may be selected according to an actual requirement to achieve the objectives of the solutions of embodiments. In addition, in the accompanying drawings of the apparatus embodiments provided in this application, connection relationships between modules indicate that the modules have communication connection with each other, which may be implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be in various forms, for example, in a form of an analog circuit, a digital circuit, or a dedicated circuit. However, as for this application, software program implementation is a better implementation in most cases. Based on such an understanding, the technical solutions in this application essentially or the part contributing to the prior art may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the method in embodiments of this application.

All or a part of the foregoing embodiments may be implemented by software, hardware, firmware, or any combination thereof. When software is used to implement embodiments, all or a part of embodiments may be implemented in a form of a computer program product.

The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A picture processing method, comprising:
obtaining at least two transform coefficient blocks, wherein each of the at least two transform coefficient blocks comprises at least two transform coefficients that correspond to different frequency points;
determining, according to a preset frequency point scanning order, transform coefficients that are in the at least two transform coefficient blocks and that correspond to a frequency point; and
encoding, according to a preset coefficient scanning order, each transform coefficient corresponding to the frequency point, to obtain picture encoded information;
wherein the determining, according to a preset frequency point scanning order, transform coefficients that are in the at least two transform coefficient blocks and that correspond to a frequency point comprises one of the following:
i) obtaining at least two two-dimensional subband coefficient arrays from the at least two transform coefficient blocks, wherein each two-dimensional subband coefficient array comprises transform coefficients that correspond to a same frequency point and that are in the at least two transform coefficient blocks, and transform coefficients comprised in different two-dimensional subband coefficient arrays correspond to different frequency points; and
determining a first two-dimensional subband coefficient array from the at least two two-dimensional subband coefficient arrays according to the preset frequency point scanning order; and
the encoding, according to a preset coefficient scanning order, each transform coefficient corresponding to the frequency point comprises:
determining a first transform coefficient from the first two-dimensional subband coefficient array according to the preset coefficient scanning order; and
entropy encoding the first transform coefficient based on a context area corresponding to the first transform coefficient;
ii) obtaining at least two two-dimensional subband coefficient arrays from the at least two transform coefficient blocks, wherein each two-dimensional subband coefficient array comprises transform coefficients that correspond to a same frequency point and that are in the at least two transform coefficient blocks, and transform coefficients comprised in different two-dimensional subband coefficient arrays correspond to different frequency points;
combining the at least two two-dimensional subband coefficient arrays according to the preset frequency point scanning order to obtain a three-dimensional subband coefficient array; and
determining a first two-dimensional subband coefficient array from the three-dimensional subband coefficient array according to a preset three-dimensional subband coefficient scanning order; and
the encoding, according to a preset coefficient scanning order, each transform coefficient corresponding to the frequency point comprises:
determining a first transform coefficient from the first two-dimensional subband coefficient array according to the preset coefficient scanning order; and
entropy encoding the first transform coefficient based on a context area corresponding to the first transform coefficient;
iii) sorting the at least two transform coefficient blocks according to the preset frequency point scanning order to obtain the sorted at least two transform coefficient blocks;
obtaining, from the sorted at least two transform coefficient blocks, a plurality of two-dimensional subband coefficient arrays corresponding to different frequency points;
combining the plurality of two-dimensional subband coefficient arrays corresponding to the different frequency points to obtain a three-dimensional subband coefficient array; and
determining a first two-dimensional subband coefficient array from the three-dimensional subband coefficient array according to a preset three-dimensional subband coefficient scanning order; and
the encoding, according to a preset coefficient scanning order, each transform coefficient corresponding to the frequency point comprises:
determining a first transform coefficient from the first two-dimensional subband coefficient array according to the preset coefficient scanning order; and
entropy encoding the first transform coefficient based on a context area corresponding to the first transform coefficient;
iv) determining, according to the preset frequency point scanning order, a first two-dimensional subband coefficient array consisting of transform coefficients that correspond to a same frequency point and that are in the at least two transform coefficient blocks; and
the encoding, according to a preset coefficient scanning order, each transform coefficient corresponding to the frequency point comprises:
determining a first transform coefficient from the first two-dimensional subband coefficient array according to the preset coefficient scanning order; and
entropy encoding the first transform coefficient based on a context area corresponding to the first transform coefficient;
v) determining, according to the preset frequency point scanning order, transform coefficients that are in the at least two transform coefficient blocks and that are comprised in a frequency subband, wherein the transform coefficients that are in the at least two transform coefficient blocks and that are comprised in the frequency subband correspond to a same frequency point; and
the encoding, according to a preset coefficient scanning order, each transform coefficient corresponding to the frequency point comprises:
determining, according to the preset coefficient scanning order, a first transform coefficient comprised in the frequency subband; and
entropy encoding the first transform coefficient based on a context area corresponding to the first transform coefficient; and
vi) obtaining at least two two-dimensional subband coefficient arrays from the at least two transform coefficient blocks, wherein a two-dimensional subband coefficient array comprises transform coefficients that correspond to a same frequency point and that are in the at least two transform coefficient blocks, and transform coefficients comprised in different two-dimensional subband coefficient arrays correspond to different frequency points; and determining, according to the preset frequency point scanning order, at least two subband pictures corresponding to the at least two two-dimensional subband coefficient arrays; and wherein the encoding, according to a preset coefficient scanning order, each transform coefficient corresponding to the frequency point comprises:

encoding transform coefficients in the at least two subband pictures according to the preset coefficient scanning order.

2. The method according to claim 1, wherein the three-dimensional subband coefficient scanning order comprises:
a preset change order of horizontal position indexes;
a preset change order of vertical position indexes; or
a preset change order of frequency indexes.

3. The method according to claim 1, wherein the entropy encoding the first transform coefficient based on a context area corresponding to the first transform coefficient comprises one of the following:
i) obtaining context information of the first transform coefficient from the context area corresponding to the first transform coefficient, wherein the context information of the first transform coefficient comprises an encoded transform coefficient in the context area corresponding to the first transform coefficient;
estimating the first transform coefficient based on the context information of the first transform coefficient, to obtain probability distribution information of the first transform coefficient; and
arithmetic encoding the first transform coefficient based on the probability distribution information of the first transform coefficient; and
ii) when the first transform coefficient is a plurality of transform coefficients, obtaining context information of the plurality of transform coefficients from a context area corresponding to the plurality of transform coefficients, wherein the context information of the plurality of transform coefficients comprises an encoded transform coefficient in the context area corresponding to the plurality of transform coefficients;
estimating the plurality of transform coefficients concurrently based on the context information of the plurality of transform coefficients, to obtain probability distribution information of the plurality of transform coefficients; and
arithmetic encoding the plurality of transform coefficients concurrently based on the probability distribution information of the plurality of transform coefficients.

4. The method according to claim 3, wherein the context area corresponding to the first transform coefficient comprises at least one selected from the following: a spatially neighboring area of the first transform coefficient, a subband neighboring area of the first transform coefficient, and a three-dimensional neighboring area of the first transform coefficient.

5. The method according to claim 3, wherein the context area corresponding to the plurality of transform coefficients comprises at least one selected from the following: a spatially neighboring area of the plurality of transform coefficients, a subband neighboring area of the plurality of transform coefficients, and a three-dimensional neighboring area of the plurality of transform coefficients.

6. The method according to claim 1, wherein the obtaining at least two transform coefficient blocks comprises:
obtaining transform coefficient encoded information of the at least two picture blocks; and
entropy decoding the transform coefficient encoded information to obtain the at least two transform coefficient blocks;
or wherein the obtaining at least two transform coefficient blocks comprises:
splitting an original picture area into at least two picture blocks, wherein the original picture area comprises a pixel picture area or a residual picture area; and
transforming and quantizing the at least two picture blocks to obtain the at least two transform coefficient blocks.

7. A picture processing method, comprising:
obtaining picture encoded information;
determining, according to a preset frequency point scanning order, to-be-decoded transform coefficients that correspond to a frequency point and that are in the picture encoded information; and
decoding, according to a preset coefficient scanning order, the to-be-decoded transform coefficients corresponding to the frequency point, to obtain at least two transform coefficient blocks, wherein each of the at least two transform coefficient blocks comprises at least two transform coefficients that correspond to different frequency points;
wherein the determining, according to a preset frequency point scanning order, to-be-decoded transform coefficients that correspond to a frequency point and that are in the picture encoded information comprises one of the following:
i) determining, according to the preset frequency point scanning order, a first to-be-decoded two-dimensional subband coefficient array from the picture encoded information, wherein the first to-be-decoded two-dimensional subband coefficient array comprises the to-be-decoded transform coefficients that correspond to the frequency point and that are in the picture encoded information; and
the decoding, according to a preset coefficient scanning order, the to-be-decoded transform coefficients corresponding to the frequency point comprises:
determining a first to-be-decoded transform coefficient from the first to-be-decoded two-dimensional subband coefficient array according to the preset coefficient scanning order; and
entropy decoding the first to-be-decoded transform coefficient based on a context area corresponding to the first to-be-decoded transform coefficient;
ii) determining, according to the preset frequency point scanning order, a to-be-decoded three-dimensional subband coefficient array from the picture encoded information, wherein the to-be-decoded three-dimensional subband coefficient array comprises to-be-decoded transform coefficients that correspond to all frequency points and that are in the picture encoded information; and
determining a first to-be-decoded two-dimensional subband coefficient array from the to-be-decoded three-dimensional subband coefficient array according to a preset three-dimensional subband coefficient scanning order, wherein the first to-be-decoded two-dimensional subband coefficient array comprises the to-be-decoded transform coefficients that correspond to the frequency point and that are in the picture encoded information; and the decoding, according to a preset coefficient scanning order, the to-be-decoded transform coefficients corresponding to the frequency point comprises:

determining a first to-be-decoded transform coefficient from the first to-be-decoded two-dimensional subband coefficient array according to the preset coefficient scanning order; and entropy decoding the first to-be-decoded transform coefficient based on a context area corresponding to the first to-be-decoded transform coefficient;

iii) determining, according to the preset frequency point scanning order, to-be-decoded transform coefficients that are comprised in a frequency subband and that are in the picture encoded information, wherein the to-be-decoded transform coefficients comprised in the frequency subband correspond to a same frequency point; and the decoding, according to a preset coefficient scanning order, the to-be-decoded transform coefficients corresponding to the frequency point comprises:

determining a first to-be-decoded transform coefficient from the frequency subband based on the preset coefficient scanning order; and entropy decoding the first to-be-decoded transform coefficient based on a context area corresponding to the first to-be-decoded transform coefficient; and iv) determining a first subband picture from the picture encoded information according to the preset frequency point scanning order, wherein the first subband picture comprises the to-be-decoded transform coefficients that correspond to the frequency point and that are in the picture encoded information; and the decoding, according to a preset coefficient scanning order, the to-be-decoded transform coefficients corresponding to the frequency point comprises:

decoding to-be-decoded coefficients of the first subband picture according to the preset coefficient scanning order, to obtain the at least two transform coefficient blocks.

8. The picture processing method according to claim 7, wherein the three-dimensional subband coefficient scanning order comprises:

a preset change order of horizontal position indexes;
a preset change order of vertical position indexes; or
a preset change order of frequency indexes.

9. The picture processing method according to claim 7, wherein the entropy decoding the first to-be-decoded transform coefficient based on a context area corresponding to the first to-be-decoded transform coefficient comprises:

obtaining context information of the first to-be-decoded transform coefficient from the context area corresponding to the first to-be-decoded transform coefficient, wherein the context area corresponding to the first to-be-decoded transform coefficient comprises a decoded transform coefficient in the context area corresponding to the first to-be-decoded transform coefficient;

estimating the first to-be-decoded transform coefficient based on the context information of the first to-be-decoded transform coefficient, to obtain probability distribution information of the first to-be-decoded transform coefficient; and arithmetic decoding the first to-be-decoded transform coefficient based on the probability distribution information of the first to-be-decoded transform coefficient, to obtain a decoded first transform coefficient, wherein the decoded first transform coefficient belongs to the at least two transform coefficient blocks;

or wherein the entropy decoding the first to-be-decoded transform coefficient based on a context area corresponding to the first to-be-decoded transform coefficient comprises:

when the first to-be-decoded transform coefficient is a plurality of to-be-decoded transform coefficients, obtaining context information of the plurality of to-be-decoded transform coefficients from a context area corresponding to the plurality of to-be-decoded transform coefficients, wherein the context information of the plurality of to-be-decoded transform coefficients comprises a decoded transform coefficient in the context area corresponding to the plurality of to-be-decoded transform coefficients;

estimating the plurality of to-be-decoded transform coefficients concurrently based on the context information of the plurality of to-be-decoded transform coefficients, to obtain probability distribution information of the first to-be-decoded transform coefficient; and arithmetic decoding the plurality of to-be-decoded transform coefficients concurrently based on the probability distribution information of the plurality of to-be-decoded transform coefficients, to obtain a decoded first transform coefficient, wherein the decoded first transform coefficient belongs to the at least two transform coefficient blocks.

10. The picture processing method according to claim 9, wherein the context area corresponding to the first to-be-decoded transform coefficient comprises at least one of the following: a spatially neighboring area of the first to-be-decoded transform coefficient, a subband neighboring area of the first to-be-decoded transform coefficient, and a three-dimensional neighboring area of the first to-be-decoded transform coefficient.

11. The picture processing method according to claim 9, wherein the context area corresponding to the plurality of to-be-decoded transform coefficients comprises at least one selected from the following: a spatially neighboring area of the plurality of to-be-decoded transform coefficients, a subband neighboring area of the plurality of to-be-decoded transform coefficients, and a three-dimensional neighboring area of the plurality of to-be-decoded transform coefficients.

12. The picture processing method according to claim 7, wherein after the obtaining at least two transform coefficient blocks, the method further comprises:

entropy encoding the at least two transform coefficient blocks to obtain transform coefficient encoded information;

generating at least two picture blocks based on the transform coefficient encoded information; and restoring an original picture area based on the at least two picture blocks, wherein the original picture area comprises a pixel picture area or a residual picture area;

or wherein after the obtaining at least two transform coefficient blocks, the method further comprises:

performing dequantization and inverse transformation on the at least two transform coefficient blocks to obtain at least two picture blocks; and restoring an original picture area based on the at least two picture blocks, wherein the original picture area comprises a pixel picture area or a residual picture area.

13. A picture processing apparatus, comprising:
at least one processor; and
one or more memories coupled to the at least one processor and storing programming instructions for execution by the at least one processor to cause the picture processing apparatus to:
obtain picture encoded information;
determine, according to a preset frequency point scanning order, to-be-decoded transform coefficients that correspond to a frequency point and that are in the picture encoded information; and
decode, according to a preset coefficient scanning order, the to-be-decoded transform coefficients corresponding to the frequency point, to obtain at least two transform coefficient blocks, wherein each of the at least two transform coefficient blocks comprises at least two transform coefficients that correspond to different frequency points;
wherein the programming instructions for execution by the at least one processor to cause the picture processing apparatus further to perform one of the following:
i) determine, according to the preset frequency point scanning order, a first to-be-decoded two-dimensional subband coefficient array from the picture encoded information, wherein the first to-be-decoded two-dimensional subband coefficient array comprises the to-be-decoded transform coefficients that correspond to the frequency point and that are in the picture encoded information; and
the decode, according to a preset coefficient scanning order, the to-be-decoded transform coefficients corresponding to the frequency point comprises:
determine a first to-be-decoded transform coefficient from the first to-be-decoded two-dimensional subband coefficient array according to the preset coefficient scanning order; and
entropy decode the first to-be-decoded transform coefficient based on a context area corresponding to the first to-be-decoded transform coefficient;
ii) determine, according to the preset frequency point scanning order, a to-be-decoded three-dimensional subband coefficient array from the picture encoded information, wherein the to-be-decoded three-dimensional subband coefficient array comprises to-be-decoded transform coefficients that correspond to all frequency points and that are in the picture encoded information; and
determine a first to-be-decoded two-dimensional subband coefficient array from the to-be-decoded three-dimensional subband coefficient array according to a preset three-dimensional subband coefficient scanning order, wherein the first to-be-decoded two-dimensional subband coefficient array comprises the to-be-decoded transform coefficients that correspond to the frequency point and that are in the picture encoded information;
determine a first to-be-decoded transform coefficient from the first to-be-decoded two-dimensional subband coefficient array according to the preset coefficient scanning order; and
entropy decode the first to-be-decoded transform coefficient based on a context area corresponding to the first to-be-decoded transform coefficient;
iii) determine, according to the preset frequency point scanning order, to-be-decoded transform coefficients that are comprised in a frequency subband and that are in the picture encoded information, wherein the to-be-decoded transform coefficients comprised in the frequency subband correspond to a same frequency point;
determine a first to-be-decoded transform coefficient from the frequency subband based on the preset coefficient scanning order; and
entropy decode the first to-be-decoded transform coefficient based on a context area corresponding to the first to-be-decoded transform coefficient; and
iv) determine a first subband picture from the picture encoded information according to the preset frequency point scanning order, wherein the first subband picture comprises the to-be-decoded transform coefficients that correspond to the frequency point and that are in the picture encoded information; and
decode to-be-decoded coefficients of the first subband picture according to the preset coefficient scanning order, to obtain the at least two transform coefficient blocks.

14. The picture processing apparatus according to claim 13, wherein the three-dimensional subband coefficient scanning order comprises:
a preset change order of horizontal position indexes;
a preset change order of vertical position indexes; or
a preset change order of frequency indexes.

15. The picture processing apparatus according to claim 13, wherein the programming instructions for execution by the at least one processor to cause the picture processing apparatus further to:
obtain context information of the first to-be-decoded transform coefficient from the context area corresponding to the first to-be-decoded transform coefficient, wherein the context area corresponding to the first to-be-decoded transform coefficient comprises a decoded transform coefficient in the context area corresponding to the first to-be-decoded transform coefficient;
estimate the first to-be-decoded transform coefficient based on the context information of the first to-be-decoded transform coefficient, to obtain probability distribution information of the first to-be-decoded transform coefficient; and
arithmetic decode the first to-be-decoded transform coefficient based on the probability distribution information of the first to-be-decoded transform coefficient, to obtain a decoded first transform coefficient, wherein the decoded first transform coefficient belongs to the at least two transform coefficient blocks;
or
when the first to-be-decoded transform coefficient is a plurality of to-be-decoded transform coefficients, obtain context information of the plurality of to-be-decoded transform coefficients from a context area corresponding to the plurality of to-be-decoded transform coefficients, wherein the context information of the plurality of to-be-decoded transform coefficients comprises a decoded transform coefficient in the context area corresponding to the plurality of to-be-decoded transform coefficients;
estimate the plurality of to-be-decoded transform coefficients concurrently based on the context information of the plurality of to-be-decoded transform coefficients, to obtain probability distribution information of the first to-be-decoded transform coefficient; and
arithmetic decode the plurality of to-be-decoded transform coefficients concurrently based on the probability distribution information of the plurality of to-be-decoded transform coefficients, to obtain a decoded first transform coefficient, wherein the decoded first transform coefficient belongs to the at least two transform coefficient blocks.

16. The picture processing apparatus according to claim 15, wherein the context area corresponding to the first to-be-decoded transform coefficient comprises at least one of the following: a spatially neighboring area of the first to-be-decoded transform coefficient, a subband neighboring area of the first to-be-decoded transform coefficient, and a three-dimensional neighboring area of the first to-be-decoded transform coefficient.

17. The picture processing apparatus according to claim 15, wherein the context area corresponding to the plurality of to-be-decoded transform coefficients comprises at least one selected from the following: a spatially neighboring area of the plurality of to-be-decoded transform coefficients, a subband neighboring area of the plurality of to-be-decoded transform coefficients, and a three-dimensional neighboring area of the plurality of to-be-decoded transform coefficients.

18. The picture processing apparatus according to claim 13, wherein the programming instructions for execution by the at least one processor to cause the picture processing apparatus further to:

entropy encode the at least two transform coefficient blocks to obtain transform coefficient encoded information;

generate at least two picture blocks based on the transform coefficient encoded information; and restore an original picture area based on the at least two picture blocks, wherein the original picture area comprises a pixel picture area or a residual picture area;

or wherein the programming instructions for execution by the at least one processor to cause the picture processing apparatus further to:

perform dequantization and inverse transformation on the at least two transform coefficient blocks to obtain at least two picture blocks; and restore an original picture area based on the at least two picture blocks, wherein the original picture area comprises a pixel picture area or a residual picture area.

* * * * *

UNITED STATES PATENT AND TRADEMARK OFFICE
CERTIFICATE OF CORRECTION

| | | |
|---|---|---|
| PATENT NO. | : 12,022,078 B2 | Page 1 of 1 |
| APPLICATION NO. | : 17/954861 | |
| DATED | : June 25, 2024 | |
| INVENTOR(S) | : Haitao Yang et al. | |

It is certified that error appears in the above-identified patent and that said Letters Patent is hereby corrected as shown below:

On the Title Page

In Item (71), in Column 1, in "Applicant", Line 2, delete "GuangDong (CN)" and insert -- Shenzhen (CN) --.

Signed and Sealed this
Seventeenth Day of September, 2024

Katherine Kelly Vidal
*Director of the United States Patent and Trademark Office*